(12) United States Patent
Vorontsov

(10) Patent No.: US 12,172,235 B2
(45) Date of Patent: Dec. 24, 2024

(54) ADDITIVE MANUFACTURE IN METALS WITH A FIBER ARRAY LASER SOURCE AND ADAPTIVE MULTI-BEAM SHAPING

(71) Applicant: II-VI Delaware, Inc., Wilmington, DE (US)

(72) Inventor: Mikhail A. Vorontsov, Wilmington, DE (US)

(73) Assignee: II-VI DELAWARE, INC., Wilmington, DE (US)

( * ) Notice: Subject to any disclaimer, the term of this patent is extended or adjusted under 35 U.S.C. 154(b) by 0 days.

(21) Appl. No.: 18/457,741

(22) Filed: Aug. 29, 2023

(65) Prior Publication Data

US 2023/0405721 A1 Dec. 21, 2023

Related U.S. Application Data

(60) Continuation of application No. 17/444,702, filed on Aug. 9, 2021, now Pat. No. 11,780,030, which is a
(Continued)

(51) Int. Cl.
*B23K 26/342* (2014.01)
*B23K 26/70* (2014.01)
(Continued)

(52) U.S. Cl.
CPC .......... *B23K 26/342* (2015.10); *B23K 26/703* (2015.10); *B29C 64/10* (2017.08);
(Continued)

(58) Field of Classification Search
CPC .............. B23K 26/032; B23K 26/0676; B23K 26/0006; B23K 26/0876; B23K 26/044;
(Continued)

(56) References Cited

U.S. PATENT DOCUMENTS

| 7,920,312 | B2 | 4/2011 | Rosman et al. |
| 2002/0181844 | A1 | 12/2002 | Vaganov |

(Continued)

FOREIGN PATENT DOCUMENTS

| CN | 103056533 A | 4/2013 |
| CN | 203197472 U | 9/2013 |

(Continued)

OTHER PUBLICATIONS

A. Brignon, ed., Coherent Laser Beam Combining (Wiley-VCR Verlag GmbH & Co. KGaA, Weinheim, 2013). https://www.EOSPACE.com.

(Continued)

*Primary Examiner* — Brian W Jennison
(74) *Attorney, Agent, or Firm* — Blank Rome LLP

(57) ABSTRACT

A system that uses a scalable array of individually controllable laser beams that are generated by a fiber array system to process materials into an object. The adaptive control of individual beams may include beam power, focal spot width, centroid position, scanning orientation, amplitude and frequency, piston phase and polarization states of individual beams. Laser beam arrays may be arranged in a two dimensional cluster and configured to provide a pre-defined spatiotemporal laser power density distribution, or may be arranged linearly and configured to provide oscillating focal spots along a wide processing line. These systems may also have a set of material sensors that gather information on a material and environment immediately before, during, and immediately after processing, or a set of thermal management modules that pre-heat and post-heat material to control thermal gradient, or both.

20 Claims, 34 Drawing Sheets

Related U.S. Application Data division of application No. 15/983,866, filed on May 18, 2018, now Pat. No. 11,117,218, which is a continuation-in-part of application No. 15/642,884, filed on Jul. 6, 2017, now Pat. No. 10,589,377.

(51) Int. Cl.

| | |
|---|---|
| *B29C 64/10* | (2017.01) |
| *B33Y 10/00* | (2015.01) |
| *B33Y 30/00* | (2015.01) |
| *B33Y 50/00* | (2015.01) |
| *B33Y 50/02* | (2015.01) |
| *G02B 6/00* | (2006.01) |
| *G02B 6/02* | (2006.01) |
| *G02B 6/35* | (2006.01) |
| *G02B 6/42* | (2006.01) |

(52) U.S. Cl.
CPC ............ *B33Y 50/00* (2014.12); *B33Y 50/02* (2014.12); *G02B 6/02052* (2013.01); *B33Y 10/00* (2014.12); *B33Y 30/00* (2014.12); *G02B 2006/0098* (2013.01); *G02B 6/3504* (2013.01); *G02B 6/4249* (2013.01)

(58) Field of Classification Search
CPC ............ B23K 26/082; B23K 26/062; B23K 26/0608; B23K 26/0342; B33Y 10/00; B33Y 30/00; B33Y 50/02; G02B 6/02052; G02B 6/3504; G02B 6/4249; G02B 2006/0098
See application file for complete search history.

(56) References Cited

U.S. PATENT DOCUMENTS

| | | |
|---|---|---|
| 2003/0063838 A1 | 4/2003 | Hagood et al. |
| 2011/0240607 A1 | 10/2011 | Stecker et al. |
| 2012/0224824 A1 | 9/2012 | Beresnev et al. |
| 2016/0216510 A1 | 7/2016 | Tsuruta et al. |

FOREIGN PATENT DOCUMENTS

| | | |
|---|---|---|
| CN | 104175004 A | 12/2014 |
| CN | 104216123 A | 12/2014 |
| CN | 104775116 A | 7/2015 |
| CN | 107438488 A | 12/2017 |
| CN | 107635749 A | 1/2018 |
| CN | 107708969 A | 2/2018 |
| CN | 110773736 A | 2/2020 |
| JP | 2004279087 A | 10/2004 |
| KR | 20060088277 A | 8/2006 |
| KR | 20060088278 A | 8/2006 |
| RU | 2117934 C1 | 8/1998 |
| WO | 2015117128 A1 | 8/2015 |

OTHER PUBLICATIONS

A. Spierings, N. Herres, G. Levy, "Influence of the Particle Size Distribution on Surface Quality and Mechanical Properties in AM Steel Parts," Rapid Prototyping Journal 17(3):195-202, (2011).
C. Boley, S. Khairallah, A. Rubenchik, "Calculation of Laser Absorption by Metal Powders in Additive Manufacturing," Applied Optics 54(9):2477-2482, (2015).
C. Korner, A. Bauereiss, E. Attar, "Fundamental Consolidation Mechanisms During Selective Beam Melting of Powders: Modelling and Simulation in Materials Science and Engineering," 21(8):085011, (2013).
E. Frazier, "Metal Additive Manufacturing: a Review", DOI: 10.1007/s11665-014-0958-z, JMEPEG (2014) 23:1917-1928.
E. Herderick, Additive Manufacturing of Metals: a Review, Proceedings of MS&T_11, Additive Manufacturing of Metals, Columbus, OH, (2011).
H. Herfurth, "Multi-beam Laser Additive Manufacturing", CTMA Annual Meeting, Fraunhofer USA & Center for lasers and plasmas in advanced manufacturing, University of Michigan, (2013).
https://www.scanlab.de.
https://www.thorlabs.com/newggrouppage9.cfm?objectgroup_id=6430.
I. Mingareev and M. Richardson, "Laser Additive Manufacturing: Going Main stream," Opt. & Photon. News, 24-31, Feb. (2017).
J. Scott, N. Gupta, C. Weber, S. Newsome, T. Wohlers, and T. Caffrey, Additive Manufacturing: Status and Opportunities, IDA, Science and Technology Policy Institute, Washington, DC, 2012.
M.A. Vorontsov, and G. Carhart, "Adaptive wavefront control with asynchronous stochastic parallel gradient descent clusters," JOSA A, vol. 23, No. 9, 2613-2622 Sep. (2006).
M.A. Vorontsov, and V. P. Sivokon, "Stochastic parallel gradient descent technique for high-resolution wavefront phase distortion correction," Josa A, vol. 15, No. 10, 2745-2758 (1998).
NIST, "Measurement Science Roadmap for Metal-Based Additive Manufacturing," US Department of Commerce, National Institute of Standards and Technology, Prepared by Energetics Incorporated, May (2013).
T. Weyrauch, M.A.Vorontsov, J. Mangano, V. Ovchinnikov, D. Bricker, E. Polnau, and A. Rostov, "Deep turbulence effects mitigation with coherent combining of 21 laser beams over 7 km," Optics Letters, Feb. 15, V. 41, N. 4, 840-843 (2016).
W. King, A. Anderson, R. Ferencz, N. Hodge, C. Karnath, S. Khairallah, Overview of modelling and simulation of metal powder bed fusion process at Lawrence Livermore National Laboratory. Materials Science and Technology 31(8) 957-968, (2015).
W. Sames, F. List, S. Pannala, R. Dehoff, S. Babu, "The Metallurgy and Processing Science of Metal Additive Manufacturing," International Materials Reviews, (2016).
Y. Lee, M. Nordin, S. Babu, D. Farson, "Effect of Fluid Convection on Dendrite Arm Spacing in Laser Deposition," Metallurgical and Materials Transactions B 45(4): 1520-1529, (2014).
Y. Lee, M. Nordin, S. Babu, D. Farson, "Influence of Fluid Convection on Weld Pool Formation in Laser Cladding," Welding Journal 93(8):292S-300S, (2014).
"B. Liu, R. Wildman, C. Tuck, I. Ashcroft, R. Hague", "Investigation the Effect of Particle Size Distribution on Processing Parameters Optimization in Selective Laser Melting Process," In Proceedings of Solid Freeform Fabrication Symposium, University of Texas at Austin, Austin. pp 227-238, .(2011).
"M. Kraetzsch, J. Standfuss, A. Klotzbach, J. Kaspar, B. Brenner, and E. Beyer", Laser beam welding with high-frequency beam oscillation: welding of dissimilar materials with brilliant fiber lasers, in Lasers in Manufacturing 2011—Proceedings of the Sixth International WLT Conference on Lasers in Manufacturing 12, 142-149 (2011).
"M. Zavala-Arredondo, N. Boone, J. Willmott, D. Childs, P. Ivanov, K. Groom, K. Mumtaz", "Laser Diode Area Melting for High-speed Additive Manufacturing of Metallic Components," Materials and Design 117, 305-315, (2017).
"M.A. Vorontsov, G. Filimonov, V. Ovchinnikov, E. Polnau, S.L Lachinova, T. Weyrauch, and J. Mangano", "Comparative efficiency analysis of fiber-array and conventional beam director systems in volume turbulence," Appl. Optics, 55, N. 15, May 20, 4170-4185 (2016).
"M.A. Vorontsov, T. Weyrauch, L.A. Beresnev, G. W. Carhart, L. Liu, and K. Aschenbach", Adaptive array of phase-locked fiber collimators: Analysis and experimental demonstration, IEEE J. Sel. Too. Quantum Electron. 15, 269-280 (2009).
"S. Hengesbach, R. Poprawe, D. Hoffmann, M. Traub, T. Schwarz, C. Holly, F. Eibl, A.Weisheit, S. Vogt, S. Britten, M. Ungers, U. Thombansen, C. Engelmann, V. Mamuschkin, P. Lott", "Brightness and Average Power as Driver for Advancements in Diode Lasers and their Applications", Proc. SPIE 9348, High-Power Diode Laser Technology Applications XIII, 93480B, (2015).

ADDITIVE MANUFACTURE IN METALS WITH A FIBER ARRAY LASER SOURCE AND ADAPTIVE MULTI-BEAM SHAPING

PRIORITY

This application is a continuation of U.S. patent application Ser. No. 17/444,702, filed Aug. 9, 2021, which is a divisional of U.S. patent application Ser. No. 15/983,866, filed May 18, 2018, now U.S. Pat. No. 11,117,218, which is a continuation in part of U.S. patent application Ser. No. 15/642,884, filed Jul. 6, 2017, now U.S. Pat. No. 10,589,377, and entitled "Additive Manufacturing in Metals with a Fiber Array Laser Source and Adaptive Multi-Beam Shaping," each of which are incorporated herein by reference in their entireties.

FIELD

The disclosed technology pertains to systems for metal additive manufacturing using a multi-beam fiber array laser power source with adaptive shaping of spatiotemporal laser power distribution, and in situ sensing systems.

BACKGROUND

Lasers are a common power source for material processing and metal additive manufacturing, such as laser additive manufacturing (LAM) technologies. As one example, metal powder bed LAM involves a manufacturing platform or bed that can be raised and lowered during the manufacturing process. A thin layer of metal powder is evenly spread across the bed, and then a laser is used to heat the metal powder in a desired pattern so that it melts and then cools, while the unaffected powder material can be brushed away, leaving only the newly formed layer. After each layer is formed by the laser, the powder platform is lowered and a new layer of metal powder is spread on top of the old layer. In this manner, a three-dimensional object can be formed, one layer at a time, by lowering the platform, adding a new powder layer, and then using the laser to melt the powder in the shape of a desired object volume into the new powder layer, where it then cools, consolidates into metal and bonds with the previous layer [1-4]. The major drawbacks of existing laser power sources for LAM are the lack of active and/or adaptive control of the laser beam spatiotemporal characteristics during laser energy deposition and lack of appropriate in situ sensing techniques for characterization of both stock material in front of the processing beam and melted and consolidated into metal materials inside the processing beam and the heat affected zone (HAZ), during and after LAM processing of each layer. The lack of such real-time sensing techniques prevents development and implementation of the beam control techniques including, programmable, feedforward and feedback control of LAM processes to improve productivity, repeatability and quality of LAM-built products and components [5].

It has also been found that the desired improvement of micro-structure and surface finish, mitigation of residual stress, and increase of processing speed are difficult to achieve with a single laser beam. The availability of advanced power sources and control systems disclosed herein, capable of simultaneously projecting multiple laser beams whose characteristics, such as optical power, focal spot size, pointing and steering characteristics, can be individually controlled, will create new opportunities for LAM.

Recent technology developments may indicate a trend towards examining the advantages of, and developing systems for, multi-beam controllable laser power sources for material processing and LAM. Currently, several dual-beam and four-beam laser systems adapted for laser material processing and LAM have been demonstrated [6-7]. The existing multi-beam LAM systems utilize separate optical trains for each beam composed of laser sources (100.1) that generates laser beams (100.2), beam forming (100.3), scanning (100.4), and focusing (100.5) optics. FIG. 1 illustrates a LAM system for independent processing of the stock material using N projected beams (100.6) that form focal spots (100.7) at the powder bed surface (100.8) or other point of manufacture work pieces. Additional beam combining optics (100.9) are required to LAM processing with co-located or closely located focal spots as illustrated in FIG. 2 for the case of N-beam LAM. Scaling of the existing multi-beam LAM systems as shown in FIG. 1 and FIG. 2 to include large numbers of individually controlled laser beams would require the integration of multiple optical trains similar to those shown in FIG. 1 and FIG. 2, resulting in an extremely bulky, heavy and expensive LAM system. In addition, the demonstrated multi-beam LAM systems do not include sensors for feedback control and thus cannot provide on-the-fly modification of laser beam characteristics based on work piece sensing data. The systems and methods disclosed herein offer solution to these problems.

Another major drawback of the existing LAM systems is that they are largely based on the so-called single-point-processing technique [5,9]. In the systems illustrated in FIG. 1 and FIG. 2, sharply focused projected laser beams (100.6) create highly localized (point) heat sources that are rapidly rastered (scanned) with beam scanning optics (e.g., galvo mirrors) for selective laser melting (SLM) of a stock material.

This single-point-processing LAM technique suffers from several major drawbacks:

A. A highly localized (point) heat source that is generated by a sharply focused laser beam at a powder bed or other manufacturing work piece, creates large thermal gradients in the processing material. Scanning of this point-heat source produces an elongated molten pool, which at high scanning speeds breaks into disconnected balls due to Rayleigh instability [10,11]. Both large thermal gradients and these balling effects negatively impact surface roughness, cause residual stresses and cracking in LAM, and limit productivity. Note that attempts to increase LAM productivity by using higher laser powers with faster scanning speeds could make surface finish and residual stress even worse [12];

B. In single-point processing, the laser beam spot diameter, ranging from about fifty to hundreds of microns, only marginally exceeds the characteristic powder particle size (~10-45 μm for Ti-6Al-4V alloy [13]). The result is a tiny processing volume, containing a comparatively small number of powder particles of different sizes within the volume. Since laser beam absorptivity and the material's temperature rise is dependent on particle size, any variability of the stock material inside the small processing volume leads to anisotropy in heat dissipation, variations in local temperature gradients, and strong fluid flows in the molten pool [14-16]—all major factors that directly impact the quality of LAM-produced components; and C. Processing with a single laser beam requires high-speed focal spot rastering (scanning) to avoid unacceptably long manufacturing times. This in turn results in extremely high heating rates leading to disruptions in the powder bed layer or material from evaporative flows, and from splatter due to evaporative recoil and jetting [5,16]. High heating rates also make it difficult, or even impossible, to achieve real-time sensing and control of LAM process parameters.

These drawbacks for current single-point LAM technology can be alleviated with systems and methods disclosed herein.

The most recent attempt to move beyond conventional single-point SLM is implementation of the additive manufacturing process known as Diode Area Melting (DAM) [17]. DAM uses an array of low-power individually addressable laser diode emitters for parallel stock material processing through the use of multiple laser spots. The DAM approach has several principle problems that prevents its transitioning from the current early stage lab experiments to the LAM industry. The large and highly asymmetric divergence of laser diodes results in elliptical poor-quality beams that are difficult to concentrate (focus) into a spot that has sufficient power density to cause the stock material to melt. To increase the power inside each individual laser spot, these diode stack arrays can in principle be combined. However, this multiplexing of laser sources complicates the focusing of these highly divergent beams even more [18]. In addition, the laser spot position on the powder bed surface or material cannot be individually controlled. This leads to a highly spatially non-uniform combined laser intensity with no ability to achieve adaptive spatiotemporal power shaping. The novel components, systems and methods disclosed herein offer solution to the problems discussed above as well as other problems present in conventional systems.

BRIEF DESCRIPTION OF THE DRAWINGS

The drawings and detailed description that follow are intended to be merely illustrative and are not intended to limit the scope of the invention as contemplated by the inventor.

DETAILED DESCRIPTION

The inventor has conceived of novel technology that, for the purpose of illustration, is disclosed herein as applied in the context of powder bed and other types of laser additive manufacturing (LAM) in metals also known as selective laser melting (SLM), direct deposition, wire feed, and other similar procedures. While the disclosed applications of the inventor's technology satisfy a long-felt but unmet need in the art of LAM in metals, it should be understood that the inventor's technology is not limited to being implemented in the precise manners set forth herein, but could be implemented in other manners without undue experimentation by those of ordinary skill in the art in light of this disclosure. Accordingly, the examples set forth herein should be understood as being illustrative only, and should not be treated as limiting.

AMBFA-LAM System Configuration

Figure 1:
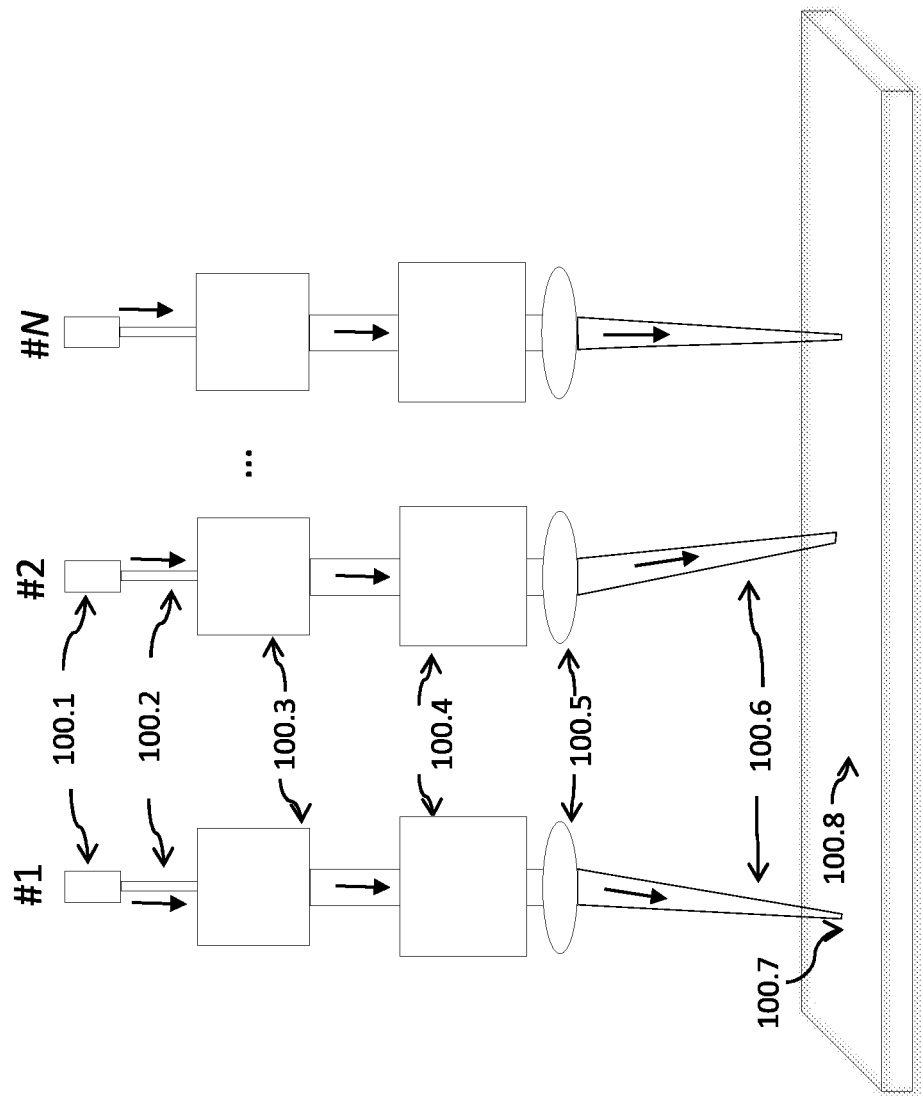
FIG. 1 is a schematic illustration of a laser additive manufacturing system that uses two or more (N=2, 3, . . . ,) projected beams with independent laser sources, beam forming, scanning and focusing optics to form focal spots at different regions of a powder bed or other work piece material surface for simultaneous fabrication of several parts.
Figure 2:
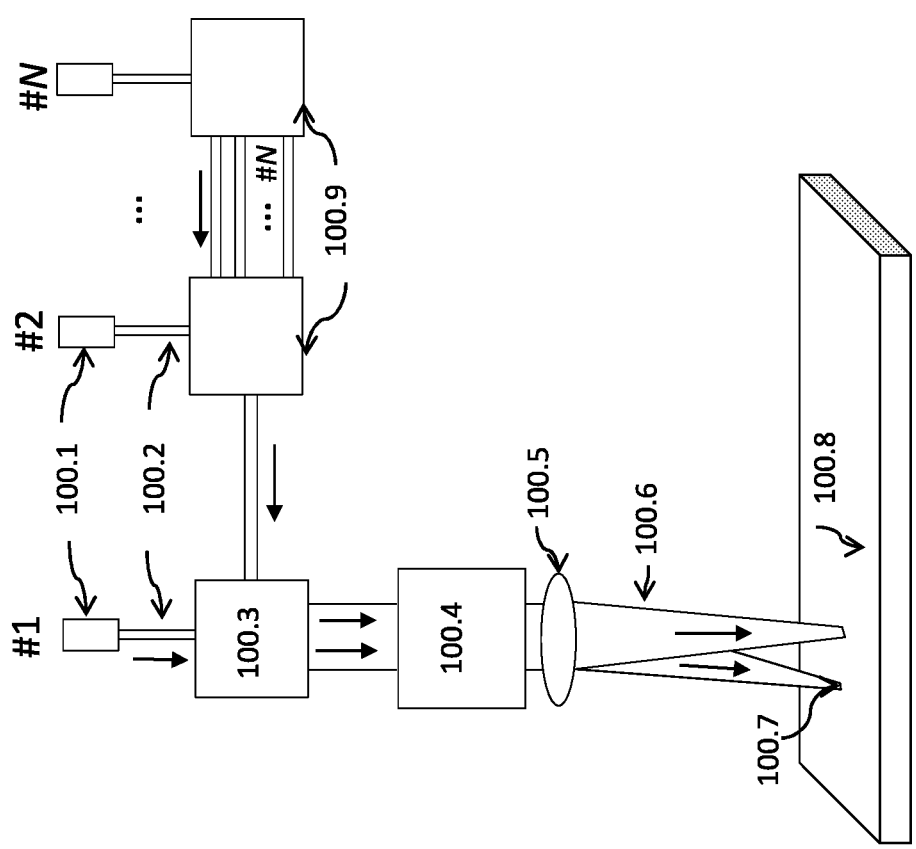
FIG. 2 is a schematic illustration of a laser additive manufacturing system that utilizes two or more (N=2, 3, . . . ,) beam combining optical systems to focus two or more (N=2, 3, . . . ,) projected beams at a powder bed or other work piece material surface.
Figure 3:
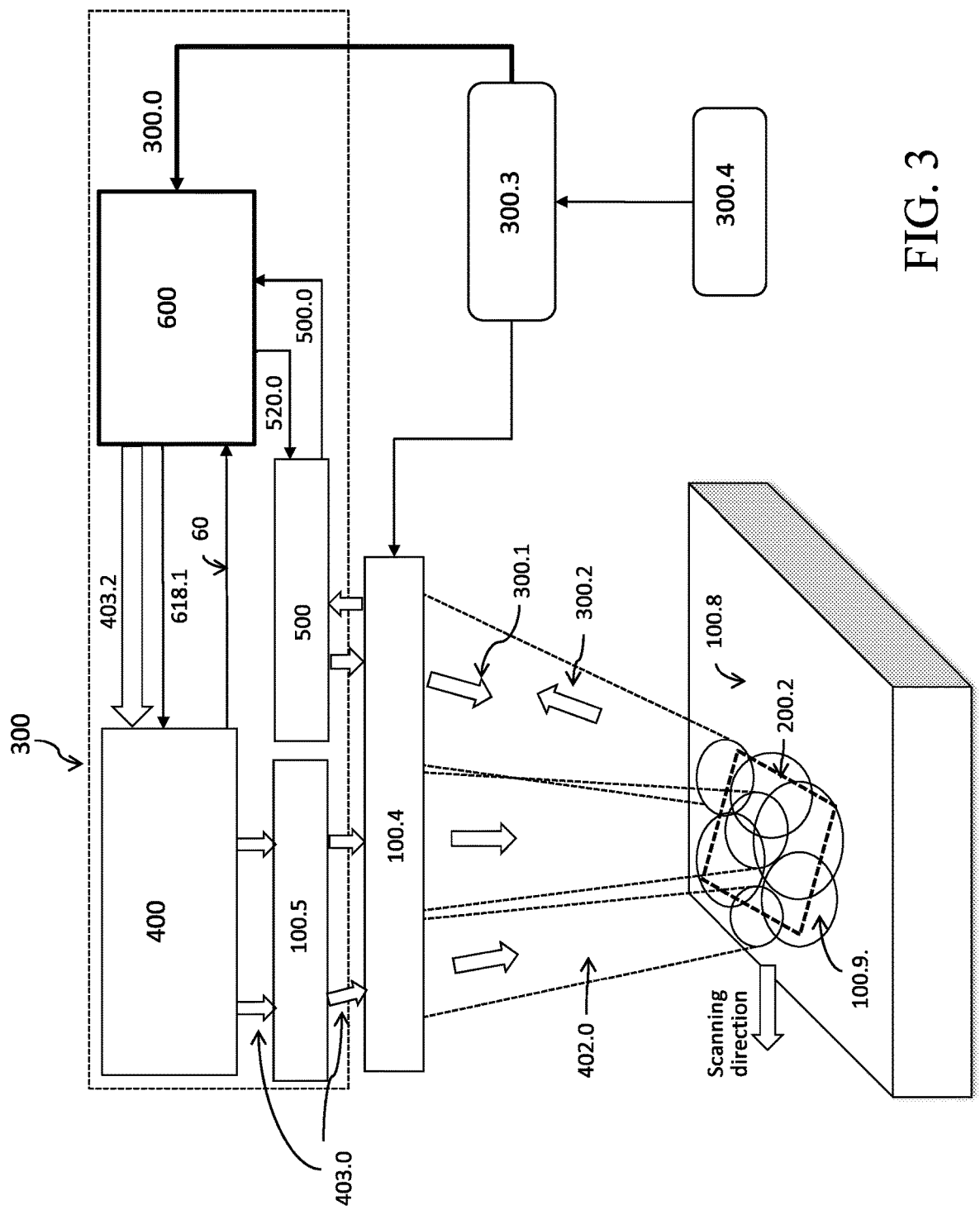
FIG. 3 is a notional schematic of an adaptive multi-beam fiber-array laser additive manufacturing system (AMBFA-LAM)
Figure 4:
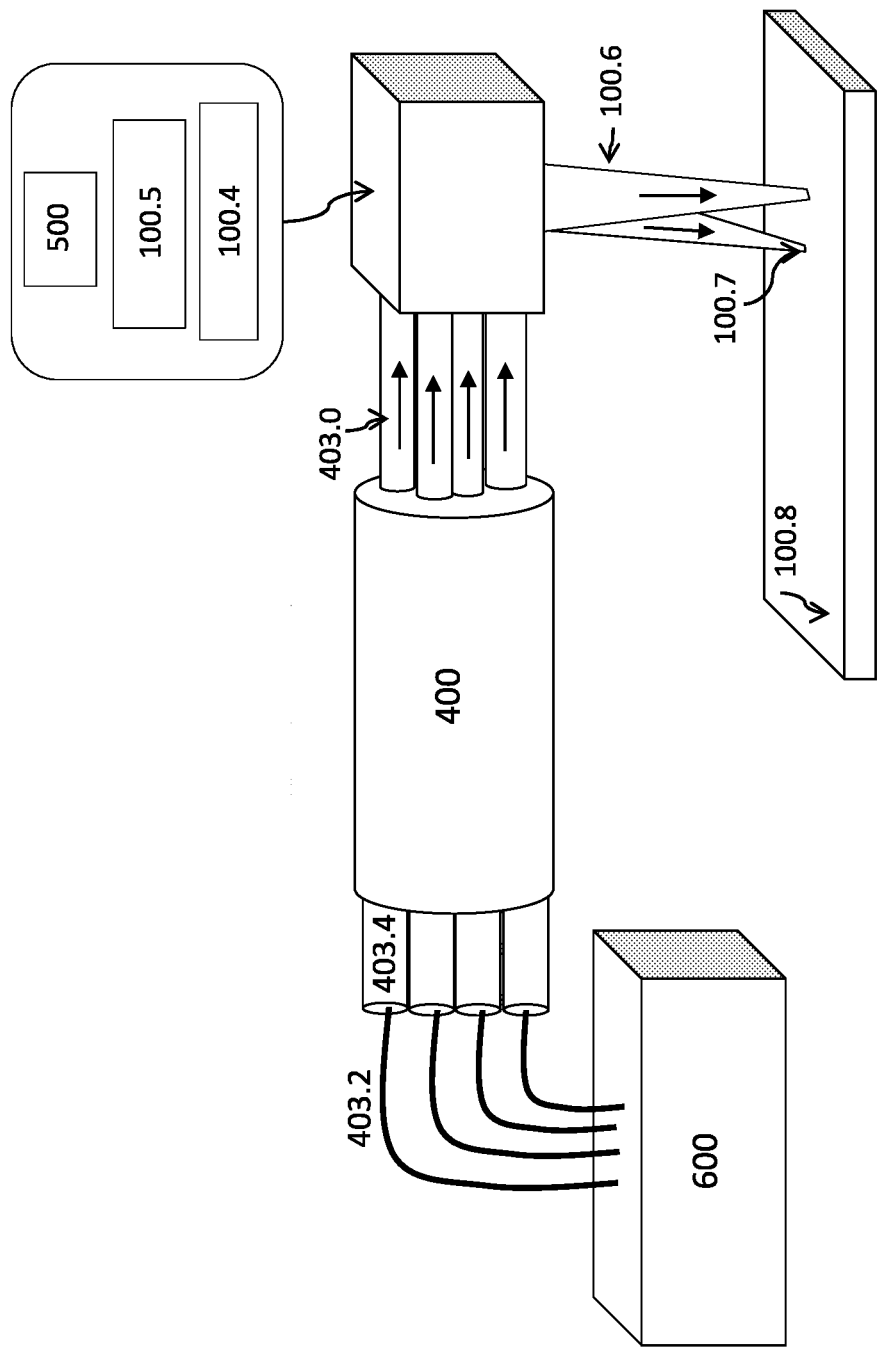
FIG. 4 is another notional schematic of an adaptive multi-beam fiber-array laser additive manufacturing system (AMBFA-LAM)

The adaptive multi-beam fiber-array laser additive manufacturing system disclosed herein, which may be referred to as AMBFA-LAM, is illustrated in FIG. 3, and a variation in FIG. 4. The AMBFA-LAM system (300), which may also be referred to as a laser transmitter module, may be self-contained within a single case, chassis, or module, or may be spread across one or more cases, modules, or devices. The AMBFA-LAM system (300) is comprised of the multi-beam fiber array laser head (400), which may also be referred to as a laser transmitter or multi-beam transmitter, that may have integrated beam pointing and/or focusing modules, beam forming optics (100.5), one or more powder bed sensing modules (500), the multi-channel optical power amplifier (MOPA) fiber system with controllers (600), beam rastering controller (300.3), and a target object definition data (300.4), which may be generated by an additive manufacturing CAD software or another source, that provides parameters for an object to be fabricated, which may also be referred to as a target object. The AMBFA-LAM system generates multiple near-diffraction-limited quality laser beams for simultaneous pre-heating, full melting and post-heating of the feedstock material on the powder bed surface (100.8). In some implementations, the AMBFA-LAM system (300) may include integrated and/or attached passive (image-based) and active (probe lasers based) powder bed sensing modules (500) which may detect backscattered probe beam light (300.2).

While FIG. 3 shows a LAM system using a powder bed type point of manufacture, it should be understood that embodiments of the technology disclosed herein may be utilized with points of manufacture other than a powder bed, and that some embodiments of this technology may rely upon a wire feed point of manufacture, or direct deposition point of manufacture. A wire feed point of manufacturer uses a wire, coil, bar, or other form of solid material that is placed at the point of manufacture and then targeted by laser beams. As the material melts, new lengths of the wire or coil may be fed into the melt zone, and the materials and lasers may be moved and adjusted as necessary to create the desired object. A direct energy deposition point of manufacture uses a nozzle or other spraying mechanism to spray powdered material into the melt zone as needed. The deposition nozzle is often mounted proximately to the laser head, and the entire assembly may be positioned and oriented as needed to create the desired object. Each of these types of manufacture, powder bed, wire feed, and direct energy deposition, have advantages and disadvantages, and each may be used in embodiments of the technology disclosed herein as may be desirable based upon such factors as desired cost, complexity, durability, environment and type of use.

While the technology described herein may use different point of manufacture types in different embodiments, for clarity, the figures and descriptions will primarily depict and describe powder bed type systems. In a powder bed application, the processing beams transmitted by the AMBFA-LAM fiber array laser head and sensing probe beams move across the powder bed surface using a beam rastering (scanning) system (100.4) based on galvo and or different type scanning mirrors, and/or high-precision x-y-positioning gantry platform. The target object definition data is comprised of the coordinates for the multi-beam position at the material surface, and a set of multiple beam parameters that define spatiotemporal distribution of laser power at the material, which may also be referred to as a beam shaping method. In a time sequence of multi-beam rastering across the powder bed surface, a target object definition data is sent to the beam rastering controller (300.3). The beam rastering controller (300.3) supplies the multi-beam position coordinates to beam rastering system (100.4) that provides positioning of the configuration of beams at the powder bed surface based on the target object definition (300.4). A subset of the target object definition data (300.0) that includes the set of multiple beam parameters defining the beam shaping method, are sent by the beam rastering controller (300.3) to the beam shaping controller (618) of the MOPA system (600) described below. The processing, receiving, and transmitting of the target object definition may be performed by one or more processors or devices, and may be performed by processors arranged and configured in various, ways. Alternative implementations will be apparent to one of ordinary skill in the art in light of the disclosure herein. For example, in one implementation, the beam rastering controller (300.3) and the beam shaping controller (618) could be the same processor, controller, or device, so that part or all of the target object definition may be provided to different methods or functions being executed on that single controller, which could then provide control signals to other devices.

Fiber Array Laser Head and Sensing Modules

In this section, we discuss the basic hardware that is used in the disclosed AMBFA-LAM systems and methods for AM in metals with a fiber array laser sources and adaptive multi-beam shaping. The disclosed selection of elements, modules and subsystems comprising the AMBFA-LAM, as well as their combination and functionalities are arranged and configured in novel ways to specifically address the needs for the adaptive beam shaping in LAM applications. As a result, the AMBFA-LAM device (300) includes a variety of innovative elements, modules, sub-systems and functionalities that are useful for metallic LAM applications.

Figure 5:
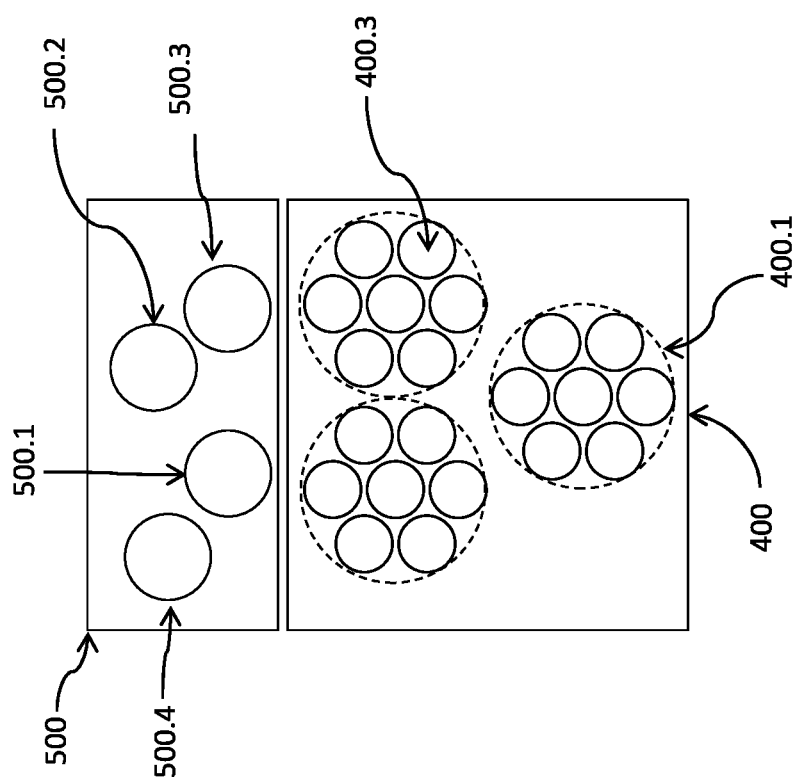
FIG. 5 is a notional schematic of multi-beam transmitter section view of an exemplary fiber array transmitter with attached optical receiver and sensing module.

The AMBFA-LAM device (300) in FIGS. 3 and 4 can be assembled having different configurations for the fiber array laser transmitter (400), also referred to as fiber array laser head, and for multi-channel optical power amplifier (MOPA) system with controllers (600). The AMBFA-LAM device (300) may also include integrated powder bed or material sensing modules (500), beam forming optics (100.5), and beam rastering (scanning) system (100.4). FIG. 5 shows a front perspective view of an exemplary fiber array transmitter device (400) with attached sensing modules (500). The fiber-array laser head (400) is used to transmit a single or multiple laser beams (403.0) that are focused into a processing region (200.2) at the powder bed surface (100.8) using the beam forming optics (100.5). The focal spots of the transmitted beams may be rastered over the powder bed surface using a beam rastering (scanning) system (100.4). As discussed above, embodiments of this technology may use wire feed or direct deposition systems instead of powder bed, in which case a beam rastering system (100.4) may be replaced or modified to move and orient a beam and wire or a beam and material deposition nozzle.

Figure 6:
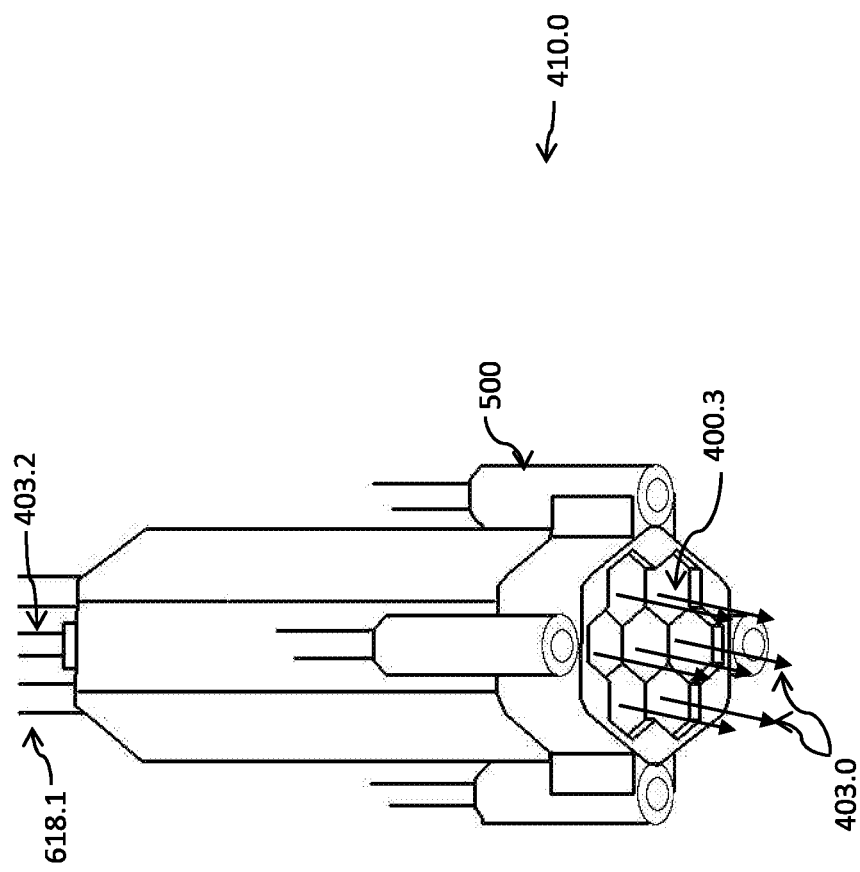
FIG. 6 is a front perspective view of an exemplary fiber array laser head system composed of seven fiber-based laser transmitters and attached four sensing modules.

The material sensing modules (500) are used for characterization of: (a) powder particles prior to LAM processing, (b) molten pool during LAM processing, and (c) consolidated into metal track immediately after processing. These material sensing modules may also provide feedforward and/or feedback control of characteristics for the projected onto powder bed surface laser beams, which can be used to improve LAM productivity and quality. The material sensing modules (500) can be integrated into the fiber array laser head or be attached to it, as illustrated in FIG. 5 and FIG. 6, or be a part of beam forming (100.5) or beam rastering (100.4) systems, or be used independently on these devices. The material sensing modules (500) may comprise one or several imaging sensors (500.4), one or more probe laser illuminators (500.1), and other components. The material sensing modules (500) may also utilize identical or different wavelengths, include one or more optical receivers (500.2), and one or more probe laser transceivers (500.3).

The fiber array laser head device (400) in FIG. 5 is shown as composed of a set of densely-packed fiber-based laser transmitters (400.3) that transmit laser beams (beamlets) used for multi-beam selective laser melting (SLM) in metallic LAM. The array of beamlets is also referred to as a combined beam [19]. The fiber-based laser transmitters (400.3) can be integrated into one or more fiber array clusters (400.1) that are constructed by using the one or more fiber-based laser transmitters, as shown in FIG. 5. While the embodiment of FIG. 5 shows a fiber array transmitter having three fiber array clusters (400.1) composed on seven densely-packed fiber-based laser transmitters (400.3), also referred to as subapertures, with the precise number of subapertures and the number of fiber array clusters being varied based upon such factors as price, desired size and capabilities of the device (400) and other factors. FIG. 6 additionally shows 3D view (410.0) of an exemplary fiber array laser head system (400) composed of a single fiber array cluster with seven densely-packed fiber-based laser transmitters. The fiber array cluster (410.0) in FIG. 6 has four sensing modules (500) attached to it.

Figure 7:
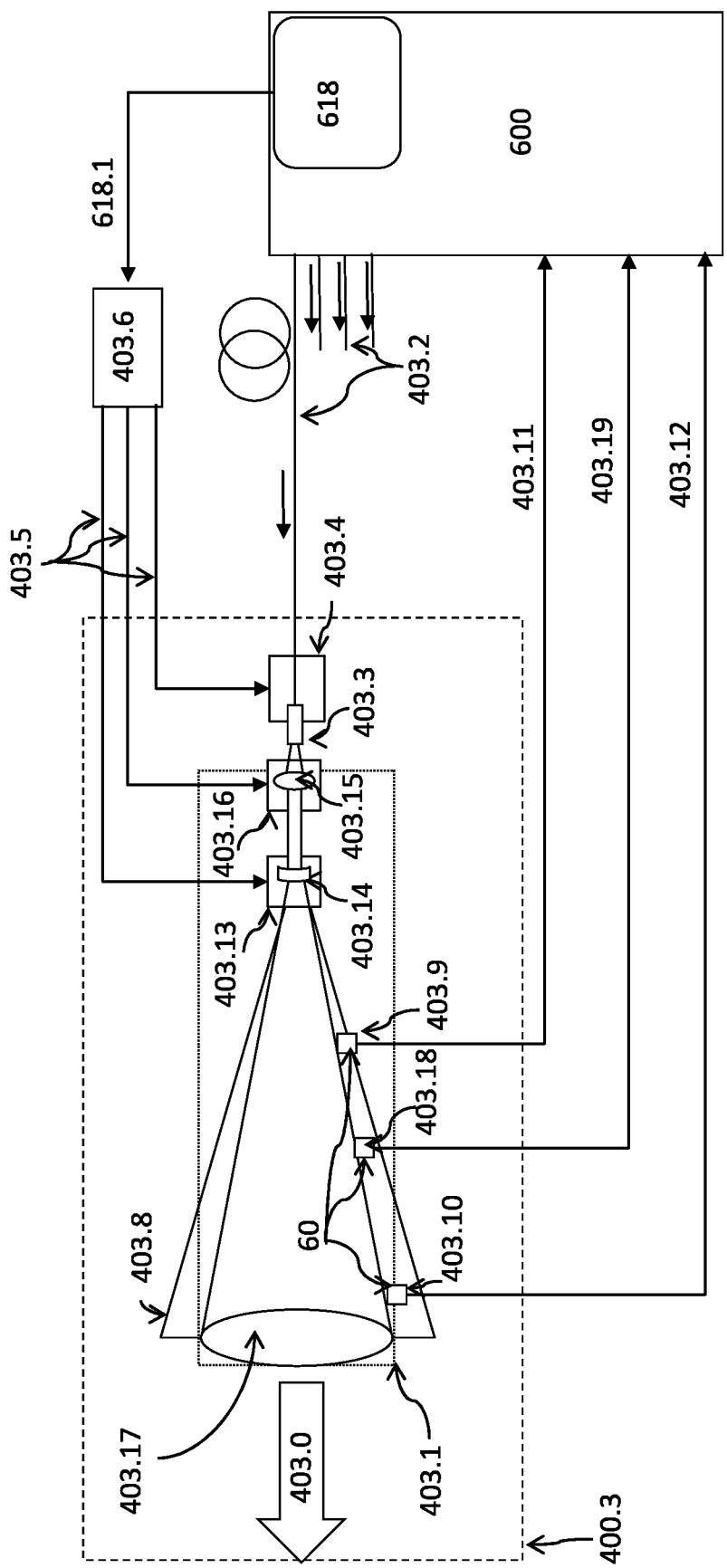
FIG. 7 is a notional schematic of an exemplary fiber-based laser transmitter module.

The embodiment of FIG. 7 shows an exemplary fiber-based laser transmitter (FBLT) module (400.3). The integrated densely packed array of the FBLT modules form the fiber-array laser head (400) for transmission of multiple beams (403.0). The FBLT module has integrated capabilities for the transmitted beam (403.0) electronic pointing and steering at the powder bed or other material surface. Additional capabilities may include the transmitted beam divergence control that allows electronic control of width for the laser beam focal spot (100.9) at the powder bed or material. The disclosed methods and algorithms for controllable shaping of laser power spatial distribution at the powder material for LAM, as described below, make use the FBLT module capabilities for the transmitted beam pointing, steering and focal spot width control.

The FBLT module may include one or more integrated sensors (403.9), (403.10), and (403.18), also referred to here as beam sensors (60), for real-time measurements of the transmitted beam polarization, piston phase and power. The output signals of polarization (403.11) and piston phase (403.12) sensors can be utilized for stabilization (locking) of polarization states (polarization locking) and piston phases (phase locking) of the transmitted by the fiber array laser head (400) multiple beams using the corresponding controllers of the MOPA system (600) as described below. The output signals (403.11), (403.12) and (403.19) are provided to the MOPA (600). Polarization and phase locking capabilities are part of the disclosed techniques for spatiotemporal control of multi-beam intensity distribution for LAM. As shown in FIG. 3, the MOPA system (600) may also be configured to provide signals (618.1) from beam shaping controllers (618), and to receive signals from beam sensors (60), which may comprise one or more of phase (403.10), polarization (403.9), and power (403.18) sensors.

The FBLT module in FIG. 7 uses a beam forming optical system (403.1) composed of a single lens or several lenses and/or mirrors. This optical system transforms the laser beam that is emitted from the tip of the delivery fiber (403.3) into an output beamlet (403.0). An exemplary beam forming system (400.3) in FIG. 7 is composed of three lenses: small size collimating (403.15) and negative (403.14) lenses, and output beam forming lens (403.17). The optical energy entering the FBLT module in the form of a single mode Gaussian-shape laser beam is delivered by the MOPA fiber system (600). To provide the capability of angular pointing and steering for the transmitted laser beam, the end piece of the delivery optical fiber (403.2) with fiber tip (403.3) may be assembled inside a fiber-tip positioning module (403.4) that can provide electronically controlled x- and y-displacements of the fiber tip in directions orthogonal to the laser beam propagation axis [20,21]. The fiber tip displacement results in angular deviation of the transmitted laser beam, and corresponding displacement of the focal spot footprint (100.9) at the powder bed or other material surface. The control of the fiber-tip x- and y-displacements is performed using electrical signals (403.5) that are generated by the controller (403.6) in response to input signals (618.1) from the beam shaping controller (618) of the MOPA system (600).

Angular steering for the transmitted laser beam can be also implemented using the disclosed lens-x/y positioning module (403.13) capable for controllable x- and y-high precision displacement of a small size negative lens (403.14)—a part of the beam forming optical system (403.1)—in directions orthogonal to laser beam propagation axis. The lens x- and y-displacements results in the outgoing beam wavefront tip and tilts leading to angular deviation of the transmitted laser beam propagation direction. The lens x-y position control is performed by applying electrical control signals (403.5) that are generated in the controller (403.6) using the input control signals (618.1) from the beam shaping controller (618) of the MOPA system (600). A portion of the beam within the beam tail area (403.8) is clipped by aperture of the beam-forming optics and used for sensing of beam characteristics with the beam sensors (60).

The FBLT module (400.3) in FIG. 7 may include additional capabilities for transmitted beam divergence control, which in turn alters the size of the focal spots projected onto the powder bed or material surface. The beam divergence control can be implemented using the disclosed lens z-positioning module (403.16) capable for controllable displacement of a small size lens (403.15) along laser beam propagation direction (along optical z-axis).

Multi-Channel Optical Power Amplifier (MOPA) Fiber System

Basic fiber-optics hardware with controllers, referred to herein as the multi-channel optical power amplifier (MOPA) fiber system, that is a part of the AMBFA-LAM device (300) is illustrated in FIGS. 3 and 4. The MOPA system (600) is used for laser power delivery to the fiber array laser head (400) and adaptive beam shaping in the described applications of metallic LAM.

Figure 8:
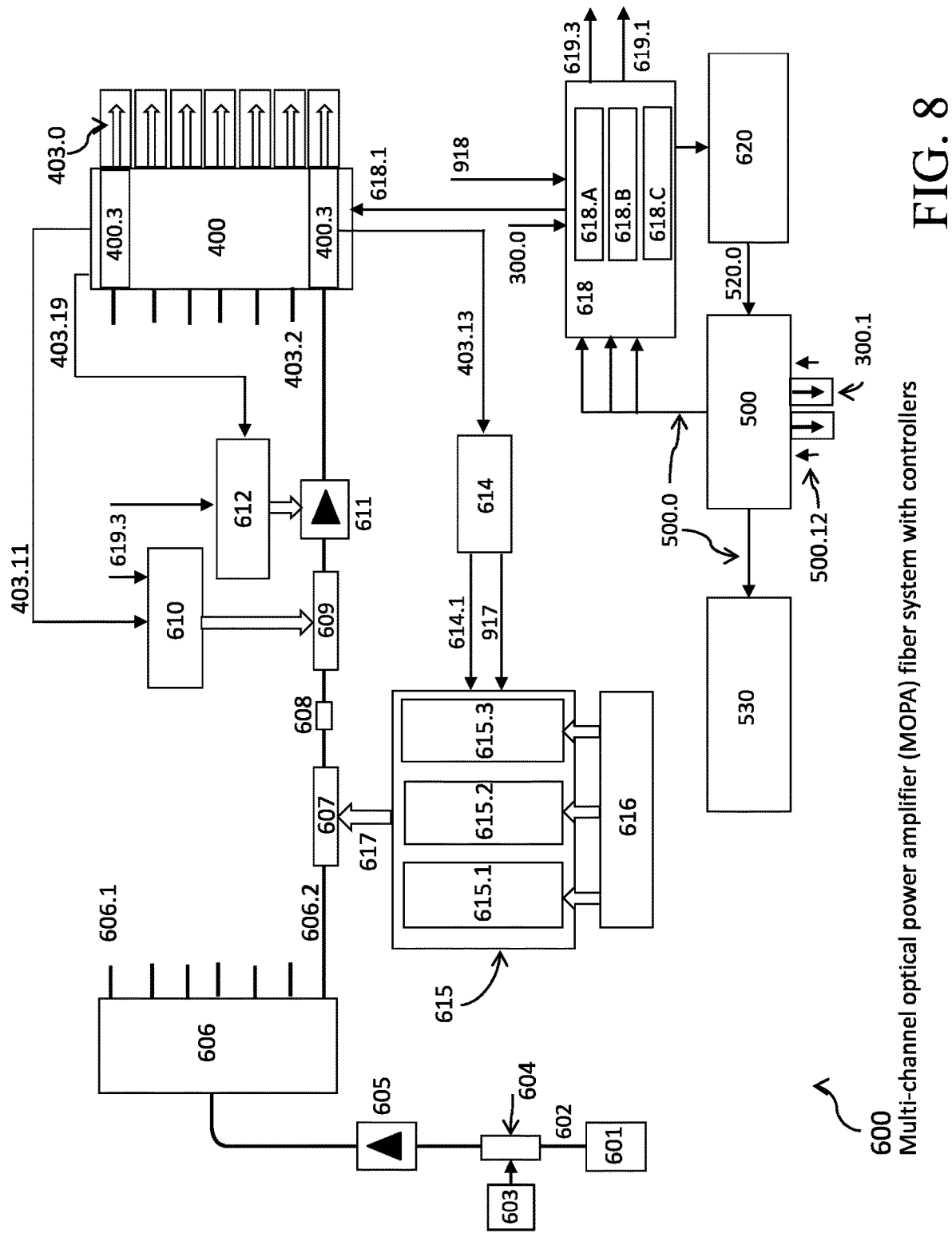
FIG. 8 is a schematic block-diagram of an exemplary multi-channel optical power amplifier (MOPA) fiber system with controllers.

The schematic of an exemplary MOPA fiber system (600) is shown in FIG. 8. The MOPA system (600) in FIG. 8 is shown as composed of the following basic modules:

A single mode narrow linewidth seed laser (601) with an optical module that provides laser beam coupling into a single mode polarization maintaining (PM) fiber (602).

The laser beam of the seed laser which is coupled into a single mode PM fiber, enters fiber splitters (606) that nearly equally divide the input beam between several (from 1 to N) single-mode PM fiber channels (606.1). The number of fiber channels (606.1) corresponds to the number of beams that are transmitted by the fiber array beam laser head (400). Prior to splitting into fiber channels (606.1) the laser beam may be amplified by a fiber pre-amplifier (605) and, in some high-optical power LAM applications, additionally phase modulated to increase linewidth and thus mitigate nonlinear effects in fibers [22]. The laser beam linewidth increase (line broadening) is performed using a special line broadening electronic module (603) that supplies high (GHz-rate) random signal to a fiber-integrated phase modulator (604) [23,24]. Note that in some implementations line broadening may not be needed and if a broad line seed laser (602) is used.

All fiber channels (606.1) of the MOPA fiber system (600) in FIG. 8 are composed of identical fiber-integrated components. For this reason, the embodiment of FIG. 8 shows only these fiber-integrated components for a single fiber channel (606.2). After splitting into N channels in the fiber splitters (606), each laser beam passes through a controllable phase shifter (607), for example, lithium niobate (LiNbO$_3$) based [23]. The phase shifters of the MOPA system introduce controllable variations (modulations) of optical path differences (OPDs) in the fiber channels (606.1). The controllable modulations of the OPDs are introduced by the piston phase controller (615) and result in the corresponding changes of the aperture-average (piston) phases of the transmitted beamlets (403.0). Control voltages (617) applied to the phase shifters (607) are generated in a piston phase controller (615) using one or another beam shaping methods as described in further details below.

Related to the adaptive beam shaping method disclosed herein, this piston phase controller may operate in the following regimes described below: phase randomization (615.1), stair-mode beam steering (615.2), phase locking (615.3), and time-multiplexing control (616). The time-multiplexing control unit (616) is used to select and/or multiplex in time the operational regimes of the piston phase controller (615).

After passing phase shifters (607), the laser beams with modulated OPDs are amplified using the power fiber amplifiers (611) and through delivery fibers (403.2) enter the array of fiber-based laser transmitters (FBLT) of the fiber array laser head assembly (400). The FBLT modules (400.3) are described above and illustrated in FIG. 7.

In the beam shaping applications for LAM that require additional control of the transmitted beams polarization states, the PM fibers are spliced with non-PM delivery fibers as shown in FIG. 8 by the fiber splice point (608). Correspondingly, in this case, the power fiber amplifiers (611) may be also based on non-PM single mode fibers. In these applications, control of the transmitted beams polarization states is performed using the polarization controllers (610), which is configured to receive signals (619.3) from the beam shaping controller (618). The control signals are applied to the polarization adjusters (609). The polarization controller (610) receives signals (403.11) from the polarization sensors (403.9). These sensors could be either external in respect to the fiber array laser system (400) or integrated into the fiber array system (400) as shown by (403.9) in FIG. 7.

Note that polarization control that results in identical polarization states for all transmitted by fiber array beams, also known as polarization locking, is commonly required in high-power (kW-class) fiber array systems that intentionally use non-PM fiber and fiber elements in the MOPA system in order to reduce non-linear effects in fibers [22]. In the MOPA fiber systems based on PM single mode or low-mode-number (LMN) PM fibers polarization locking may not be required. In the LAM applications that may not require piston phase and polarization control for beam shaping, the MOPA system (600) may be based on, or include into it non-PM fibers and fiber components and subsystems. In this MOPA system configuration, referred to as incoherent MOPA, the phase shifters (607) and polarization adjusters (609), as well as the corresponding piston phase and polarization controllers and sensors are not required. The AMBFAL-LAM system (300) with the incoherent MOPA has reduced adaptive beam shaping capabilities that may include the transmitted beamlets (403.0) electronic pointing, steering and focal spot control at the powder bed or other material surface.

AMBFA-LAM Beam Forming and Rastering Systems

Figure 9:
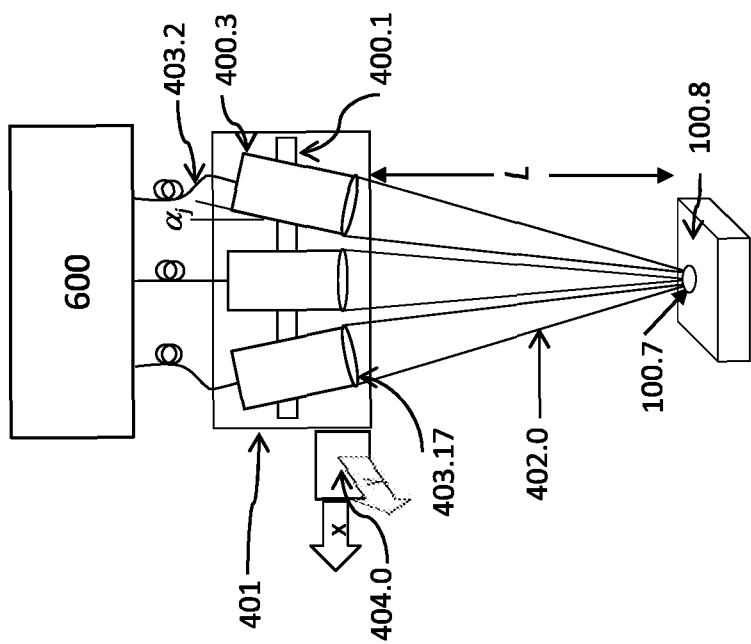
FIG. 9 is a notional schematic of an exemplary AMBFA-LAM system having a virtual lens-based fiber array laser head.

Implementing the described below configuration of the fiber array laser head device (400), referred to here as virtual lens-based fiber array laser head, and selected laser melting (SLM) method referred to as remote SLM, the AMBFAL-LAM system (300) in FIG. 3 may be used without external beam forming optics (100.5), for example, without a conventional F-theta beam focusing lens [25], and/or without conventional beam rastering (104) system, for example based on galvo scatters [26]. This virtual lens-based fiber array laser head (401) is illustrated in FIG. 9. In this illustration, the fiber array laser head (401) of the AMBFA-LAM system generates an array of focused beams whose focal spots are located at the powder bed or material surface positioned a pre-defined distance L from the laser head.

In the virtual lens-based fiber array laser head assembly (401), each fiber-based laser transmitter (FBLT) module (400.3) shown in FIG. 7 contains a beam forming optical system (403.1) that is designed to focus beamlets at a distance L from the laser head. To overlap or position the beam's focal spots in the processing region at the powder bed or material surface, the fiber based laser transmitter modules (400.3) are assembled inside a specially designed mounting holder (400.1) at pre-calculated angles $\{\alpha_j\}$ (j=1, . . . , N) that are dependent on a selected distance L to the work piece, as illustrated in FIG. 9. The virtual lens-based fiber array laser head assembly (401) centers the beams' focal spots inside a designated aim-point area of the work piece—similar to what can be achieved with a large-aperture beam forming optics (100.5) for example conventional or F-theta lens in front of the fiber array laser head (400) composed of fiber based transmitter modules (400.3) producing collimated output beams (403.0), as shown in FIG. 3 and FIG. 6.

The distance L between the virtual lens-based fiber-array laser head (401) and the powder bed surface (100.8) can be specified based on technology-driven needs, and could significantly exceed the 20-50 cm upper limit of the currently used metallic 3D printing systems that utilize conventional mirrors-based scanners, for examples scanners with galvo-mirrors [26]. The possibility for significant (three-to-five folds) increase to the distance L between the laser head and the stock material, which is achievable with the disclosed virtual lens-based fiber-array laser head device (401), without causing an unacceptable enlargement in the combined laser beam focal spot size, and without need for additional large aperture heavy and expensive beam forming optics, is highly desirable. Such extended-range (remote) LAM prevents contamination of the laser head and sensor optics by the heat and debris that are generated in the heat affected zone (HAZ) at the powder bed or material surface. Note that to keep the focal spot size unchanged with increasing the beam focusing distance L, one may proportionally increase optical aperture size of the fiber array laser head and provide locking of beamlet piston phases.

Figure 10:
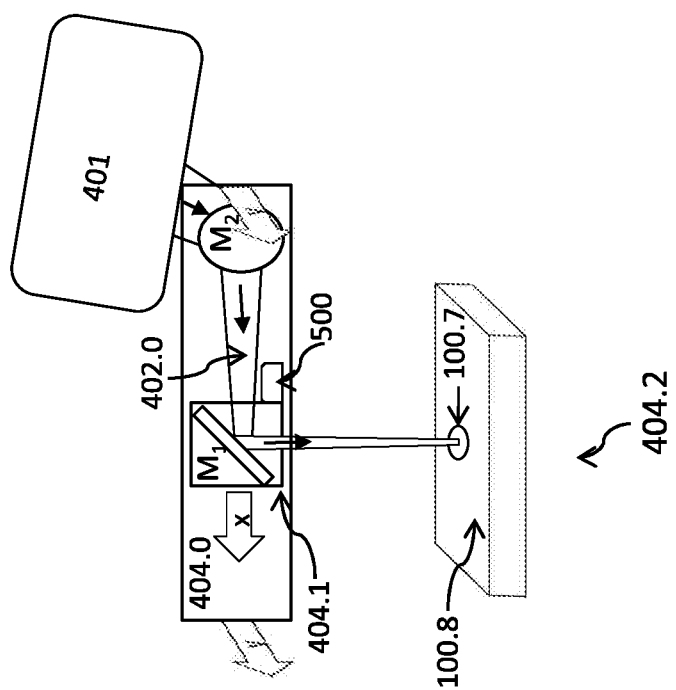
FIG. 10 is a notional schematic of an exemplary assembly of multi-beam rastering system that utilizes a virtual lens-based laser head attached to a gantry system having beam pointing mirrors and material sensing modules for multi-beam focal spot pointing at a powder bed surface or manufacture point.
Figure 11:
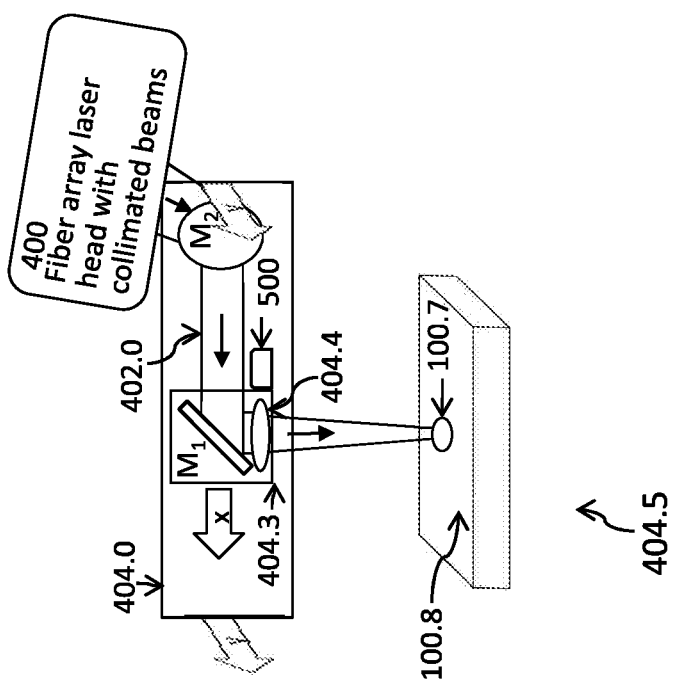
FIG. 11 is a notional schematic of an exemplary beam rastering system using a fiber array laser head with collimated beams and a gantry system with attached beam pointing mirrors and focusing lens for multi-beam focal spot pointing at a powder bed surface or manufacture point.

Having a longer distance L from the work piece additionally allows replacement of conventional mirrors-based beam rastering systems with a high-precision, high-speed x-y-gantry system (404.0) as illustrated in FIG. 9 and FIG. 10. FIG. 10 shows a beam rastering system using virtual lens-based fiber array laser head and x-y-gantry system (404.2). For the combined beam rastering at the powder bed or material surface, the virtual lens-based fiber array laser head (401) could be either directly attached to the gantry platform (404.0) and move together with it as shown in FIG. 9, or be used to illuminate a simple assembly of beam pointing mirrors attached to the x-y-gantry system as illustrated in FIG. 10, where the attached to the gantry system mirrors $M_1$ and $M_2$ provide focal spot pointing to the powder bed surface (100.8). The mirror $M_1$ is attached to the movable platform (404.1) that moves in x-direction, while both $M_1$ and $M_2$ mirrors can be independently moved in orthogonal y-direction, thus providing beam rastering. Note that since the distance L between the laser head (401) and the powder bed (100.8) varies during beam rastering, the characteristic focal spot size d is also changing. For long distance L and relatively small LAM working envelop, this undesired effect of focal spot size change is small. Otherwise, for large area LAM processing, the effect of focal spot size change can be mitigated using the corresponding controllable change of the focal distance of the fiber-based transmitters (400.3) with lens z-positioning modules (403.16) in FIG. 7. Another possible option is illustrated in FIG. 11, which shows a beam rastering system using fiber array laser head with collimated beams and x-y-gantry system (404.5). In this multi-beam rastering method the fiber array laser head (400) generates collimated beams that are focused onto the powder bed or material surface using the focusing lens (404.4). This lens is attached to the moving x-direction platform (404.3) immediately after the pointing mirror $M_1$ and moves together with this mirror.

In summary, the disclosed systems and methods for remote multi-beam laser power deposition into the powder bed or material surface with the virtual lens-based fiber array laser head and x-y-gantry platform based beam rastering system allows: (a) elimination of conventional beam forming (100.5), e.g. F-theta lens, and beam rastering (100.4), e.g., galvo-mirrors based systems, (b) increase the workspace envelope at the point of manufacture thus providing extra flexibility in LAM in manufacturing larger parts, and (c) decrease in the laser-beam-induced heat impact on both LAM-build parts and laser beam delivery optics.

AMBFA-LAM Material Sensing Systems

This section describes the disclosed here sensing methods and devices which can be used either for in situ performance characterization of the LAM process, or for feedforward and feedback control of the multi-beam parameters and spatiotemporal intensity distribution at powder bed surface or material surface, or for both. These sensing methods and systems include:

(a) methods and systems for characterization of powder particles ahead of the LAM processing beam referred to here as powder particles sensing (PPS);

(b) methods and systems for sensing of consolidated into metal powder material in the heat-affected zone behind the processing beam, referred to here as the processed-track sensing (PTS); and (c) methods and systems for molten pool characterization, referred to here as molten pool sensing (MPS).

The sensing methods disclosed are based on powder bed surface or material surface active interrogation with probe laser beams for in situ characterization of: (a) powder material ahead of the processing beam, (b) inside the processing region and (c) after material consolidation into metallic processed track. Besides the probe laser-based sensing, the AMBFA-LAM material sensing capabilities may be enhanced by passive imaging in visible, near-, middle-, and far-infrared spectral bands. The schematic of FIG. 12 illustrates the material sensing modules including: the powder particles sensing (PPS) module (500.5), molten pool sensing (MPS) module (500.6) and the processed track sensing (PTS) module (500.7).

The AMBFA-LAM material sensors utilize one or more probe beam laser illuminators (500.1), and one or more optical receivers (500.2). The sensors may operate at a wavelength that is identical or different from the processing beam (402.0).

Figure 12:
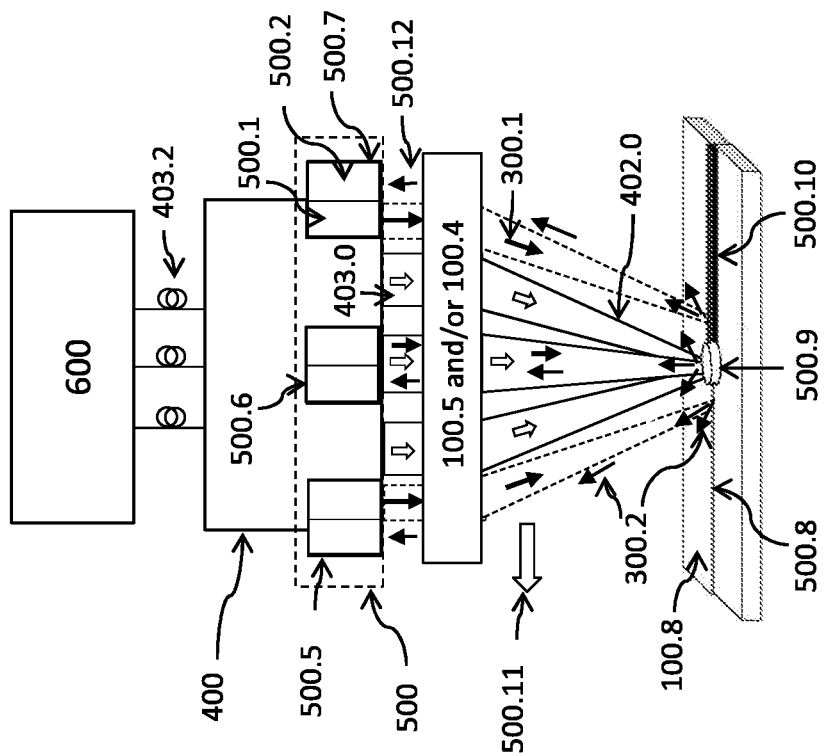
FIG. 12 is a notional schematic of an exemplary AMBFA-LAM system assembly with material sensing modules.
Figure 13:
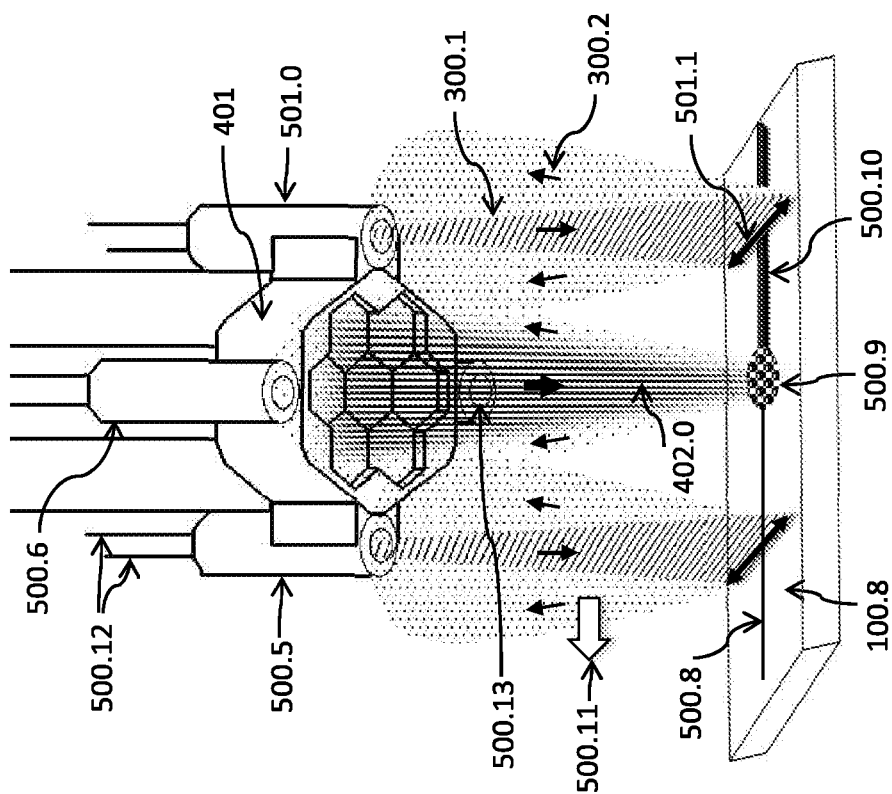
FIG. 13 is a front perspective view of an exemplary virtual lens-based fiber array laser head with material sensing modules.

Material sensing modules may be directly attached to either the fiber array laser head (400) as illustrated in FIG. 12, or to the virtual lens-based fiber array laser head (401) in FIG. 9 and FIG. 13, or may be attached to a moving platform of the x-y-gantry system (404.1) as illustrated in FIG. 10 and FIG. 11, and thus move with the processing beam (402.0) in a scanning direction (500.11) along the processing track (500.8), creating a molten pool (500.9) and leaving a consolidated into metal track (500.10) behind as the molten pool (500.9) cools, as illustrated in FIG. 12.

Figure 14:
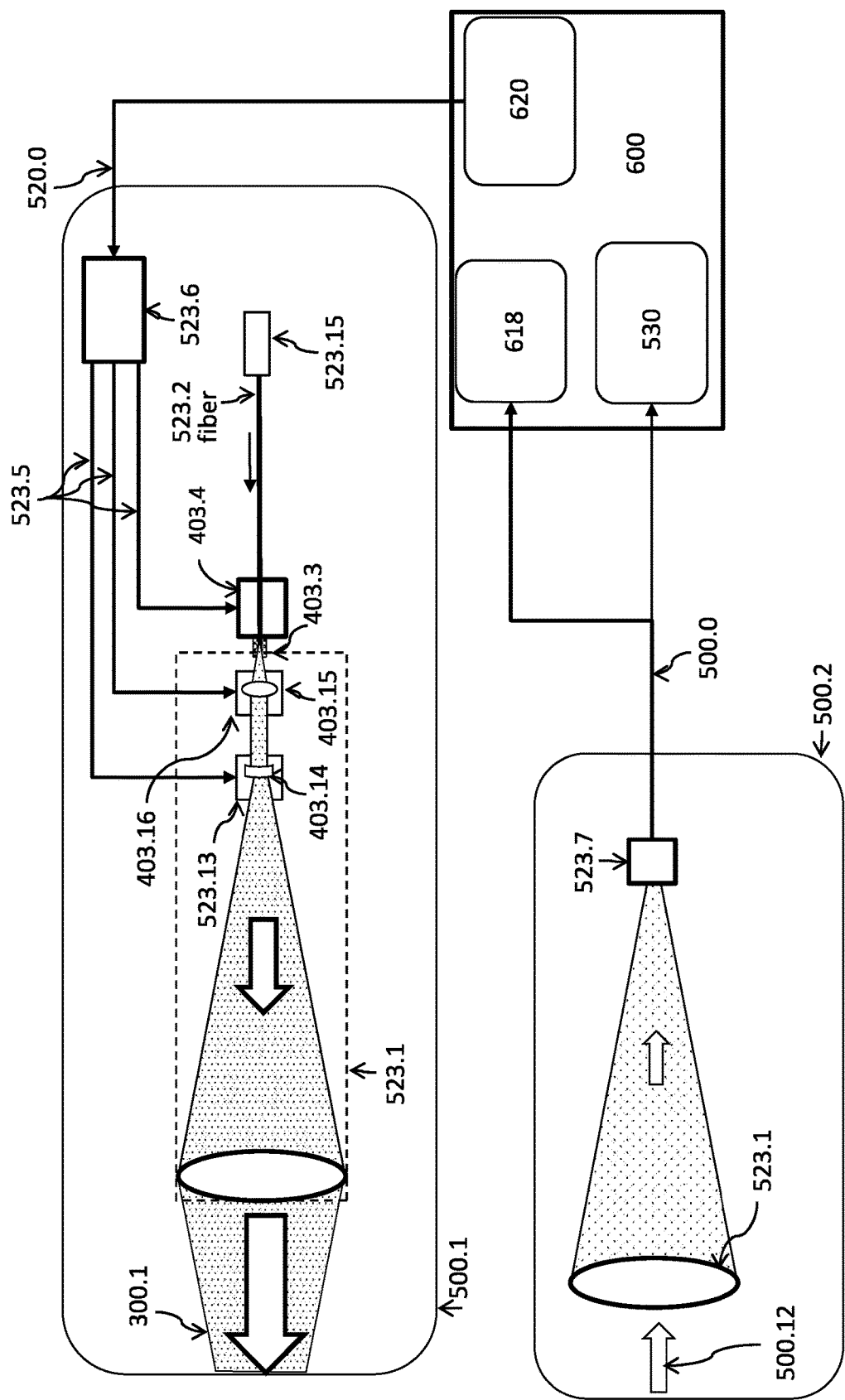
FIG. 14 is a notional schematic of an exemplary material sensing module comprising a probe beam laser illuminator and an optical receiver.

A notional schematic of a material sensing module composed of a probe beam laser illuminator (500.1) and optical receiver (500.2) is illustrated in FIG. 14. The probe beam laser illuminator (PBLI) and optical receiver may be integrated into a single probe beam laser transceiver (PBLT) device (520.3) illustrated in FIG. 15. The PBLT transmits a probe laser beam (300.1) based upon one or more probe beam signals (523.5) from a PBLI controller (523.6), and receives the backscattered light (500.12). The disclosed sensors based on probe beam laser transceivers are discussed below.

The schematic of an exemplary virtual lens-based fiber array laser head (401) with attached sensing modules is shown in FIG. 13. The sensing modules include: powder particles sensor (500.5), processed-track sensor (501.0) and molten pool sensor (500.6). Both the powder particle sensor (PPS) and processed-track sensor (PTS) are based on probe beam laser transceivers (520.3) illustrated in FIG. 15, while the molten pool sensor (MPS) includes both the optical (500.2) and the speckle-imaging receiver (500.13) devices illustrated in FIG. 13 and FIG. 14 and described below.

The schematic of FIG. 14 illustrates a material sensing module composed of the probe beam laser illuminator (500.1) and optical receiver (500.2). This material sensor may be used as a powder particles sensor (500.5), a molten pool sensor (500.6), a processed track sensor (500.7), or any combination thereof. Note that these material sensing modules may be also based on the probe beam laser transceiver (520.3) illustrated in FIG. 15 and described below.

The optical schematic and functionalities of the PBLI device (500.1) in FIG. 14 are similar to the fiber-based laser transmitter (400.3) described above and depicted in FIG. 7. The PBLI device uses a single-mode probe beam laser (523.15) that couples laser beam into a single-mode fiber (523.2). The beam coupled into the fiber is delivered to the fiber tip (403.3) that is installed inside a fiber-tip x-y-positioner module (403.4) described above. The PBLI beam forming system (523.1) provides a scaled in size image of the fiber-tip at the material surface, resulting in formation of a probe beam focal spot at the manufacture material. The probe beam focal spot size may be, for example, on the order of magnitude or smaller than the processing beam focal spot. The fiber-tip positioner module (403.4) in the PBLI device (500.1) is used to: (a) center the probe beam focal spot along processing beam track (along processing contour LAM-build part) with a pre-set offset distance in respect to the processing beam focal spot and, (b) rapidly (several kHz speed) scan the probe beam focal spot in a direction orthogonal to the track line direction (501.1) as illustrated in FIG. 13. The offset distance between the focal spots of processing and probe beams, and scanning speed are set by the controller of the powder bed sensors (620) shown in FIG. 14 and FIG. 8. The PBLI device (500.1) may include additional capability for controlling size of the probe beam focal spot using the lens z-positioning module (403.16), similar the described fiber-based laser transmitter (FBLT) module in FIG. 7. The focal spot scanning may also be performed using a lens x/y-positioning module (523.13) also shown in both FIG. 14 and FIG. 7, and described above.

The material sensing module in FIG. 14 includes an optical receiver (500.2) composed of receiver optics (523.1), for example a lens, and photo-detector (523.7). The optical receiver (500.2) that measures power and other characteristics of the backscattered light (500.12) within the receiver optics entrance aperture, is referred to here as the power-in-the-bucket (PIB) optical receiver. Another optical receiver type, that could be used in the powder bed sensing modules, is referred to here as speckle-imaging receiver (SIR). In the speckle-imaging type optical receiver, an imaging photo-array is used instead of the photo-detector (523.7). The receiver optics (523.1) of the SIR type device is designed to provide a scaled image of backscattered speckle field at a selected distance $L_{sp}$ between the material surface and the entrance aperture of the receiver optics (523.1). Note, that in the case of the molten pool sensor (MPS) operating at the processing beam wavelength, the probe beam laser illuminator is not required. Optical receivers of such MPS devices, either PIB or SIR or both, use backscattered light of the processing beam, as illustrated in FIG. 13 by the molten-pool PIB (500.6) and speckle-imaging (500.13) receivers. For better signal-to-noise ratio the optical receiver (500.2) may include a bandpass filter (not shown) tuned to optical wavelength of the probe beam laser illuminator.

Figure 15:
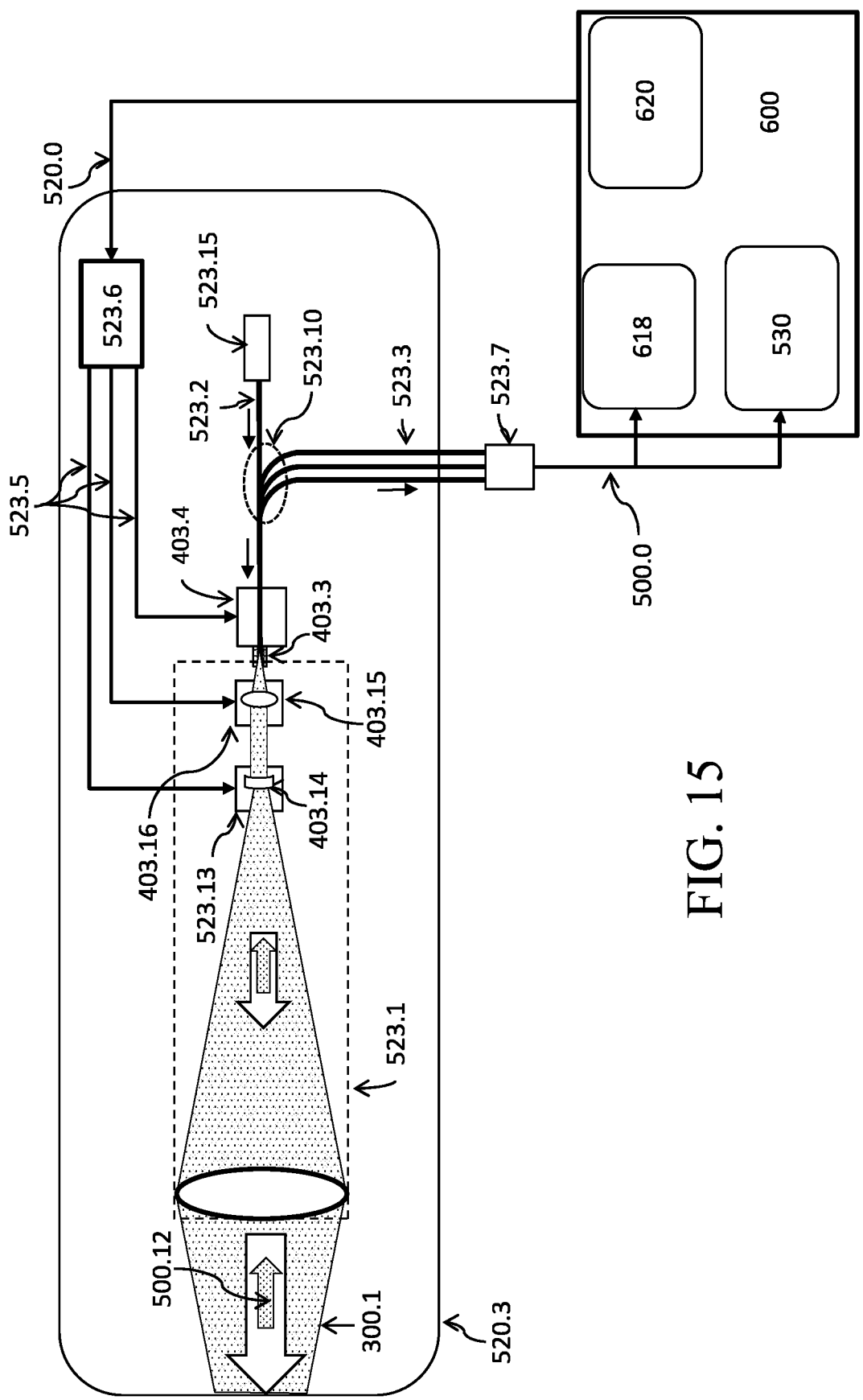
FIG. 15 is a notional schematic of an exemplary probe beam laser transceiver (PBLT) sensor.

The probe beam laser transceiver (PBLT) sensor (520.3) disclosed here and illustrated in FIG. 15, combines functions of the probe beam laser illuminator and the power-in-the-bucket receiver. The PBLT sensor (520.3) is based on a multi-core fiber (MCF) instead of a conventional single-core fiber, as in the probe beam laser illuminator (500.1) in FIG. 14. The MCF has a central fiber core and one or several peripheral fiber cores. The tapered multicore-fiber connector (523.10) guides light from each fiber core of individual fibers, referred to as received fibers (523.3). A probe laser beam is coupled into the center core of the MCF and after passing the PBLT beam forming optical system (523.1) creates a probe beam focal spot on the material surface. The light scattered off the material surface propagates back to the PBLT sensor aperture. A portion of the backscattered light is coupled into the MCF peripheral cores and delivered to the photo-detector(s) (5.23.7) through the tapered multicore-fiber connector (523.10) and the received fibers (523.3). The photo-currents registered by the photo-detectors are combined, and the corresponding signal (500.0) is delivered to the beam shaping controller (618) and/or the sensing data collection and analysis module (530) of the MOPA system (600). The MOPA system (600) may also provide one or more control signals (520.0) to the powder bed sensing modules (500).

Methods of LAM Process Characterization and Control Based on Material Sensing

In the material sensing methods disclosed, the focal spots of the probe and processing beams travel together with a constant offset distance between them. This allows real-time characterization of powder particles, molten pool and the processed track throughout the entire manufacturing process.

Analysis of the received signal from the PBLT sensor (520.3) that is used as the powder particles sensor (PPS) provides in situ information about stock material properties (e.g. powder particle absorbability, size distribution, and packing density) directly ahead of the processing beam.

Similarly, analysis of the signal registered by the PBLT sensor (520.3) that is used as processed-track sensor (PTS) can be utilized to characterize the post-processed region.

Similarly, analysis of the signal registered by the PBLT sensor (520.3) that is used as molten pool sensor (MPS) can be utilized to characterize the molten poll region. Note that the MPS device may operate with wavelength different from the processing beam. The output signals of the PBLT sensors can be utilized for feedforward control of the main beam.

In the material sensing method disclosed here, the PBLT sensor (520.3) may operate as a confocal microscope and provide live streaming imagery of a small region on the material surface along the processing track, ahead, inside and behind the processing beam. In the confocal imaging operational regime, the probe beam focal spot is continuously scanning in a direction orthogonal to the processing part counter direction, as illustrated in FIG. 13. With a scanning speed significantly exceeding the processing beam velocity, the PBLT can record a continuous stream of line-scan images of the material surface ahead, inside, behind, or any combination thereof, in relation to the processing beam.

LAM process characterization and adaptive beam shaping using the disclosed method may be based on analysis of statistical characteristics of the backscattered probe light. Statistical characteristics of the probe beam light scattered off material surfaces depend on microstructure and roughness of the illuminated powder particles, on molten pool surface properties, and on characteristics of the metallic surface of the processed track. These backscattered light characteristics, as measured by the material sensors, could be used for LAM process characterization and adaptive beam shaping.

Disclosed herein is a method for in situ characterization of materials consolidated into a metal track during LAM process using analysis of the probe laser beam scattering off the material. The disclosed sensing method may also be used for the LAM process parameter optimization and feedforward control. In this method for the processed track characterization the appearance of balling defects in the consolidated metal is indicated by the presence of relatively low frequency and deep fluctuations in the received signal, while an increase in number of not fully melted, sintered powder particles and/or material porosity could be seen via a general decrease in the received signal average value. This, received from the material sensor data, can be utilized for feedforward and feedback control and optimization of LAM parameters during manufacturing process.

Also disclosed herein is a method for molten pool characterization during the powder bed metallic SLM with the described material sensors. Under ideal (desired) LAM processing conditions, the molten pool is spatially uniform (doesn't contain disconnected balls), occupies the largest possible (for fixed total laser power) area inside the combined multi-beam footprint, and doesn't have evaporative flows and splatters. For these ideal conditions, the largest portion of power of the backscattered probe laser light is reflected from the molten pool, which behaves as a mirror surface. For a probe beam slightly tilted with respect to the axis that is orthogonal to the material surface, the light reflected from the molten pool misses the PIB type optical receiver, resulting in a low PIB metric value. The appearance of inhomogeneities inside this "perfect" molten pool, regardless of their cause (fluid flows, balling defects, splatter, etc.), will result in a decrease of the mirror-reflected backscatter light component and wide-angle light scattering off these inhomogeneities. This, in turn, will cause a corresponding increase in the registered PIB signal. Similarly, if the molten pool is too small and/or the beam footprint on the material surface covers a significant portion of non-consolidated into metal powder or sintered particles, light scattering off these particles will result in a larger PIB metric signal value.

These physics-based considerations suggest that minimization of the registered PIB metric signal with feedback control of the beam shaping parameters described below could result in the formation of a smooth optimally sized molten pool and thus high-quality LAM-produced parts. Note that due to the finite response time of metallurgical processes on the control system-induced changes in the laser beam intensity distribution, adaptive beam shaping may be based on minimization of the time-averaged PIB metric signal.

The molten pool formed during the described adaptive beam shaping process based on PIB metric minimization may be consolidated into a shape that is not optimal or even acceptable from the view point of high-quality part manufacturing. Certain constraints on the control parameters can be additionally imposed to keep the molten pool within a desired shape (e.g., a rectangle elongated along the processing direction). These constraints may include limitations on the possible deviation of the control parameters from the pre-selected values. Thus, monitoring of the PIB signal of the molten pool sensor offers a method disclosed here for in situ the molten pool characterization and real-time LAM process optimization via feedforward and/or feedback control of multi-beam intensity distribution.

AMBFA-LAM Capabilities and Methods for Spatiotemporal Beam Shaping

Capabilities of AMBFA-LAM device (300) for control of laser power spatiotemporal distribution at the material surface—also referred to as beam shaping—may include:

(a) Control of the projected to power bead surface, or other point of manufacture, beams powers $\{p_j\}$ using the beam power controller (612), which is configured to receive either signals (403.19) from power sensors or/and signals (619.3) from the beam shaping controller (618), of the MOPA system in FIG. 8, where j=1, ..., N and N is the number of beams transmitted by the fiber array laser head (400);

(b) Control of centroid coordinates $\{r_j\}$, of the focal spot footprints (100.9) using either fiber tip x/y positioner (403.4), or/and the lens x/y positioner (403.13) modules of the fiber based laser transmitter (400.3) device in FIG. 7, and the beam shaping controller (618) of the MOPA system, where $r_j$ is a 2D vector describing the jth focal spot centroid location at the material surface;

(c) Control of radii $\{a_j\}$ of the focal spots (100.9) using the lens z-positioner (403.16) module integrated into the fiber based laser transmitter (400.3);

(d) Control of steering parameters of focal spots including steering amplitudes $\{s_j\}$, angular direction vectors $\{\theta_j\}$, and frequencies $\{\omega_j\}$, using either fiber tip x/y positioner (403.4), or/and the lens x/y positioner (403.13) modules of the fiber based laser transmitter (400.3) device, and the beam shaping controller (618) of the MOPA system;

(e) Control of polarization states of processing beams e.g. control of angular vectors $\{m_j\}$ of linearly polarized beams, using polarization adjusters (609), signals from polarization sensors (403.11) and polarization controller (610) of the MOPA system (600); and (f) Control of piston phases of the transmitted beams using the piston phase controller (615), metric signal (614.1) and/or signal from photo-detector (916) and phase shifters (607) of the MOPA system (600).

To simplify notations the set of control parameters that are used for beam shaping are denoted here as $\{u_m\}$, where m=1, ..., M, and M is the total number of controls utilized for a particular beam shaping task. Note that dependent on the AMBFA-LAM device (300) configuration and beam shaping needs the control capabilities may include all [(a) through (e)] the described above options, or be limited by a selected set of them.

Figure 16:
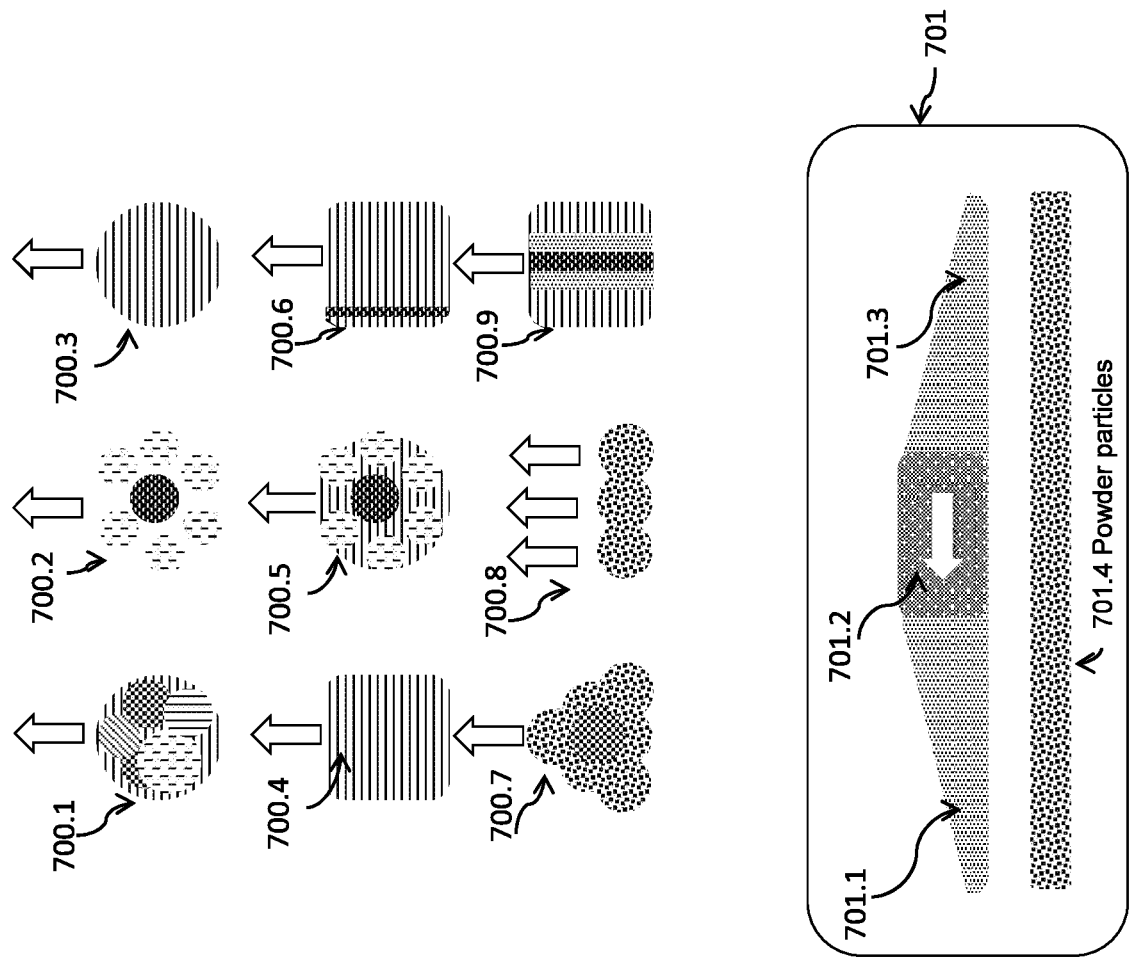
FIG. 16 is a diagram view showing a variety of exemplary beam shaping methods that an AMBFA-LAM device is capable of performing.

The disclosed beam shaping methods of the AMBFA-LAM device (300) are illustrated in FIG. 16. They include but are not limited by:

A. Incoherent combining with overlapping of all or several multiple beams that could be achieved by controlling of the processing beams focal spot centroids $\{r_j\}$. This beam shaping method is illustrated by the drawing (700.1) in FIG. 16;

B. Multi-beam phasing (also referred to as coherent combining) leading to the reduction of focal spot size and corresponding increase of power density at the work piece. Analysis has shown that phasing of N beams of the AMBFA-LAM laser source could result in an approximately N-fold increase of focal spot peak intensity at the material surface [22]. The drawings (700.1) and (700.2) in FIG. 16 illustrate the processing beam focal spots at the material surface with incoherent, also known as non-phased (700.1), and coherent, also referred to as phased (700.2), combinations of seven beams. Note that multi-beam phasing results in the appearance of side-lobes located a distance from the processing beam central-lobe as shown in the drawing (700.2). These, located outside melting pool side-lobes can play the role of probe beams that could be used as probe beams for sensing of the material. The coherent combining of beams could be achieved using output signals (403.13) of the phase sensors (403.12) that may be integrate into fiber-based transmitter modules (400.3) of fiber array laser head (400) as illustrated in FIG. 7, or may be located along the optical train of transmitted laser beams (403.0), or both. The output signals of the phase sensors (403.12) are utilized by metric processor (614) that computes metric signal (614.1) characterizing deviations of piston phases from the desired phase locking condition values. Using the metric signal, the phase locking controller (615.3) computes the control signals (617) applied to the phase shifters (607) of the MOPA system (600) illustrated in FIG. 8. The control signals are generated via optimization of the metric signal (614.1) or signal (917) from photo-detector (916) that plays a role of metric signal, using one or another piston phase control algorithms, e.g. stochastic parallel gradient descent (SPGD) [27, 28], multi-dithering [29], or LOCSET [30]. The exemplary piston phase sensing techniques and multi-beam phasing control algorithms that may be used in the MOPA system (600) are described in [31]. The multi-beam phasing may be used for high resolution LAM processing of a component's contours to improve surface finish;

C. Controllable randomization of the multi-beam piston phases resulting in improved laser power spatial uniformity inside the combined focal spot. Overlapping of the processing multi-beam focal spots (incoherent combining) at the material surface may lead to random spatial and temporal variations of the intensity caused by interference effects. In the disclosed multi-beam phase randomization method, these parasitic interference effects of multi-beam LAM processing could be mitigated using fast (MHz-to GHz rate) randomization of piston phases of the transmitted by the fiber array laser head (400) beams (403.0). The piston phase randomization is performed using the phase randomization controller (615.1) of the MOPA system illustrated in FIG. 8, which generates rapidly updating sequences of random piston phases. The piston phase randomization leads to mitigation of interference effects and corresponding improvement of spatial uniformity of laser energy deposition on the work piece. This AMBFA-LAM system with piston phase randomization operational regime is illustrated by the drawing (700.3) in FIG. 16. The beam shaping using randomization of piston phases of multi-beams could reduce cooling and heating rate and improve quality of LAM-produced parts or components;

D. Control of spatial distribution of the laser power density at material surface using stair-mode beam scanning technique. The focal spot of the coherently combined beam can be scanned at high (tens of MHz) speed by synchronous control of piston phases in the stair-mode operational regime [32]. The disclosed stair-mode beam shaping method for LAM could be implemented using the stair-mode beam steering controller (615.2) of the MOPA system (600). In the LAM applications, the stair-mode electronic beam scanning could, for example, be used for the generation of an enlarged square-shape focal spot with a nearly uniform intensity distribution. This beam shaping method using 2D stair-mode beam scanning is illustrated by drawing (700.4) in FIG. 16. The stair-mode beam shaping may be used to control heating and cooling rate resulting in microstructure and material mechanical properties modification, improve the surface finish for additive manufacturing products;

E. Superposition of highly localized beam for material melting and wide beam for surface treatment using the disclosed time-multiplexing beam shaping method that provides fast (>100 kHz) switching between coherent and incoherent beam combining operational regimes. The time-multiplexing results in fast oscillation of focal spots corresponding to incoherent and coherent beam combining. On the time scale typical for LAM metallurgical transformations, this time-multiplexing of laser beam intensity distribution produces the same result as simultaneous laser energy deposition using two beams with different focal spot diameters. The coherently combined (smaller diameter) beam (701.2) can be used for molten pool formation, while the second (larger diameter) beam (701.1) can be utilized for the powder particles pre-heat and for slowing cooling process of the molten pool consolidation into metal. By controlling the time duration of coherent and incoherent beam combining, any desired ratio of laser power can be distributed between the processing (melting) beam and the beam power used for surface treatment in vicinity of the melting pool. This beam shaping method is illustrated by the drawing (700.5) in FIG. 16. The time-multiplexing laser power deposition beam shaping method can be also applied to other spatiotemporal multi-beam control operational regimes. The drawing (700.6) in FIG. 16 illustrates intensity distribution obtained via time multiplexing between vertical line scanning of one or more overlapping beams and the stair-mode 2D scanning of other beams.

F. Powder material melting with simultaneous pre-heat of the powder particles and annealing of the consolidated into metal material can be achieved by the disclosed beam shaping method of controlling multi-beam focal spot centroid coordinates $\{r_j\}$, and/or radii $\{a_j\}$, and/or powers $\{p_j\}$, and/or beams steering parameters $\{s_j\}$, $\{\theta_j\}$, and $\{\omega_j\}$. The drawings (700.7), (700.8) and (700.9) in FIG. 16 give examples of this beam shaping method including: (a) multiple beams in triangle shape (700.7) for pre-heating, and cooling rate control; (b) the multiple beams in line (700.8) for faster LAM processing and productivity increase and for control of cooling and heating rate; (c) the ramp-shape intensity distribution illustrated by the drawings (700.9) and (701). This shape of beam can be obtained using various beam shaping techniques disclosed, e.g. by scanning of multiple beams with their partial overlapping. In ramp-shape beam gradual intensity increase is used for pre-heating, high uniform power density for melting, and gradual intensity decrease for molten pool cooling.

Figure 17:
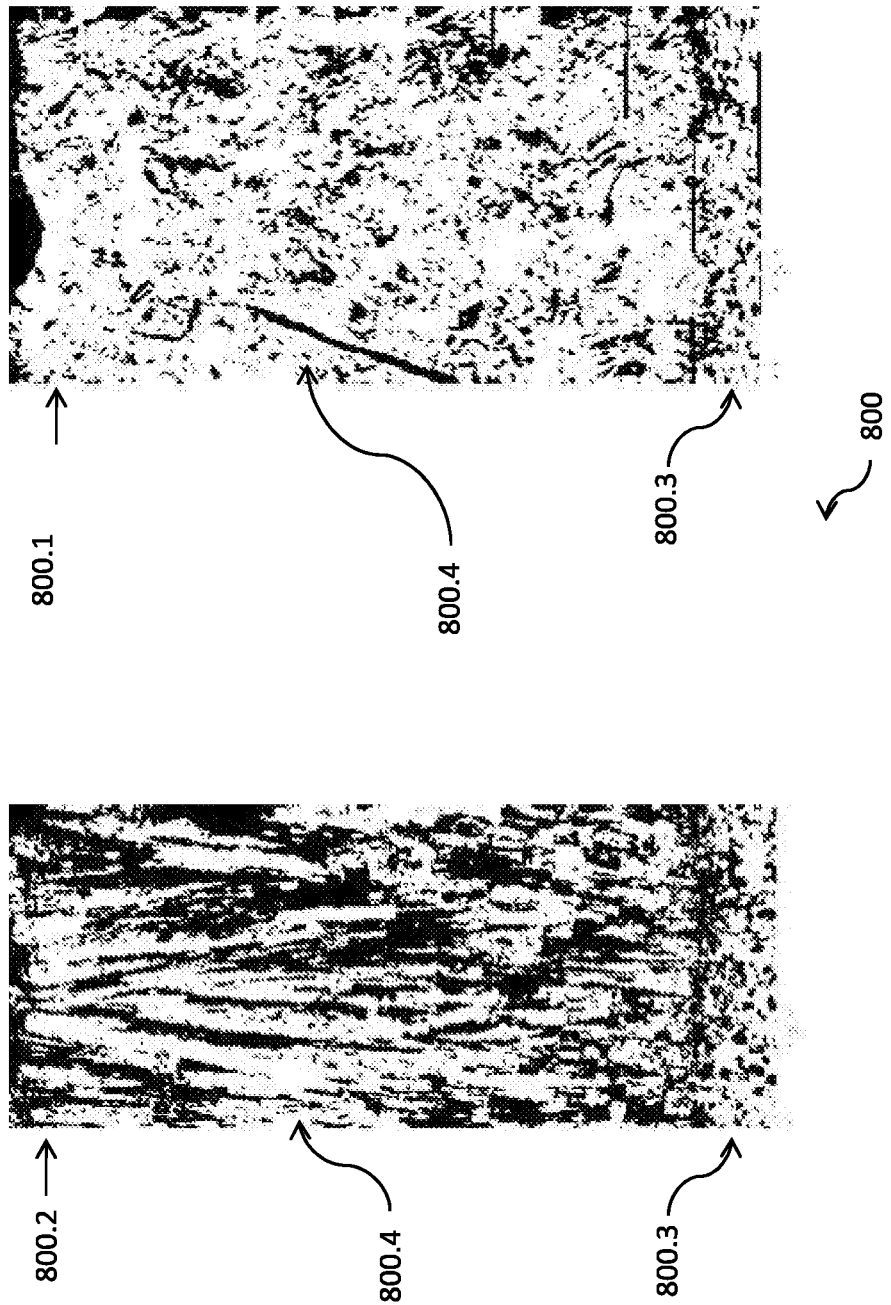
FIG. 17 is a visualization of experimental evidence of material microstructure control using 7-beam AMBFA-LAM system that utilizes beam shaping methods of FIG. 16 showing distinct difference in material microstructure between the results obtained with conventional single-beam SLM processing method (left) and using multi-beam SLM processing (right)

The disclosed beam shaping methods leading to powder material melting with simultaneous pre-heat of the powder particles and/or annealing of the consolidated into metal material could be utilized for control of the material microstructure and can be used for engineering of LAM-produced parts with space-varying material micro-structure and mechanical properties. The experimental evidence of distinct difference in controlling the growth of gamma grain of IN718 alloy on the base plate (800.3) with SLM processing of powder material using the disclosed methods of beam shaping is illustrated in FIG. 17. The electron backscatter diffraction (EBSD) inverse pole figure (IPF) maps (800) obtained with scanning electron microscope show radically different the columnar microstructure in two samples, one (800.1) processed using conventional SLM method and the second (800.2) using beam shaping with seven beams in square shape. Note the small equiaxed grains in the IPF map (800.2) compared to the very large gamma-type grain structure of the deposited material (800.4) on the IN718 baseplate (800.3) in the IPF map (800.1).

The results in FIG. 17 were obtained using an exemplary prototype of the disclosed AMBFA-LAM device (300) as the laser source.

Figure 18:
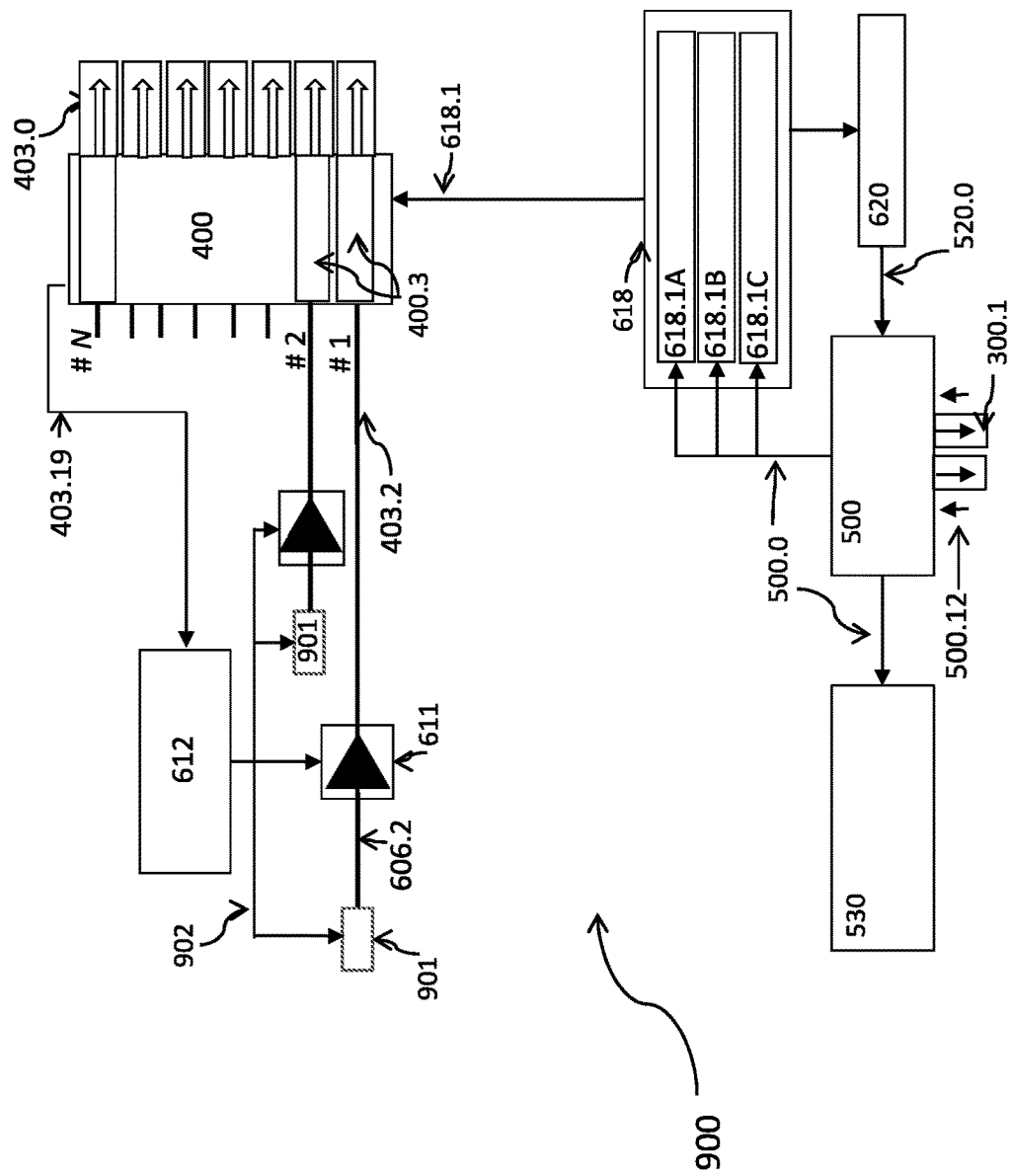
FIG. 18 is a schematic block-diagram of an exemplary AMBFA-LAM device that utilizes incoherent multi-channel optical power amplifier (IMOPA) system with controllers for multi-beam adaptive shaping.

Reduced number of the described beam shaping methods could be implemented using a simplified option for the MOPA system (600) in FIG. 8. This, referred to as incoherent MOPA (IMOPA) system (900), is illustrated by FIG. 18. The IMOPA utilizes independent fiber channels comprised of either fiber coupled lasers (901), or with the fiber lasers with additional fiber amplifiers (611). Control of the transmitted multi-beam powers could be performed either applying the power control signals (902) to the fiber coupled lasers or to the fiber amplifiers. The beam shaping controllers of the IMOPA systems (except piston phase and polarization controllers) in FIG. 18 are identical to the described controllers of the MOPA system in FIG. 8.

Algorithms of Spatiotemporal Control of the Multi-Beam Laser Power Distribution for LAM Also disclosed herein are exemplary control algorithms that could be applied for spatiotemporal control of multi-beam laser power distribution using the AMBFA-LAM system (300). With a AMBFA-LAM laser source generating N mutually incoherent Gaussian beams, the spatiotemporal intensity distribution of the combined beam at the material surface can be described by the function shown in Table 1, which is dependent on the described above 3N control parameters ($\{r_j\}$, $\{p_j\}$ and $\{a_j\}$).

TABLE 1

Spatiotemporal intensity distribution function $$I(r, t) = \sum_{j=1}^{N} p_j(t) \exp[-|r - r_j(t)|^2 / a_j^2(t)].$$

Consider the following disclosed here beam shaping approaches:

Programmable beam shaping using error metric minimization. Programmable control could be used to compute the multi-beam parameters $\{r_j\}$, $\{p_j\}$ and $\{a_j\}$ that provide optimal approximation of the desired (reference) intensity distribution $I_{ref}$ (r). This reference intensity distribution could be selected using analysis and/or physics based considerations. In the disclosed programmable beam shaping algorithm, the optimal control parameters and the best approximation for the reference intensity distribution can be obtained via minimization of the error metric of Table 2, where integration is performed over the material surface plane. Minimization of the error metric of Table 2 could be performed under a set of physics-based conditions and constraints for metallurgical processes, such as the acceptable range of temperature gradients inside the processing volume, power density level required to melt powder particles of certain sizes, the combined beam rastering speed, etc.

TABLE 2

Error metric used for computation of optimal
approximation for reference intensity distribution
using beam-shaping control parameters $J(r_1, \ldots, r_N, p_1, \ldots, p_N, a_1, \ldots, a_N) = \iint [I(r) - I_{ref}(r)]^2 d^2r$ In the disclosed algorithm the programmable beam shaping is based on the Stochastic Parallel Gradient Descent (SPGD) optimization [27, 27]. To simplify notation, the control parameters $\{r_j\}=\{x_j, y_j\}$, $\{a_j\}$ and $\{p_j\}$ (j=1, ..., N) are denoted as $\{u_m\}$ (m=1, ..., 4N), where $u_j=x_j$, $u_{j+N}=y_j$, $u_{j+2N}=a_j$ and $u_{j+3N}=p_j$. Using this notation, the focal-plane intensity distribution is a function of 4N control parameters $I(r)=I(r; u_1, \ldots, u_{4N})$. The optimal values for these parameters are defined via an iterative process of the SPGD error metric minimization of Table 2, where $u_m^{(n)}$, $\gamma^{(n)}=\gamma(J^{(n)})$, $\delta J^{(n)}$, and $N_{SPGD}$ are the controls, the gain factor, the error metric variation at the nth iteration, and the number of SPGD iterations, respectively. The error metric variation $\delta J^{(n)}$ in Table 3 results from small amplitude random perturbations $\{\delta u_m^{(n)}\}=\alpha^{(n)}\{\zeta_m^{(n)}\}$ of the control parameters $\{u_m^{(n)}\}$, where $\{\zeta_m^{(n)}\}$ are random numbers having a uniform probability distribution inside the interval $[-1,1]$, and $\alpha^{(n)}=\alpha(J^{(n)})<<1$ is the perturbation amplitude. To accelerate iterative process convergence, the SPGD control algorithm version described in Ref. [33] can be used, with adaptively changing gain and perturbation amplitude. With appropriately chosen parameters in the equation of Table 3, the SPGD iterations lead to error metric minimization and the corresponding optimal approximation of the desired (reference) intensity distribution $I_{ref}(r)$.

TABLE 3

SPGD iterative algorithm for control parameters update $u_m^{(n+1)} = u_m^{(n)} + \gamma^{(n)} \delta J^{(n)} \delta u_m^{(n)}$, m = 1, ..., 4 $N_{SPGD}$, Adaptive beam shaping control systems. One of the major potential issues with programmable beam shaping is that it requires the laser system and SLM process parameters to be exactly known and fixed in time. Under actual LAM conditions, there are always uncertainties and variabilities in the stock material characteristics, shape and power of the transmitted beams, errors in beams pointing, etc. The beam shaping control (618) in FIG. 8, is comprised of feedforward (618.1A), feedback (618.1B) and programmable (618C) control systems, disclosed herein can account for these uncertainties via real-time adaptive beam shaping parameters adjustment. A schematic diagram of the adaptive beam shaping systems that utilize the multi-beam control capabilities (e.g., A-F as described above with reference to FIG. 16) of the AMBFA-LAM device (300) are illustrated in FIG. 8, FIG. 18 and FIG. 19.

Figure 19:
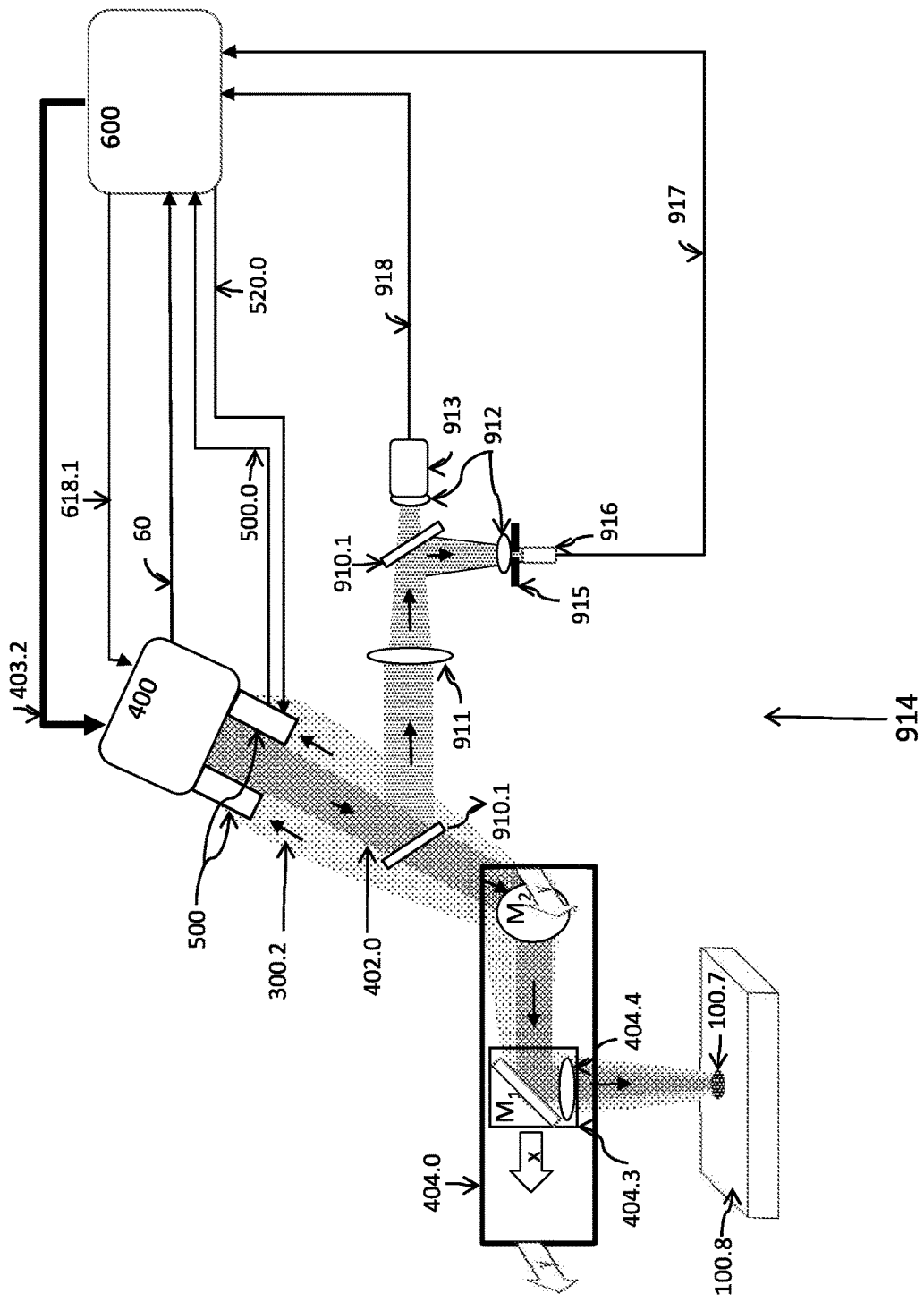
FIG. 19 is a notional schematic of an exemplary adaptive beam shaping system having multi-beam control capabilities.

In the adaptive beam shaping system (914) in FIG. 19 a beam splitter (910.1) redirects a small portion of the processing laser beam (402.0) power to an optical image forming system (911), e.g. a lens, that creates a scaled copy of the laser beam focal spot (100.7) intensity distribution at the photo-array (913), referred to as a conjugate image of focal spot (912). The photo-array is capturing the conjugate images of intensity $\alpha I(\beta r, t_n)$ at sequence of time $\{t_n\}$, (n=1, . . . ) with a time interval $\Delta t$. The captured image $\alpha I(\beta r, t_n)$ represents a scaled copy of the intensity distribution $I(r, t_n)$ at the material surface, where $\alpha$ and $\beta$ are pre-defined and known scaling factors. The captured images $\{\alpha I(\beta r, t_n)\}$ are digitized and the corresponding signals (918) are sent to the beam shaping controller (618) of the MOPA system (600). Using available data including the captured images $\{\alpha I(\beta r, t_n)\}$, scaling factors $\alpha$ and $\beta$, and the desired (reference) intensity distribution function $I_{ref}(r)$, the beam shaping controller (618) computes the error metric of Table 2. The same controller (618) iteratively updates the beam shaping control parameters, e.g. $\{r_j\}=\{x_j, y_j\}$, $\{a_j\}$ and $\{p_j\}$ (j=1, . . . , N) to minimize the error metric of Table 2. The beam shaping control parameters update is performed using one or another optimization algorithm, e.g. the SPGD optimization algorithm of Table 3.

An additional sensing module in FIG. 19 that is composed of the beam splitter (910.1), mask with pin-hole (915) and photo-detector (916) could be used for practical implementation of the described above beam shaping methods (e.g., B through E, as described above with reference to FIG. 16): Multi-beam phasing (B); Controllable randomization of the multi-beam piston phases (C); Control of spatial distribution using stair-mode beam scanning technique (D); Switching between coherent and incoherent beam combining operational regimes referred to as time-multiplexing beam shaping method (E). To implement these beam shaping methods the signal from the photo-detector (917) is sent to the piston phase controller (615) of the MOPA system (600). Maximization of this signal using a phase locking algorithm, SPGD for example, would result in phasing (coherent combining) of transmitted by the fiber array laser head (400) beams at the photo-detector (916) and hence at the powder bed surface (100.8) or other material surface. The same signal (917) can be used to maintain coherent combining of multiple beams at the material surface with additional stair-mode beam steering signals applied to the phase shifters (607). The time-multiplexing controller (616) provides switching between coherent combining, incoherent combining and controllable randomization of the piston phases thus implementing the described above beam shaping methods (e.g., B through E).

Additional beam shaping opportunities include utilization of signals (500.0) from the material sensing modules (500) described above.

Exemplary Systems and Methods

Discussed below are some but not all the innovations and features of AMBFA-LAM (300) hardware and system disclosed herein.

AMBFA-LAM system architecture that provide capabilities for programmable, feedforward and feedback control of multi-beam laser power spatiotemporal distribution, referred to herein as beam shaping, at the material surface for LAM.

Lens-positioner module that allows for control of widths of focal spots at the material.

Fiber-based laser transmitter module with integrated capabilities for electronic control of each or several or all of the following parameters of the transmitted laser beam focal spot: width, centroid location (pointing coordinates), steering frequency, angle and amplitude. Control over these multi-beam characteristics provides capabilities that may be utilized for adaptive spatiotemporal control (shaping) of the laser power distribution at the metallic material during LAM processing.

Fiber-based laser transceiver module with integrated capabilities for electronic control of each or several or all parameters of the transmitted laser beam focal spot and additional capability for simultaneous sensing of each or several or all of the following parameters of the transmitted laser beam: power, piston phase and polarization.

Material sensors based on a probe laser- and power-in-the-bucket (PIB) receiver referred to here as the PL-PIB sensors, used for in situ characterization of: (a) powder material ahead of the LAM processing beam (powder material PL-PIB sensor); (b) molten pool inside the LAM processing region (molten-pool PL-PIB sensor); and (c) consolidated into metal LAM processed track (processed-track PL-PIB sensor).

Material sensor based on probe beam laser transceiver and referred to here as the PBLT sensor that combines functions of the probe beam laser illuminator and the power-in-the-bucket receiver.

The above described AMBFA-LAM (300) system allows for a variety of novel methods and processes, which include:

Methods for multi-beam selective laser melting (SLM) in metals based on adaptive fiber array laser technology with spatiotemporal control of the laser power distribution.

A virtual-lens method for remote SLM with AMBFA-LAM.

Methods for control of multi-beam power distribution for SLM, including: (a) programmable control, (b) feedforward control, and (c) feedback (adaptive) control.

Methods for in situ sensing for LAM based on analysis of probe and/or processing laser beams to be used for feedforward and feedback control of the multi-beam parameters and spatiotemporal intensity distribution, including: (a) methods for sensing of powder material ahead of the LAM processing beam; (b) methods for sensing of consolidated into metal powder material in the heat-affected zone behind the processing beam, and (c) methods for sensing of molten pool.

Material sensing method based on the PBLT sensor operating as a confocal microscope providing live streaming imagery of a small region on the material surface along the processing track, ahead, inside and behind the processing beam.

Methods for metallic powder or other material LAM processing including:

LAM processing with phasing of multi-beams (also referred to as coherent combining) leading to the reduction of focal spot size and corresponding increase of laser power density at the work piece—effective technique for high-resolution processing of contours of LAM-built parts or components.

LAM processing with controllable randomization of the multi-beam phases resulting in suppression of interference effects and improved laser power spatial uniformity inside a designated processing area for LAM.

LAM processing with stair-mode scanning of the coherently combined beams for spatially uniform power distribution within an elongated (line) beam for high-resolution part contour processing, and/or within rectangular shape regions for processing of a part's bulk material regions.

LAM processing with time-multiplexing between multi-beams phasing and phase randomization for simultaneous powder material preheat, melting and treatment of the consolidated into metal material to improve LAM-produced parts quality (e.g., improve surface finish, reduce residual stress, reduce risk of delamination, and other improvements).

LAM processing with multi-beam intensity patterns enabling optimal control of heating and cooling rates, and an increase of processing speed via controllable displacements or/and periodic oscillation of the focal spot position of each beam in the extended vicinity of the melting pool.

LAM processing with adaptive compensation of heat-induced phase aberrations caused by heated air flows near material surface processing area which may result in spatiotemporal fluctuations of laser power distribution inside the processing region and its vicinity, which may negatively impact the surface finish of deposited material.

Wide Area Laser Additive Manufacturing (WALAM): Concept, Methods and Devices

While a number of features, systems, and methods for adaptive multi-beam fiber-array laser additive manufacturing have been discussed, a number of options are possible. The options include arranging the fiber transmitters (403.3) in FIG. 5 and the powder bed sensing modules (500) in different configurations and performing different beam shaping methods beyond those shown and discussed in the context of FIG. 16.

One such multi-beam fiber-array laser additive manufacturing option is referred to herein as wide area laser additive manufacturing (WALAM). The WALAM concept includes additive manufacturing using a laser power source comprised of linear array of fast oscillating laser beams, with optional supplementary linear arrays of probe beam laser transceivers and laser sources for thermal management in the heat affected zone (HAZ) and the manufacturing material sensing. The WALAM concept uses many of the same features and components discussed above in the context of AMBFA-LAM and retains the major benefits of that system. At the same time the WALAM approach, methods and devices described offer advantages beyond those already disclosed, which may be desirable for LAM implementations that require high build rate, and improved 3D printing resolution, precision and mechanical characteristics of metallic 3D printed components. In the implementations where the WALAAM approach can be effectively accomplished, the disclosed concept, methods and devices can significantly (on the order of magnitude) reduce build time, improve 3D printing resolution (by factor two or more), enhance thermal and mechanical properties of built parts—all without noticeable impact on the complexity of the adaptive multi-beam additive manufacturing discussed above.

Figure 20:
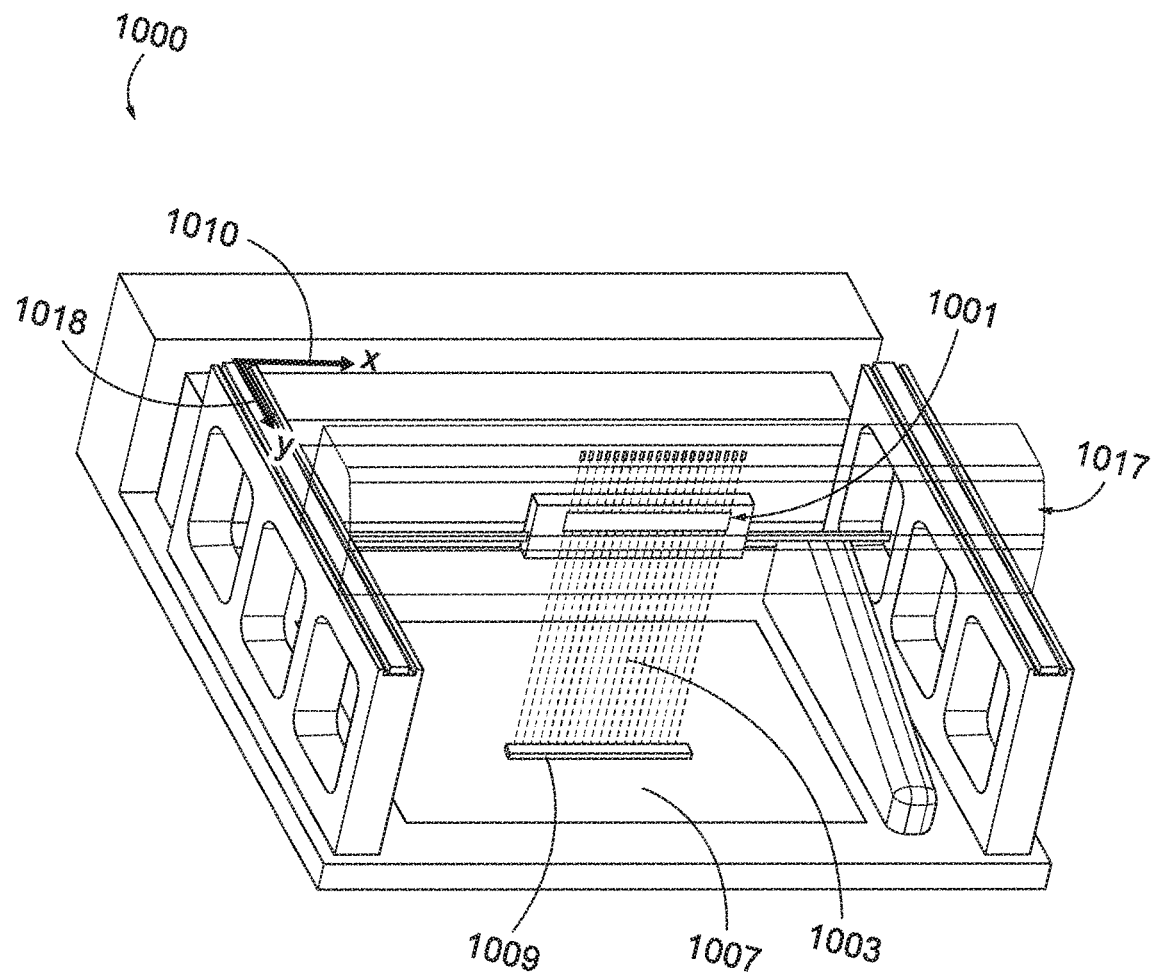
FIG. 20 is a front perspective view of an exemplary wide area laser additive manufacturing (WALAM) system showing an exemplary gantry, an exemplary WALAM laser module, and an exemplary manufacturing area during a simulated use.
Figure 21:
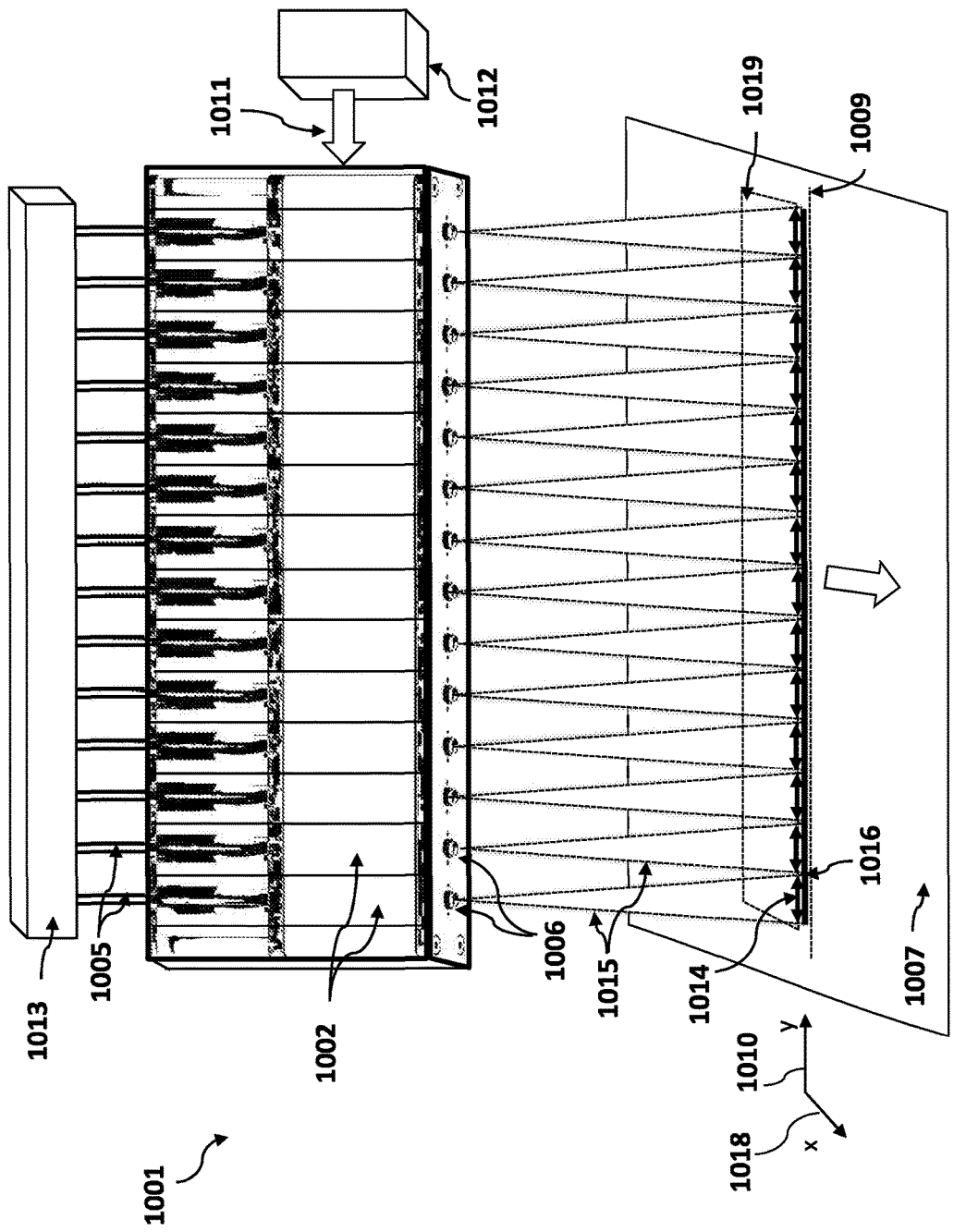
FIG. 21 is a front perspective view of the WALAM laser module during a simulated use.
Figure 22:
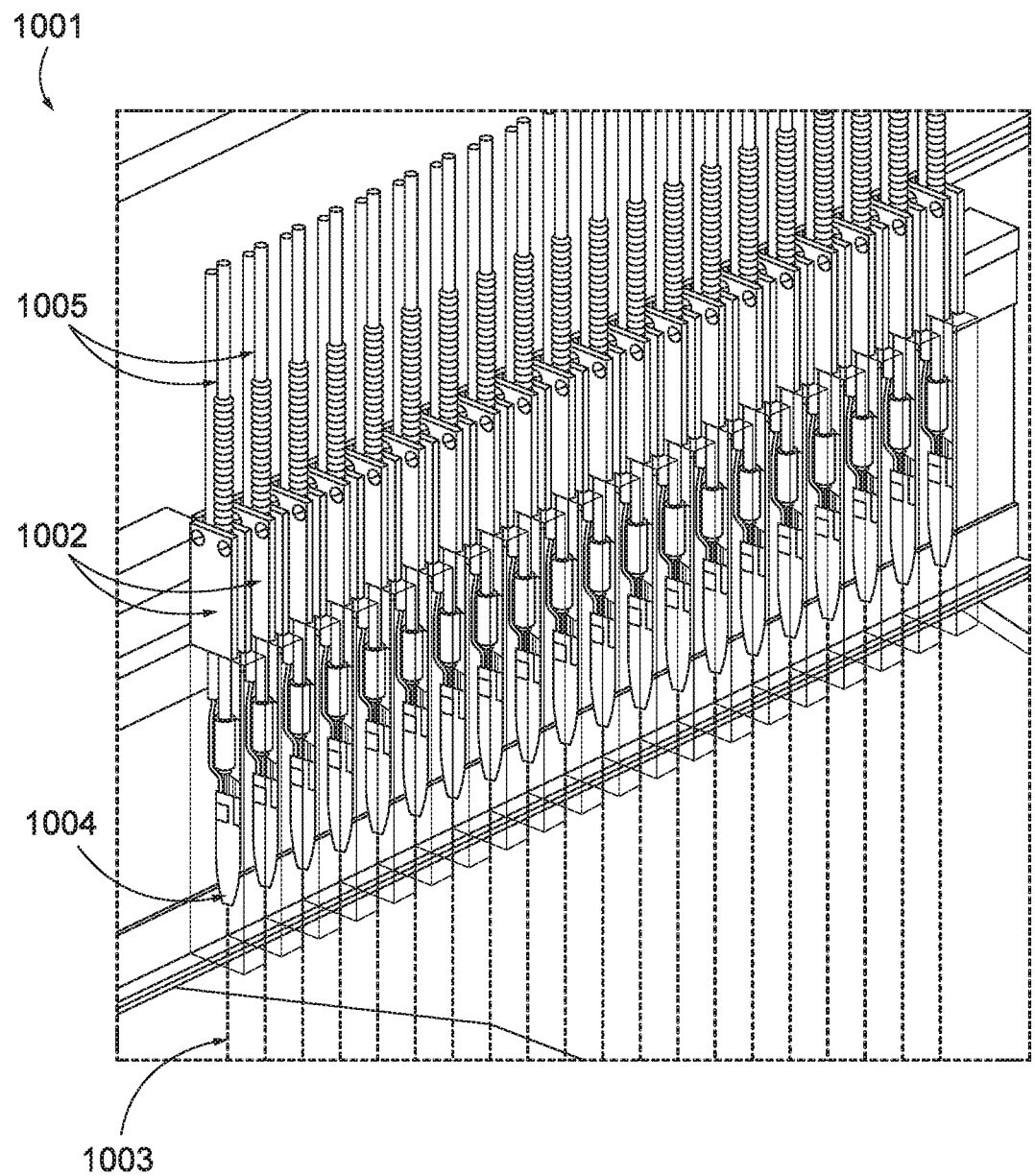
FIG. 22 is a front perspective view of the WALAM laser module with the covers removed from an array of twenty exemplary oscillating beam modules during a simulated use.
Figure 23:
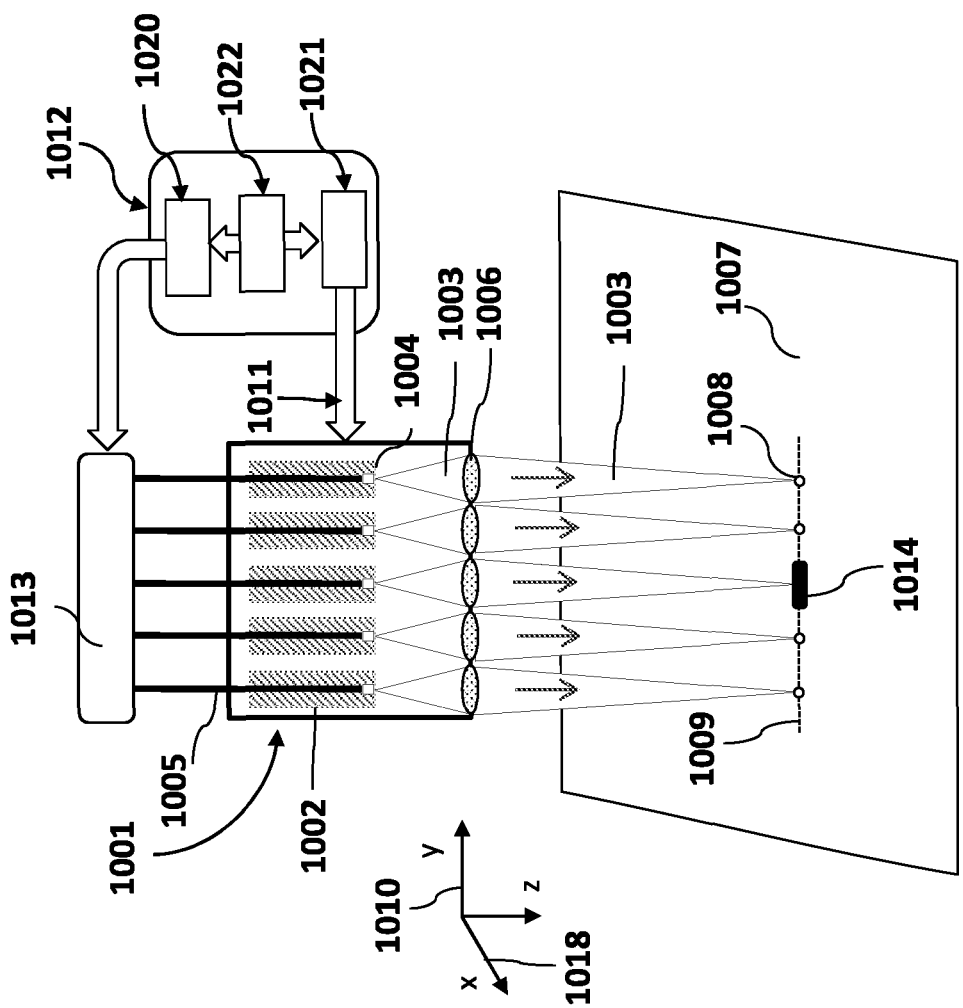
FIG. 23 is a notional schematic of the WALAM system with an array of five oscillating beam modules during a simulated use.

FIGS. 20, 21 show two front perspective views of a WALAM metallic 3D printing system (1000) that uses the WALAM laser module (1001) for processing of the powder material. The WALAM laser module (1001), that is shown in more details in FIGS. 22 and 23 represents a linear array of N (i.e., one or more) oscillating beam modules (1002) referred to as OBMs. The number of OBMs in FIGS. 22, 23 are correspondingly 20 and 5. The OBMs are separated by a distance, d, from each other center, and assembled to form a WALAM laser module (1001) that generates a linear array of N (i.e., one or more) divergent (e.g. Gaussian-shape) laser beams (1003) that are transmitted from the tips (1004) of the delivery fibers (1005) inside the OBMs (1002). The linear array of lenses (1006) focuses the transmitted beams (1003) on to the manufacturing region of the powder bed surface (1007) resulting in focal spots (1008) (e.g. Gaussian-shape spots) of width $w_F$. The diameter $d_{lens}$ of each lens (1006) of the WALAM laser module (1001) is selected to not exceed the distance d between centers of the adjacent OBMs (1002) which corresponds to the distance between the fiber tips (1004). The lens focal distance F is chosen to reimage the fiber tip (1004) in to the powder bed surface (1007) with a scaling factor $M = w_F/w_{beam}$ that is equal the ratio of the focal spot width $w_F$ to width $w_{beam}$ of the transmitted beam at the end of the fiber tip (1004). The WALAM laser module (1001) is designed and aligned to ensure that all focal spots (1008) are located along processing line (1009) at the powder bed surface (1007) and nominal distance between centers of the adjacent focal spots is d. In a possible implementation example of the WALAM laser module (1001) the parameters mentioned above are: d=15 mm, N=20, $d_{lens}$=10 mm, $w_{beam}$=10 µm, $w_F$=100 m and M=10.

Fiber tips (1004) of the OBMs (1002) may be continuously oscillate, or moved back and forth along the y-axis (1010) with the oscillation amplitude $l_{tip}$ and speed $v_{tip}$ which can be independently adjusted or set to pre-defined values using electronic control signals (1011) that are generated in the controller (1012) and applied to the OBMs (1002). The oscillations of fiber tips results in the corresponding oscillations of laser focal spots (1008) along the same y-axis (1010). It should be easily understood that the focal spots oscillation amplitude $l_F$ and speed $V_F$ are the factor of M larger if compared with the fiber tip oscillation amplitude and speed. In a possible implementation example of the WALAM laser module (1001) the parameters mentioned above are: M=10, $l_{tip}$=1.5 mm, $v_{tip}$=5 m/sec and correspondingly $l_F$=15 mm, $v_F$=50 m/sec.

In the WALAM concept the laser power is delivered individually to each OBM (1002) from a WALAM laser source (1013) though the delivery fibers (1005) and can be independently controlled for each OBM (1002).

With sufficiently high laser power for powder material melting, each oscillating focal spot (1008) of the WALAM laser module (1001) creates an elongated or cigar-shape molten pool (1014) of length $l_{pool}$ ranging from approximately $w_F$ when the laser power is off, to the length equal distance d between centers of lenses (1006) of the neighboring OBMs (1002). In the WALAM method disclosed, the oscillation amplitudes $l_F$ of focal spots (1008) or, equivalently, the focal spot oscillation angular ranges (1015), are chosen to be able production of a continuous molten track (1016) along the processing line (1009) as illustrated in FIG. 21. The molten track (1016) is composed of a plurality of molten pools (1014) created by adjacent oscillating focal spots (1008) at the powder bed surface (1007) as illustrated in FIG. 21. Dependent on geometry of manufacturing part, the neighboring molten pools (1014) may be interconnected or separated. It should be understood that in the WALAM manufacturing method, lengths of individual molten pools should be controlled by modulating the delivered to each OBM laser power and/or fiber tip oscillation amplitude.

With reference to FIG. 20, the WALAM laser module (1001) is mounted on a high-precision gantry system (1017) that advances along the x-axis (1018), in order to create a moving along x-axis molten track (1016) on the surface (1007) and a processed region (1019) of a consolidated into metal cooling material behind.

It should be understood that the high-precision gantry system (1017) may be capable of moving the WALAM laser module (1001) along both the x-axis (1018) and the y-axis (1010), as may be needed for applications where the manufacturing component is wider than the molten track (1016) that can be generated by the WALAM laser module (1001).

With reference to FIG. 22, 23, it can be seen that the WALAM laser module (1001) is comprised of a plurality of OBMs (1002), each receiving optical power through a delivery fiber (1005). As can be seen, the modularity of the WALAM laser module (1001) allows for the number of OBMs (1002) to be easily scaled to provide a desired length of the processing line (1009) and the corresponding molten track (1016).

Referring to FIG. 23, that shows a diagrammatic view of the WALAM laser module (1001) fiber-connected to a laser power source (1013) that can be comprised of a MOPA laser system (600) or a rack of fiber lasers, or their combination. The laser power source (1013) is assembled to provide a plurality of single mode Gaussian laser beams (e.g. single mode Gaussian beams) at the tips (1004) of the delivery fibers (1005) that are located inside the OBMs (1002) of the WALAM laser module (1001). The laser power source (1013) may have required for operation cooling, electrical power, and beam power controller (1020), and may, in some exemplary implementations, provide one or many ten, twenty, or more laser beams sent to the OBMs (1002) through the delivery fibers (1005).

The laser power source (1013) is electrically connected with a WALAM controller (1012), which comprises a beam power controller (1020) that is configured to control and/or modulate the power of the transmitted by OBM (1002) laser beams (1003), a OBM controller (1021) that is configured to control the oscillation parameters such as oscillation frequency and/or amplitude, and control position offsets of the focal spots (1008) of one or more OBMs (1002), and a target object definition data controller (1022), which may be generated by an additive manufacturing CAD software or another source, that provides parameters for an object to be fabricated using the WALAM method and system and supplies instructions to the beam power controller (1020) and OBM controller (1021). The beam power controller (1020) is capable of controllable change of the power of each laser beam (1003) with required for material processing frequency bandwidth e.g. with up about one kHz or more.

Figure 24:
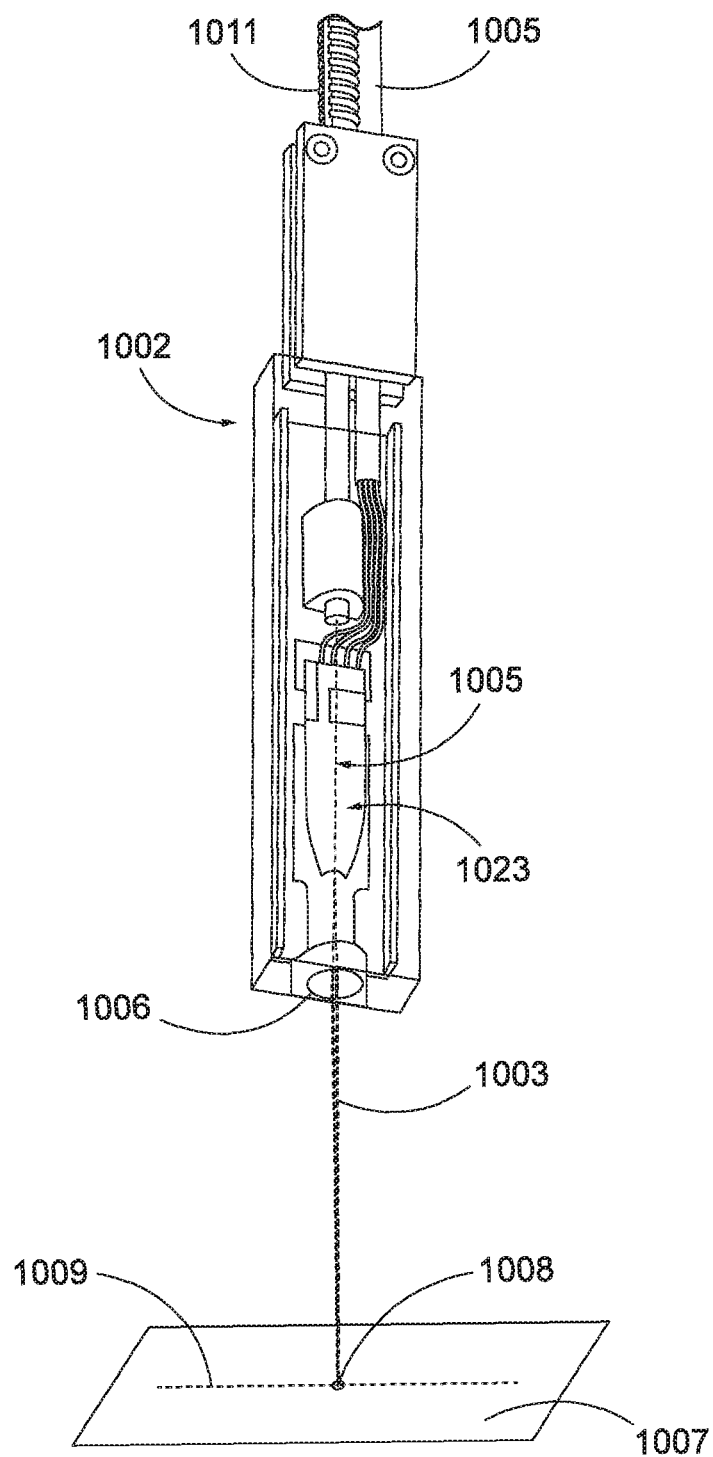
FIG. 24 is a front perspective view of an exemplary oscillating beam module with a cover removed to show internal components during a simulated use.
Figure 25:
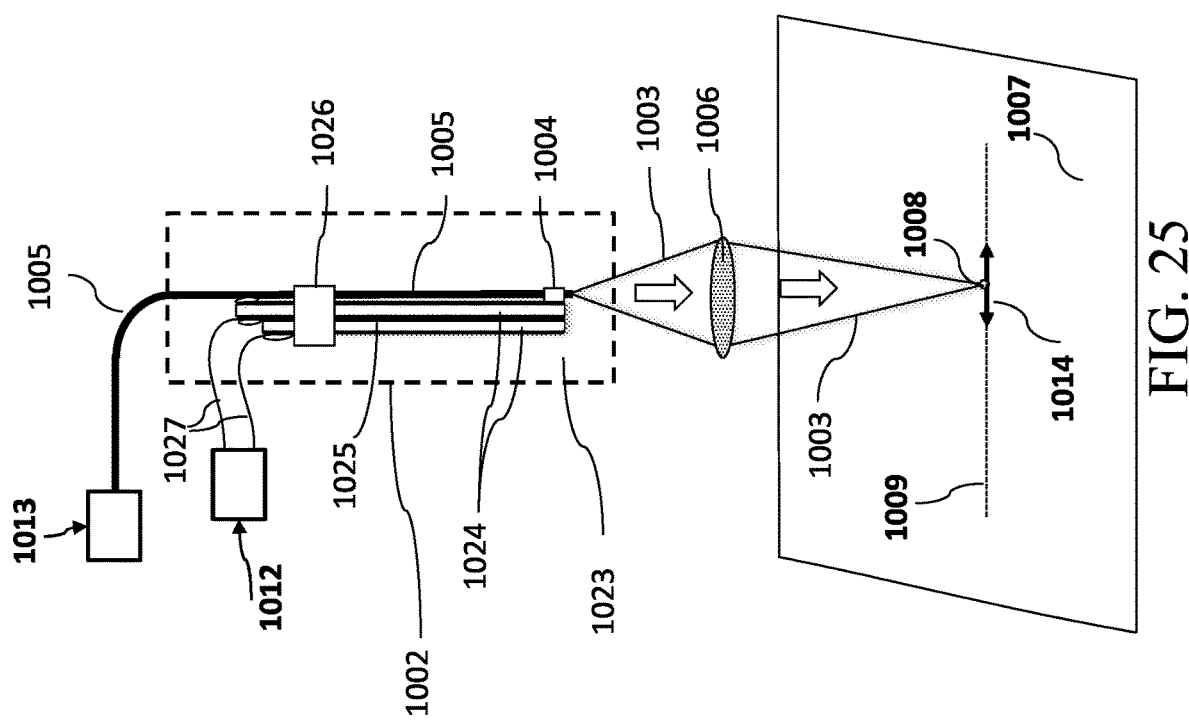
FIG. 25 is a side notional schematic of the exemplary oscillating beam module with a cover removed to show internal components during a simulated use.
Figure 26:
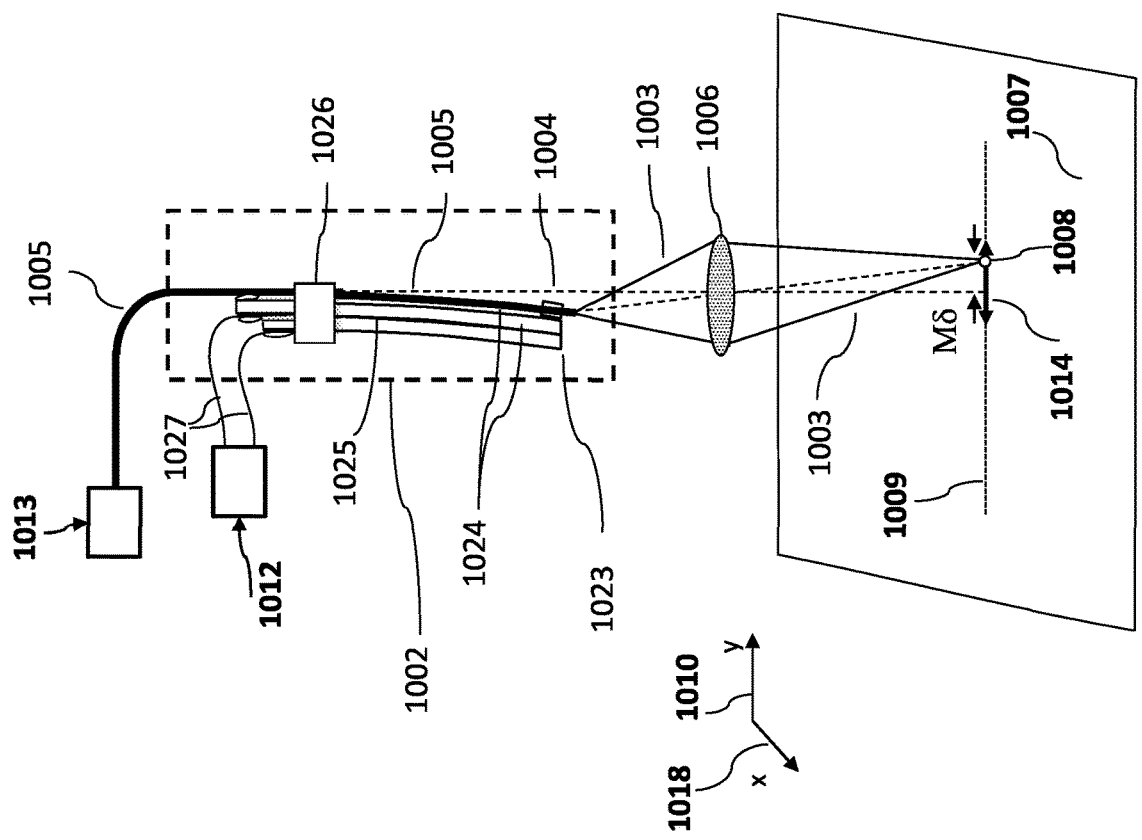
FIG. 26 is a side notional schematic of the exemplary oscillating beam module with a cover removed to show internal components during a simulated use.

Referring now to FIGS. 24-26, and focusing specifically on FIG. 24, which shows a front perspective view of an OBM (1002) with a side cover removed, it can be understood that the oscillating motion of the laser beam (1003) that creates the oscillating laser focal spots (1008) is achieved by applying repeating in time t with a period T control voltages to a piezo-actuator (1023) that is assembled inside each OBM (1002). The laser beam (1003) is delivered to the OBM (1002) through the delivery fibers (1005) that are attached to the piezo-actuator (1023), and the fiber tip (1004) of the delivery fiber is reimaged to the processing line (1009) on the powder material surface (1007) by a focusing lens (1006) of the OBM (1002).

As has been discussed, the WALAM laser module (1001) is comprised by the linear laser array of OBMs (1002) and is capable of transmitting a set of N Gaussian-shape laser beams (1003) separated by distance d that are focused on a powder material at the surface (1007). Referring now to FIGS. 25 and 26, each exemplary OBM (1002) has capabilities for fast (e.g. >1.0 kHz rate) laser focal spot (1008) oscillation. Both the focal spot oscillation amplitude $l_F$ ranging from zero to d, and laser power can be controlled during the oscillation cycle with required for material processing frequency bandwidth e.g. with up about several kHz or more.

The number of beams in the WALAM laser module (1001) may be scaled such that it may contain any desired number of OBMs (1002). Some exemplary implementations may contain one or many OBMs (1002) depending upon the intended application, since requirements for supporting additional OBMs increase in a substantially linear manner due to the modular nature of the WALAM concept. These exemplary OBMs (1002) may be configured for transmissions of laser beams having different powers, with an exemplary range of laser power being between about 50 W to 1.0 kW per laser beam.

FIG. 25 shows a more detailed side elevation view of the OBM (1002) with piezo-actuator (1023) during a simulated use. The piezo-actuator (1023) of the OBM (1002) is comprises a set of two or more piezo-plates (1024) with deposited electrodes on both sides that are firmly attached together for example using a layer of glue (1025), a length of the laser beam delivery fiber (1005) transferring the laser power from the WALAM laser power source (1013) to the fiber tip (1004), and a fastener (1026) that attaches and holds the piezo-actuator plates and delivery fiber assembly. The piezo-plates are connected to the WALAM controller (1012) using electrical wires (1027).

The piezo-actuator (1023) in FIG. 25 is in a neutral position, and so the piezo-plates (1024) are each straight, and the fiber tip (1004) attached proximately to the end of the piezo-plates (1024) is aimed in a direction that is substantially perpendicular to the powder bed surface (1007). As a result, the laser focal spot (1008) formed by the focusing lens (1006) is located at approximately the midpoint of the molten pool (1014) that is generated by a single oscillating focal spot (1008) of the OBM (1002) along the processing line (1009).

FIG. 26 shows another side elevation view of the OBM (1002) with the piezo-actuator (1023) during a simulated use when a control voltage is being applied to the piezo-plates (1024) by the WALAM controller (1012) resulting in the piezo-actuator (1023) bending in respect to fastener (1026) along its length and causing shift of the fiber tip (1004) along the y-axis (1010) As a result, the focal spot (1008) projected by the focusing lens (1006) also shifts away from the midpoint of the molten pool (1014) that is generated by a single oscillating focal spot (1008) of the OBM (1002) along the processing line (1009). Thus, by providing alternating control voltage to the piezo-actuator (i.e., one voltage that causes the piezo-actuator (1023) to bend a distance to the right, and one voltage that causes the piezo-actuator (1023) to bend a distance to the left) to displace the fiber tip (1004), the focal spot (1008) can be quickly and accurately moved in a first and second direction and create the cigar-shape oscillating beam (1003) on the material surface (1007) and with sufficient laser power can form molten pool (1014) along the processing line (1009).

One exemplary piezo-actuator (1023) can provide displacement $l_{tip}$ of the fiber tip (1004) between about 1.0 mm and about 1.5 mm at resonance frequency of between about 1.0 kHz and about 2 kHz dependent on the bimorph element design, with about +/−100-150 Volts of electrical signal applied to the piezo-actuator electrodes (1027). The focusing lens (1006) of the OBM (1002) reimages the fiber tip (1004) with magnification factor M resulting in the focal spot (1008) oscillation amplitude $l_F$ increasing by the same factor: $l_F = M\, l_{tip}$. Producing the piezo-actuators (1023) from a piezo-crystal material allows for a displacement amplitude increase of between about 200% and about 300%, when compared to piezo-actuators (1023) made of piezo-ceramic materials.

To provide uniform laser power density at the powder bed or other surface (1007) during the oscillation cycle, including the time of the beam focal spot motion directional change, triangular shaped control signals may be provided via the WALAM controller (1012) to drive the piezo-actuators (1023). It is also possible to use sinusoidal-shape control signals, though the laser power should be continuously adjusted or modulated during the oscillation cycles to provide uniform laser power density along the processing line (1009) of the oscillating beam focal spot (1008).

Referring now to FIGS. 21, 23 in order to produce elongated molten track (1016) with interconnected molten pools resulting from oscillating focal spots (1008), the focal spot (1008) oscillation amplitude $l_F$ should be equal to or exceed the distance d between OBM centers. On time scales of heat transfer and melting pool formation and solidification, the deposition of laser power using either a fast oscillating or cigar-shape beam has similar impact on material thermal dynamics.

With sufficient laser power, the cigar-shape interconnecting beams could form a continuous molten track (1016) of length $L_{track} = Nd$ and width $w_{pool} \simeq \kappa w$, where w is focal spot width and the coefficient $\kappa$ typically ranges from approximately 1.2 to 1.5 dependent on powder material and processing parameters. For example, with one exemplary WALAM system (1000) having twenty OBMs (1002) that are separated by a distance d=15 mm, the molten track (1016) length is equal to approximately $L_{track} = Nd = 30$ cm.

Each OBM (1002) of the WALAM laser module (1001) has capabilities for controlling the laser power and oscillation amplitude or, equivalently, the length $l_F$ of a single oscillating focal spot (1008). The laser sources used for an exemplary WALAM laser power system (1013) can provide modulation of the transmitted power during the oscillation cycles with up to about 20 kHz frequency bandwidth. One exemplary laser source having one or more features appropriate for a WALAM laser power system (1013) is a YLM-100-1064 from IPG Photonics Inc.

WALAM Work Envelop Scalability, Hatching, and Slicing

For LAM-fabricated parts having a single dimension not exceeding $L_{track} = Nd$, one layer of powder can be processed during just a single scan of the WALAM laser module. This ability to instantaneously process an extremely wide region of powder material is one significant advantage of the WALAM method.

Figure 27:
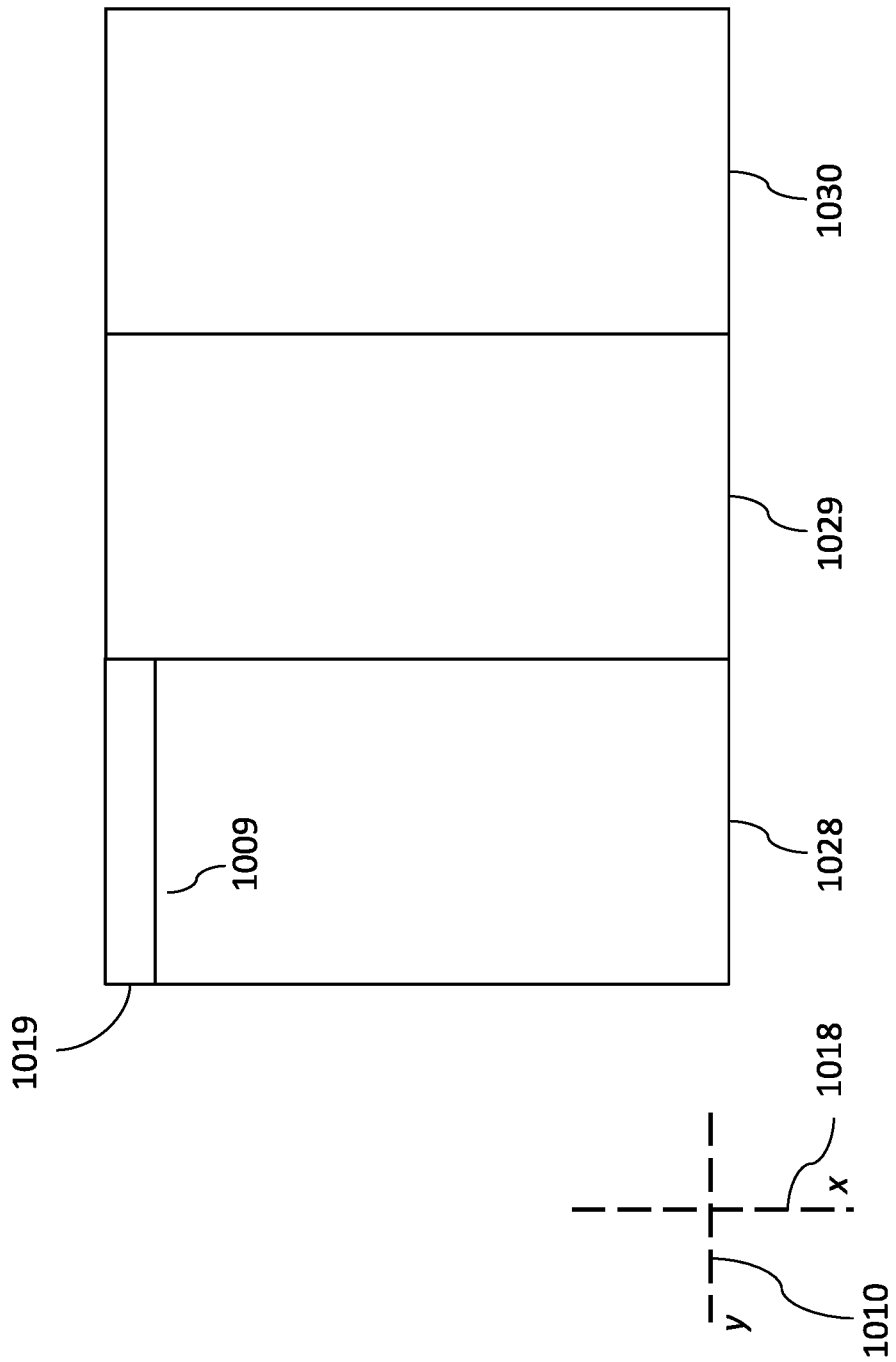
FIG. 27 shows a top down diagrammatic view of an exemplary manufacturing area divided into three separate areas.

For the LAM processing of larger parts, the WALAM laser module (1001) may be assembled in a 2D gantry system, such as the high precision gantry system (1017), with a sufficiently large working envelope. In this case, at the end of each single scan the gantry arm may shift the WALAM laser module (1001) a distance $L_{track} = Nd$ orthogonal to the scan direction for processing another area of the stock material. This hatching procedure that includes powder material processing during a linear scan along x-axis (1018) and the entire laser modular shift along y-axis (1010) with laser power off may be repeated until the entire layer of the stock material is processed. FIG. 27 shows a top down diagrammatic view of an exemplary powder bed with processing region (1019) that is divided into three processing areas. As can be seen, the total width of the processing region (1019) exceeds the length of the processing line (1009) of the WALAM laser module (1001). The above described hatching procedure would cause the WALAM laser module to scan along the x-axis (1018) across a first processing area (1028). Upon reaching an end of the first processing area (1028), the WALAM laser module would be powered off, and would be shifted along the y-axis (1010) until it aligned with a second processing area (1029). The WALAM laser module would be powered on, and the second processing area (1029) could be scanned along the x-axis (1018). This procedure could be repeated again for a third processing area (1030), and so on.

This WALAM hatching procedure would benefit from a modification of known placement and slicing algorithms that are used in conventional single-beam powder bed SLM systems. From an algorithmic view point, the benefit and modification will be apparent to one of ordinary skill in the art in light of this disclosure. A generic slicing algorithm provides coordinates of active points on a slice grid for which the laser power is powered on. With a WALAM system (1000) using a linear laser array of oscillating beams which are generated by the WALAM laser module (1001), the slice grid may be oriented and re-computed if necessary along the WALAM laser module scan direction of the x-axis (1018), and the active points along the processing line (1009) grouped into an array of N linear subsets dependent on their position in respect to centers of OBMs (1002). Each linear subset of active points may then be processing by a single oscillating laser focal spot (1008). The above described hatching procedure and slicing algorithm may be performed by an appropriately configured WALAM CAD software package, plugin, or software module.

WALAM Laser Power Scaling

The cigar-shape beam footprint that is generated by each oscillating beam of the WALLAM laser module (1001) has much larger area $S_{cigar} \simeq l_F w$ if compared with the processing area $S_{Gauss} \simeq w^2$ of a conventional Gaussian beam of equivalent width w. This implies that transitioning to oscillating beams allows a laser power increase by factor $\eta = S_{cigar}/S_{Gauss} \simeq l_F/w$, without changing the laser power density at the stock material, or the LAM processing spatial resolution. In the case of LAM processing with oscillating beams, the spatial resolution may be determined by the focal spot size w rather than the oscillation amplitude $l_F$.

For the exemplary WALAM 3D printing system (1000) having twenty OBMs (1002) with maximum available oscillation amplitude $l_F = 15$ mm and focal spot width w=100 μm, the laser power of each beam can be increased by a factor $\eta \simeq 150$ relative to a corresponding conventional powder bed SLM system that utilizes a single Gaussian shape beam of 100 μm width. As will be apparent to one of ordinary skill in the art in light of this disclosure, the WALAM concept provides substantial potential for scalable laser power increase without sacrificing three-dimensional printing spatial resolution.

WALAM OBM Generated Temperature Profiles

Figure 28A:
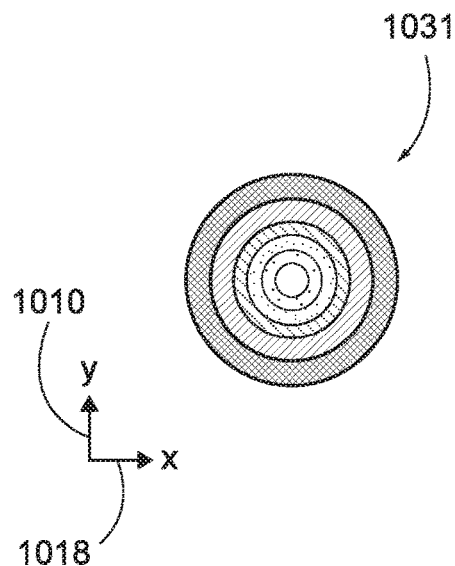
FIG. 28A shows a simulated laser power density distribution at a manufacturing area for a single, non-oscillating Gaussian shape focal spot.
Figure 28B:
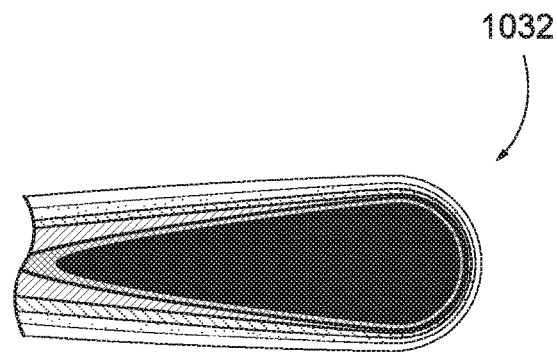
FIG. 28B shows a temperature distribution at the manufacturing area that corresponds to FIG. 28A.
Figure 28C:
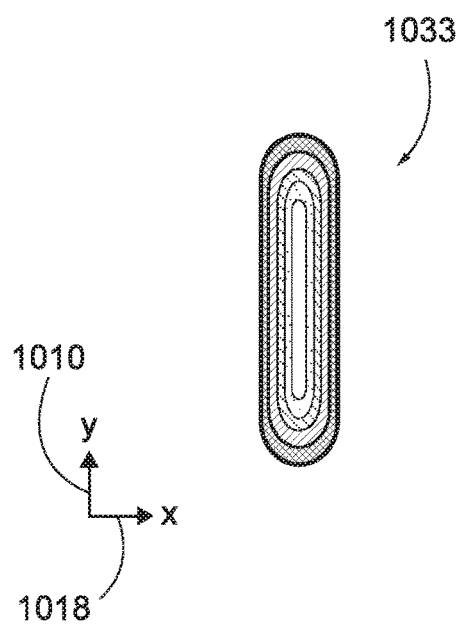
FIG. 28C shows a simulated laser power density distribution at a manufacturing area for an oscillating Gaussian-shape focal spot.
Figure 28D:
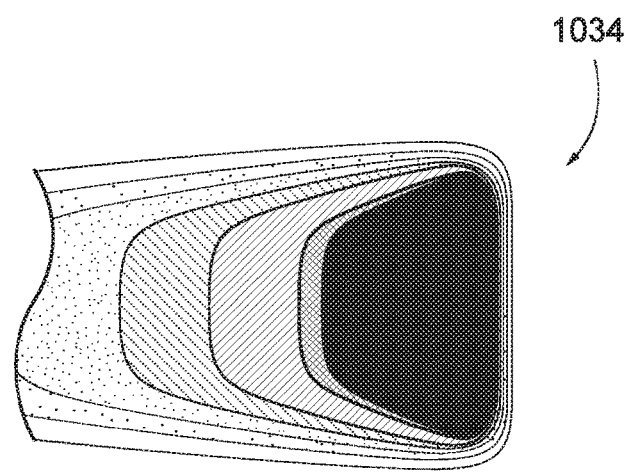
FIG. 28D shows a temperature distribution at the manufacturing area that corresponds to FIG. 28C.
Figure 29:
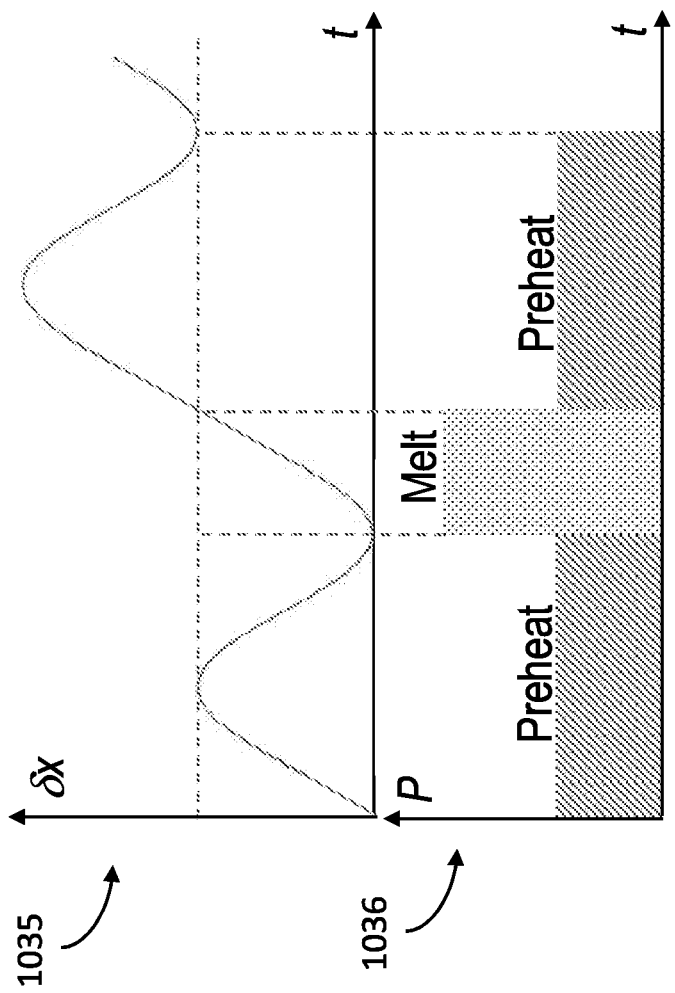
FIG. 29 shows a graph of the periodical cycle of powder material preheating and melting during additive manufacturing.

FIG. 28A shows a simulated laser power density distribution at surface of the manufacturing region (1007) for a single, non-oscillating, Gaussian-shape focal spot (1031) of 550 W power and width of w=500 μm, while FIG. 28B shows a corresponding temperature distribution (1032) at the powder bed surface (1007). FIG. 28C shows a simulated power density distribution for an oscillating Gaussian-shape focal spot (1033) having the same power as the non-oscillating Gaussian-shape focal spot (1031), and a focal spot width of w=250 μm, while FIG. 28D shows a corresponding temperature distribution. Both beams are moving along x-axis (1018) or from left to right at 1.0 m/sec speed, and oscillation of the focal spot in FIG. 28C is performed along y-axis (1010). The simulations are performed for bulk Ti-6Al-4V material. The molten pools in FIGS. 28B and 28D are shown by solid black regions.

With reference to FIGS. 28, it can be seen that the oscillating Gaussian-shape focal spot (1033) has a power density distribution that is substantially uniform along the oscillation direction or along y-axis (1010). In comparison with temperature distribution (1032) that is generated by a conventional non-oscillating Gaussian focal spot (1031), the oscillating focal spot (1033) generates a more uniform temperature distribution (1034) that can prevent powder material from overheating and vaporizing, while also reducing sintering and partial melt areas. These simulations indicate that laser energy deposition in LAM using oscillating beams (1033) can provide improved three-dimensional printing spatial resolution and surface quality, while also reducing mechanical stress and porosity in built parts.

WALAM Build Rate Estimation

One significant advantage of a WALAM system (1000) is the potential for substantial improvement of additive manufacturing build rate. To illustrate this advantage, a comparison will be provided between an exemplary build rate that can be achieved with the WALAM system (1000) and a conventional powder bed SLM system, with similar laser power and processing material.

For the conventional system, assume a powder bed SLM system operating with a single Gaussian-shape focal spot of width w, laser power P, and scanning speed $v_{conv}$. For simplicity, the part produced may be a cuboid component with side length L. The time required to melt a single track in the conventional 3D printing machine can be estimated as $\tau_{track}=L/v_{conv}$. The number of tracks required to process a single powder layer $N_{track}=L/w_{track}$, where $w_{track}$ is the molten track width. Correspondingly, the time required to process the entire single powder layer $T_{layer}^{conv}=N_{track}\tau_{track}=L^2/(w_{track}v_{conv})$. Using the relationship $w_{track}\simeq\kappa w$, we obtain $T_{layer}^{conv}\simeq L^2/(\kappa v_{conv})$ as the build time for the cuboid component on the conventional SLM system.

Continuing the example, now assume the same cuboid is fabricated using a WALAM system (1000) composed of the linear array of N oscillating beams having identical laser power consumption and beam characteristics as the conventional system (i.e., beam width w and power P). The OBMs (1002) of the WALAM laser module (1001) are separated a distance d=L/N from each other and the focal spot oscillation amplitude $l_F=d$. With the speed of the WALAM laser module (1001) along x-axis (1018) equal to $v_{WALAM}$, a single powder layer processing will be completed over the time $T_{layer}^{WALAM}=L/v_{WALAM}$. As mentioned above, to keep the averaged laser power density at the powder material identical in both LAM systems, the gantry scanning speed $v_{WALAM}$ should be a factor $\eta=S_{cigar}/S_{Gauss}\simeq d/w$ smaller than $v_{conv}$, that is $v_{WALAM}=v_{conv}/\eta=v_{conv}w/d$. Correspondingly, for the single layer processing time with the WALAM system we obtain an estimated build time for the cuboid component of: $T_{layer}^{WALAM}=Ld/(v_{conv}w)$.

The gain in build rate can be estimated by the ratio of time required to process a single powder layer: $G=T_{layer}^{conv}/T_{layer}^{WALAM}$. With the exemplary WALAM system configuration ($l_F=d$, and Nd=L), the gain is given by the following simple expression:

$$G=T_{layer}^{conv}/T_{layer}^{WALAM}\simeq L/\kappa d=N/\kappa.$$

Applying the principles disclosed herein, this estimation shows that the build rate is increased linearly with the number of OBMs (1002) in the WALAM laser module (1001). This result will be apparent to one of ordinary skill in the art in light of this disclosure, as from a physics viewpoint: by increasing N-fold the total laser power by using N beams, it should be possible to melt N times more powder material and, correspondingly, be approximately N times more productive in LAM parts fabrication.

For the exemplary WALAM system (1000) with twenty OBMs (1002), as illustrated in FIG. 22, the expected build rate $G=N/\kappa$ is about 16-fold higher when compared with a corresponding conventional single-beam powder bed SLM system (with an assumed $\kappa=1.25$).

The preliminary analysis shows that laser power of the exemplary WALAM system (1000) can be potentially increased from 100 W to 1.0 kW per beam without changing the focal spot size (w=100 μm), meaning that processing resolution is not negatively impacted, as it would be with conventional systems. For example, for conventional SLM systems, it is estimated that processing using a 1.0 kW laser beam would require a focal spot size increase to between about 400-500 m to avoid the target material overheating and evaporating.

A laser power increase from 100 W to 1.0 kW per beam would benefit from proportional (i.e., 10-fold) increase of the high precision gantry system (1017) scanning speed: from $v_{WALAM}=(w/d)v_{conv}$ to $v_{WALAM}=(10w/d)v_{conv}$. The resulting scanning speed is still significantly (i.e., by a factor $v_{conv}/v_{WALAM}=0.1d/w$) lower than the scanning speed $v_{conv}$ of many conventional powder bed SLM machines. As a further example, consider the exemplary WALAM system (1000) with P=1.0 kW, beam size w=100 μm and laser focal spot oscillation amplitude $l_F=d=15$ mm. The exemplary scanning speed $v_{WALAM}=(10w/d)v_{conv}=v_{conv}/150$ in this case is 150-times lower when compared with a conventional powder bed SLM system that operates with 1.0 kW beam.

It will be apparent to one of ordinary skill in the art, in light of the disclosure herein, that the WALAM system (1000) provides the potential for dramatic LAM build rate increases, from current build rate of about 25 cm³/hour/beam to build rates of about 1600 cm³/hour, without significantly impacting or even improving three-dimensional printing resolution. In one exemplary implementation, comprising seven 1.0 kW-class fiber lasers the expected build rate for single part fabrication will be between about 500 and about 560 cm³ h.

WALAM Beam Shaping and Thermal Gradients Management

As already mentioned, by allowing for significantly higher build rate, the exemplary WALAM system (1000) may still operate with considerably lower scanning speed (by a factor $\eta\simeq l_F/w$) when compared to a corresponding conventional three-dimensional SLM system. For example, an adequate scanning speed allowing for optimal material processing for a WALAM system (1000) with seven 1.0 kW-class fiber lasers could be as low as between about 10 and about 15 cm/sec versus between about 2 m/sec and about 3 m/sec in conventional single beam kW-class powder bed SLM systems. The low scanning speed allows for significantly lower thermal gradients and hence less material stress, porosity and cracking in produced parts.

The stock material processing with low scanning speed also provides opportunities for microstructure control using pre-heating of powder particles in a cycle of forward-reverse type motion of the high precision gantry system (1017) that holds the WALAM laser module (1001). Referring to FIG.

29, that illustrates the periodical cycle of powder material preheating and melting. The upper graph (1035) shows displacement δx of the WALAM laser module (1001) along the scanning direction as a function of time, and the lower graph (1036) shows the corresponding change of laser power P.

One risk is that moving the high precision gantry system (1017) arm back and forth could result in undesired vibrations of the arm. This may be not an issue at relatively low (a few cm/sec) gantry motion speeds that may be possible using the WALAM system (1000), which allows for gantry speed to be greatly reduced while maintaining relatively high build rates. This risk may also be addressed by integrating beam shaping and thermal management capabilities into the WALAM laser module (1001).

Figure 30:
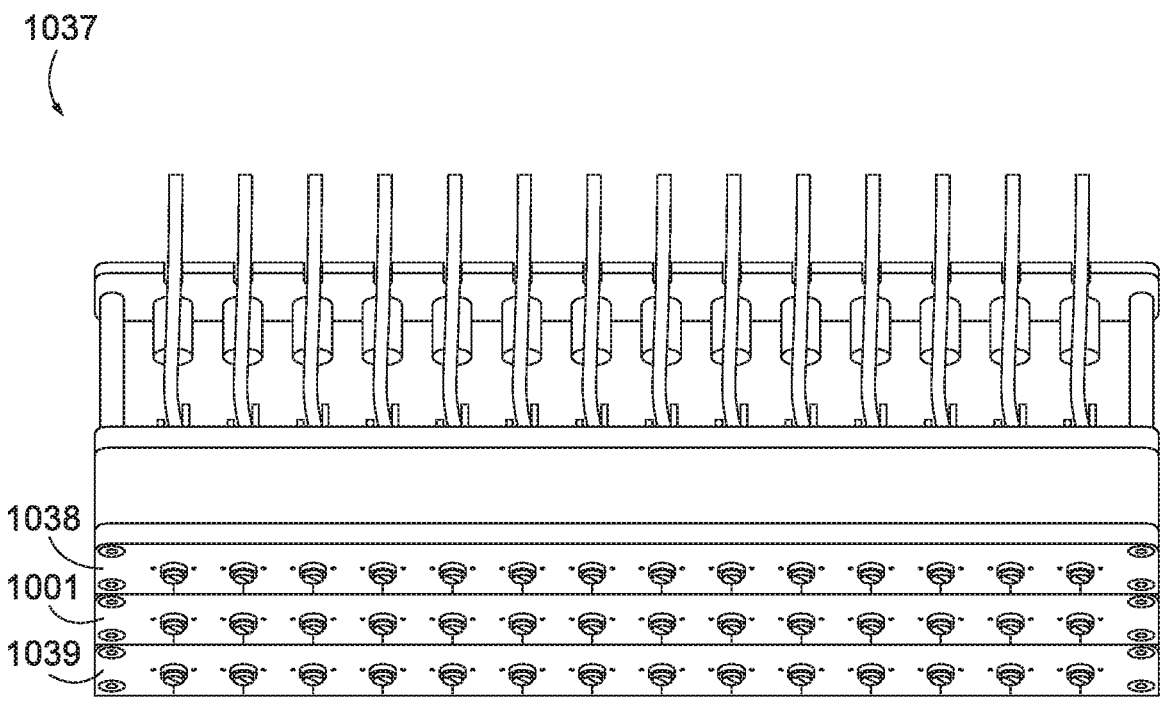
FIG. 30 shows a bottom perspective view of an exemplary WALAM laser module with thermal management capabilities.

One exemplary beam shaping and thermal management technique is in-situ temperature gradients control through powder material pre-heating in front of the processing line (1009), and controlled cooling of the consolidated material behind the molten track (1016). Referring to FIG. 30, that shows a front perspective view of an assembly of three linear arrays of OBMs (1037) composed of a WALAM laser module (1001) used for material melting, a similar linear array of OBMs for powder material pre-heating (1038), and a similar linear array of OBMs for controllable thermal management of the consolidated material behind the molten region (1039). The WALAM laser module (1001) still functions at normal power output required for material processing with linear array of OBMs, while a linear array of OBMs (1038) positioned in front of the WALAM laser module (1001) functions at a lower transmitted power so that the target material can be more gradually heated before processing by the WALAM laser module (1001). A post-processing linear array of OBMs (1039) is positioned behind the WALAM laser module (1001) and operates at a lower transmitted power so that the target material consolidation can be slow down after material melting using the WALAM laser module (1001). The combination of the pre-heat linear array of OBMs (1038), the WALAM laser module (1001), and the post-processing linear array of OBMs (1039) allows for controllable thermal management of the material to improve quality of AM produced components. All three linear arrays of OBMs may share the same WALAAM laser power source (1013). Laser power splitting between these linear arrays of OBMs can be performed using conventional fiber splitters (not shown).

Another exemplary beam shaping and thermal management technique could be based on utilization of specially designed diffractive optics elements (DOEs) that are placed directly in front or behind the focusing lenses (1006) of the OBMs (1002) in FIG. 23. The DOEs can be designed to uniformly redistribute a portion of the transmitted laser beam power into a few mm size area centered at processing laser focal spot (1008). The power redistributed by the DOEs may provide the desired pre-heating of powder material in front of the processing beam and slow down cooling rate of the material behind the molten track.

WALAM In-Situ Sensing

Powder material processing with a WALAM laser module (1001) also offers the advantage of integration of sensors for real-time monitoring of the critical parameters during material processing. The scalable and modular structure of the WALAM laser module components, such as the OBMs (1002) allows for integration of sensing modules based on linear array of oscillating probe laser beams without significant impact on the overall design or features of the WALAM laser module (1001).

Figure 31:
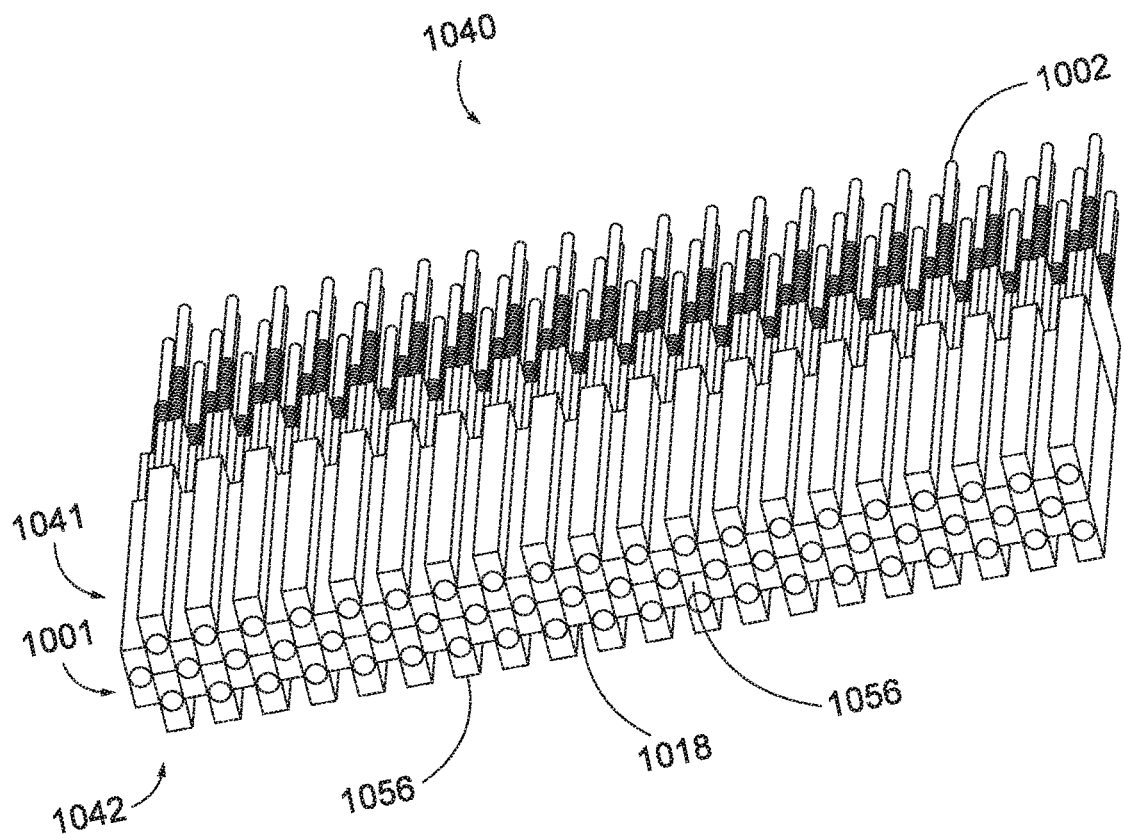
FIG. 31 shows a bottom perspective view of an exemplary WALAM laser module with surface sensing and imaging capabilities.

Referring to FIG. 31, that figure shows a bottom perspective view of an assembly (1040) of the WALAM laser module (1001) with two sensor array modules (1041) and (1042) having similar design and features as the WALAM laser module (1001). The first sensor array module (1041) is located in front of the WALAM laser module (1001) and is used for sensing of the powder material in front of the molten track (1016). The second sensor array module (1042) is located behind the WALAM laser module (1001) and is used for sensing of the processed material behind the molten track (1016). Note that the WALAM in-situ sensing system may have only the first or second or both sensor array modules (1041) and (1042).

Figure 32:
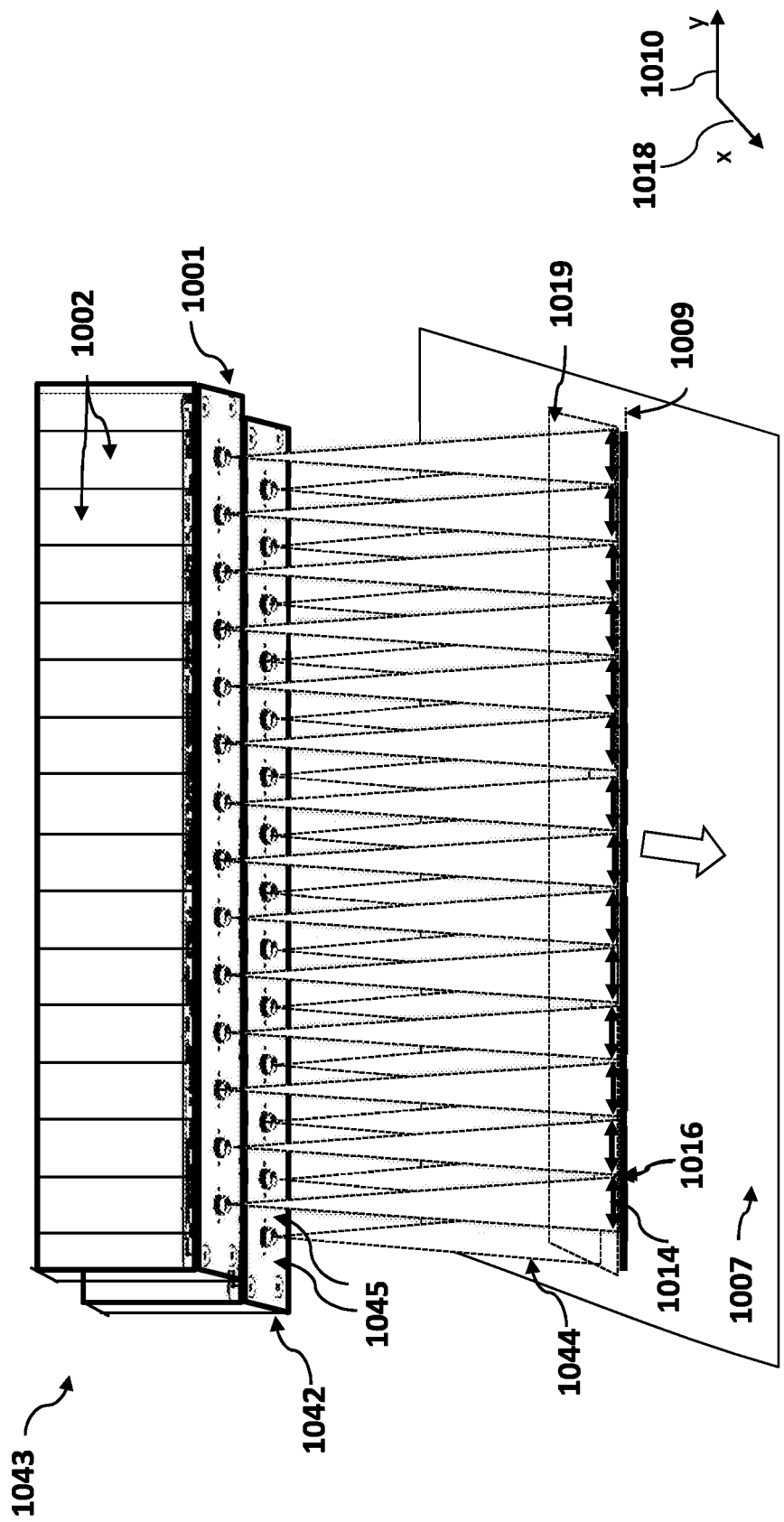
FIG. 32 shows the exemplary WALAM laser module with surface sensing and imaging capabilities during a simulated use.

Referring to FIG. 32 that exemplary shows an assembly (1043) of the WALAM laser module (1001) and the second sensor array module (1042) that is configured to emit N oscillating probe beams (1044) whose cigar-shape footprints are interconnected and oriented along the processing line (1009) of the WALAM laser module (1001), as illustrated in FIG. 32. The focal spots of the probe beams oscillate along y-axis (1010) at the processed material behind the molten track (1016) as both WALAM laser module (1001) and sensor array module (1042) move along the x-axis (1018).

The sensor array module (1042) and/or (1041) may be comprised of oscillating probe beam modules, or OPBMs (1045) that are substantially similar to the OBM (1002) used in the WALAM laser module (1001). The OPBMs (1045) can be either integrated with the OBMs (1002) into a single material processing and probe-beam sensing module (1046) as illustrated in FIG. 33 or be built as independent modules and assembled together with the OBMs (1002) as shown in FIG. 31.

Figure 33:
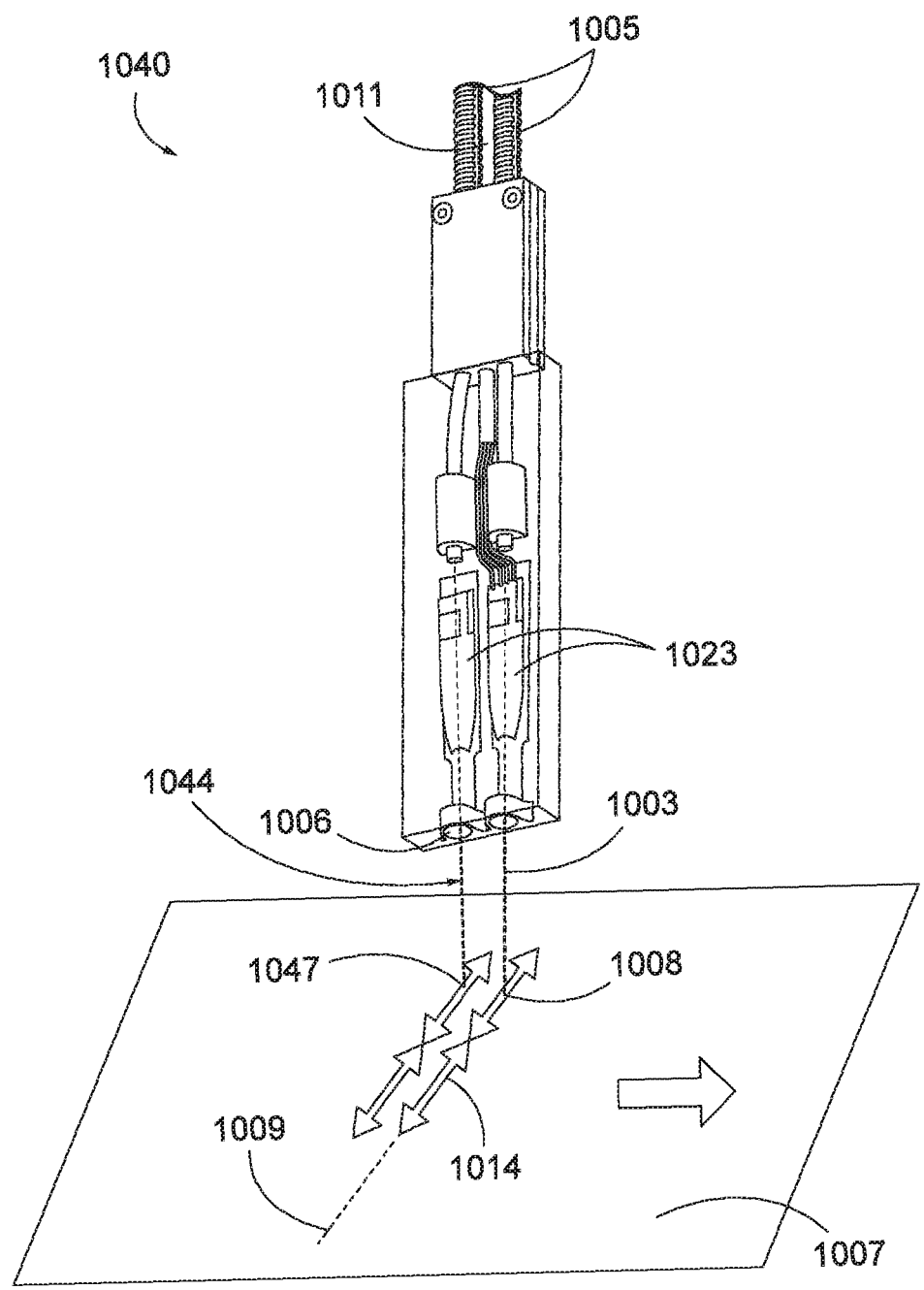
FIG. 33 shows an exemplary oscillating probe beam module with surface sensing and imaging capabilities with a cover removed during a simulated use.

FIG. 33 shows a front perspective view of one exemplary implementation of a combined material processing and probe-beam sensing module (1046). As can be seen, a combined module (1046) is similar to the OBM (1002) but contains two sets of piezo-actuators (1023), one that is used to generate the oscillating focal spot (1008) for material processing and one that is used to produce the oscillating focal spot of a probe beam (1047). Alternately, in an implementation where the OPBMs (1045) and OBMs (1002) are separate, the sensor array module (1041) and/or (1042) made up of one or more OPBMs (1045) may be modularly added or removed from the WALAM laser module (1001) before use.

Figure 34:
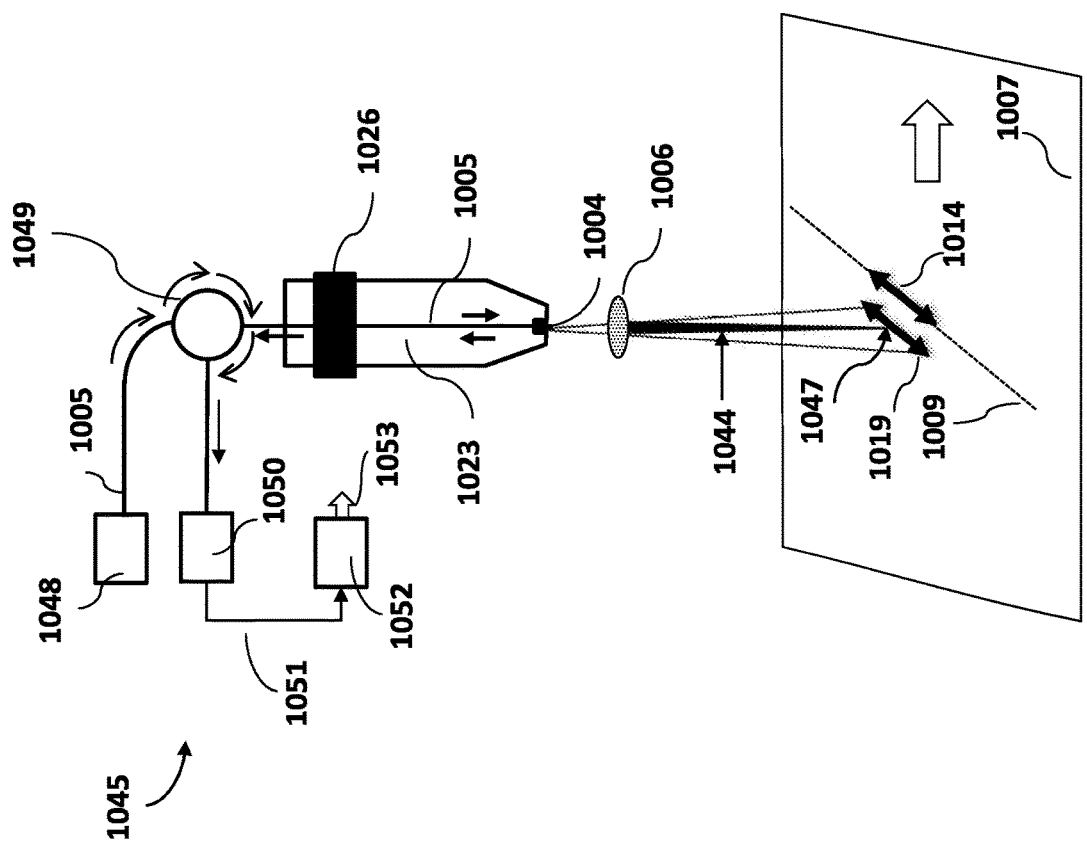
FIG. 34 shows a notional schematic of the exemplary oscillating probe beam module with surface sensing and imaging capabilities during a simulated use.

FIG. 34 shows a diagrammatic view of an exemplary OPBM (1045). The OPBMs (1045) operate as fiber-optics laser transceivers that are based on a single-mode fiber and fiber elements. The laser beam generated by a fiber-coupled laser (1048), propagates through the fiber circulator (1049) and is emitted off the fiber tip (1004) of the delivery fiber (1005) attached to the piezo-actuator (1023) of the OPBM (1045). The lens (1006) of the OPBM (1045) reimages the fiber tip at the powder material (1007) thus creating a probe beam focal spot (1047) behind or in front of the processing line (1009) as illustrated in FIGS. 32, 34. The back scattered light is coupled into the same fiber tip (1004) of the delivery fiber (1005) and redirected a fiber circulator (1049) to a fiber coupled photo-detector (1050) of the OPBM (1045). The wavelength of the probe beams (1044) could be different in respect to the processing laser beams of the WALAM laser module (1001) for easier optical filtering. The line-scan data (1051) obtained from each OPBM (1045) may be digitally combined using linear scan image processor (1052) producing a wide-area highly magnified image (1053) of the processed region (1019) behind the processing line (1009), or a wide-area highly magnified image of powder material surface (1007) in front of the processing line (1009).

With sufficient transmitted laser power, the same probe beams (1044) can provide powder material pre-heating in front of the melt line and slow down cooling rate behind the molten region, as discussed with respect to FIG. 30 and other thermal managing techniques disclosed herein. Thermal gradients management with the probe beams (1044) could be performed efficiently using short laser wavelengths for which absorptivity of the most commonly used powder materials is higher than at the commonly used processing 1.06 µm wavelength. The wavelength 0.53 µm (green) would be one exemplary choice, due to the availability of commercial fiber laser and fiber elements at this wavelength.

BIBLIOGRAPHY

[1] W. E. Frazier, "Metal Additive Manufacturing: A Review", DOI: 10.1007/s11665-014-0958-z, JMEPEG (2014) 23:1917-1928
[2] E. Herderick, Additive Manufacturing of Metals: A Review, Proceedings of MS&T_11, Additive Manufacturing of Metals, Columbus, OH, (2011).
[3]. NIST, "Measurement Science Roadmap for Metal-Based Additive Manufacturing," US Department of Commerce, National Institute of Standards and Technology, Prepared by Energetics Incorporated, May (2013)
[4]. J. Scott, N. Gupta, C. Weber, S. Newsome, T. Wohlers, and T. Caffrey, Additive Manufacturing: Status and Opportunities, IDA, Science and Technology Policy Institute, Washington, D C, 2012
[5] W. Sames, F. List, S. Pannala, R. Dehoff, S. Babu, "The Metallurgy and Processing Science of Metal Additive Manufacturing," International Materials Reviews, (2016).
[6] H. Herfurth, "Multi-beam Laser Additive Manufacturing", CTMA Annual Meeting, Fraunhofer USA & Center for lasers and plasmas in advanced manufacturing, University of Michigan, (2013).
[7] M. Kraetzsch, J. Standfuss, A. Klotzbach, J. Kaspar, B. Brenner, and E. Beyer, Laser beam welding with high-frequency beam oscillation: welding of dissimilar materials with brilliant fiber lasers, in Lasers in Manufacturing 2011—Proceedings of the Sixth International WLT Conference on Lasers in Manufacturing 12, 142-149 (2011).
[9] I. Mingareev and M. Richardson, "Laser Additive Manufacturing: Going Main stream," Opt. & Photon. News, 24-31, February (2017).
[10] C. Korner, A. Bauereiss, E. Attar, "Fundamental Consolidation Mechanisms During Selective Beam Melting of Powders: Modelling and Simulation in Materials Science and Engineering," 21(8):085011, (2013).
[11] W. King, A. Anderson, R. Ferencz, N. Hodge, C. Kamath, S. Khairallah, Overview of modelling and simulation of metal powder bed fusion process at Lawrence Livermore National Laboratory. Materials Science and Technology 31(8):957-968, (2015).
[12] C. Boley, S. Khairallah, A. Rubenchik, "Calculation of Laser Absorption by Metal Powders in Additive Manufacturing," Applied Optics 54(9):2477-2482, (2015).
[13] B. Liu, R. Wildman, C. Tuck, I. Ashcroft, R. Hague, "Investigation the Effect of Particle Size Distribution on Processing Parameters Optimization in Selective Laser Melting Process," In Proceedings of Solid Freeform Fabrication Symposium, University of Texas at Austin, Austin. pp 227-238, (2011).
[14] A. Spierings, N. Herres, G. Levy, "Influence of the Particle Size Distribution on Surface Quality and Mechanical Properties in AM Steel Parts," Rapid Prototyping Journal 17(3):195-202, (2011).
[15] Y. Lee, M. Nordin, S. Babu, D. Farson, "Influence of Fluid Convection on Weld Pool Formation in Laser Cladding," Welding Journal 93(8):292S-300S, (2014).
[16] Y. Lee, M. Nordin, S. Babu, D. Farson, "Effect of Fluid Convection on Dendrite Arm Spacing in Laser Deposition," Metallurgical and Materials Transactions B 45(4): 1520-1529, (2014).
[17] M. Zavala-Arredondo, N. Boone, J. Willmott, D. Childs, P. Ivanov, K. Groom, K. Mumtaz, "Laser Diode Area Melting for High-speed Additive Manufacturing of Metallic Components," Materials and Design 117, 305-315, (2017).
[18] S. Hengesbach, R. Poprawe, D. Hoffmann, M. Traub, T. Schwarz, C. Holly, F. Eibl, A. Weisheit, S. Vogt, S. Britten, M. Ungers, U. Thombansen, C. Engelmann, V. Mamuschkin, P. Lott, "Brightness and Average Power as Driver for Advancements in Diode Lasers and their Applications", Proc. SPIE 9348, High-Power Diode Laser Technology and Applications XIII, 93480B, (2015).
[19] M. A. Vorontsov, G. Filimonov, V. Ovchinnikov, E. Polnau, S. L Lachinova, T. Weyrauch, and J. Mangano, "Comparative efficiency analysis of fiber-array and conventional beam director systems in volume turbulence," Appl. Optics, 55, N. 15, May 20, 4170-4185 (2016).
[20] L. A. Beresnev and M. A. Vorontsov, Compact fiber optic positioner with wide frequency bandwidth, United States Patent Application Publication No. U.S. 2012/ 0224824 A1 (2012).
[21] M. A. Vorontsov, T. Weyrauch, L. A. Beresnev, G. W. Carhart, L. Liu, and K. Aschenbach, Adaptive array of phase-locked fiber collimators: Analysis and experimental demonstration, IEEE J. Sel. Top. Quantum Electron. 15, 269-280 (2009).
[22] A. Brignon, ed., Coherent Laser Beam Combining (Wiley-VCH Verlag GmbH & Co. KGaA, Weinheim, 2013).
[23] www.EOSPACE.com
[24]. T. Weyrauch, M. A. Vorontsov, J. Mangano, V. Ovchinnikov, D. Bricker, E. Polnau, and A. Rostov, "Deep turbulence effects mitigation with coherent combining of 21 laser beams over 7 km," Optics Letters, February 15, V. 41, N. 4, 840-843 (2016).
[25] https://www.thorlabs.com/newgrouppage9.cfm?object group_id=6430
[26] www.scanlab.de
[27] M. A. Vorontsov, and V. P. Sivokon, "Stochastic parallel gradient descent technique for high-resolution wavefront phase distortion correction," JOSA A, Vol. 15, No. 10, 2745-2758 (1998).
[28] M. A. Vorontsov, and G. Carhart, "Adaptive wavefront control with asynchronous stochastic parallel gradient descent clusters," JOSA A, Vol. 23, No. 9, 2613-2622 September (2006).

The invention claimed is:

1. An additive manufacturing system adapted for use on a material at a manufacturing surface comprising:
   a laser module comprising a set of oscillating beam modules configured to produce a linear array of oscillating laser focal spots to produce a processing line comprising a set of interconnected processing sections on the material,
   each oscillating beam module comprising:
      a laser beam delivery fiber comprising a first section fiber-connected to a fiber laser power source and a second section comprising a fiber tip, wherein the second section is mounted to an actuator that is operable to oscillate the fiber tip along one axis, and wherein the laser power source is operable to provide laser power to the fiber tip;

the fiber laser power source comprising:
a plurality of fiber channels, each fiber channel corresponding to each laser beam delivery fiber.

2. The additive manufacturing system of claim 1, the fiber laser power source further comprising:
an optical module coupled to a single mode seed laser that couples an output from the seed laser into a single mode polarization maintaining (PM) fiber;
a plurality of fiber splitters that divide the light input into the single mode PM fiber into the plurality of fiber channels.

3. The additive manufacturing system of claim 2, wherein each of the fiber channels comprise:
a controllable phase shifter that introduces controllable variations of optical path differences (OPDs) in the fiber channel.

4. The additive manufacturing system of claim 3, wherein the controllable variations of OPDs correspond to oscillation characteristics of the linear array of oscillating laser focal spots.

5. The additive manufacturing system of claim 3, wherein the controllable variations of optical path differences (OPDs) in the fiber channel comprise at least one of the following: phase randomization, stair-mode beam steering, phase locking, time-multiplexing control and combinations thereof.

6. The additive manufacturing system of claim 2, further comprising:
a controller configured to receive a target object definition comprising a set of coordinates defining a target object and, during an additive manufacturing process to create the target object, and based at least in part upon the target object definition:
provide signals to the laser power source to control the output laser power transmitted by each oscillating beam module, and
provide signals to the oscillating beam modules to control the one or more oscillation characteristics of the linear array of oscillating laser focal spots.

7. The additive manufacturing system of claim 1, wherein each oscillating beam module further comprises:
a lens configured to reimage the fiber tip onto the material to create a laser focal spot, whereby each oscillating beam module is configured to oscillate the laser focal spot with one or more oscillation characteristics of at least one of amplitude, frequency, or waveform.

8. The additive manufacturing system of claim 7, wherein the one or more oscillation characteristics are determined by controllable variations of optical path differences (OPDs) in the fiber channel.

9. The additive manufacturing system of claim 8, wherein a controllable phase shifter introduces the controllable variations of OPDs in the fiber channel, and each of the fiber channels further comprise a fiber splice point that couples the single mode PM fiber to a non-PM single mode fiber after the introduction of the controllable variations.

10. The additive manufacturing system of claim 2, the optical module further comprising:
a line broadening electronic module that supplies a random signal to a fiber-integrated phase modulator to broaden the linewidth of the light in the single mode PM fiber.

11. The additive manufacturing system of claim 1, the fiber laser power source further comprising:
a plurality of fiber lasers; and
a beam power controller configured to control the power transmitted in each of the plurality of lasers,
wherein each fiber channel corresponds to one of the plurality of fiber lasers.

12. The additive manufacturing system of claim 1, the fiber laser power source further comprising:
a plurality of fiber lasers, wherein a portion of the fiber channels corresponds to one of the plurality of fiber lasers;
an optical module coupled to a single mode seed laser that couples an output from the seed laser into a fiber;
a plurality of fiber splitters that divide the light input into the fiber into the remaining portion of the plurality of fiber channels.

13. A system for providing a plurality of single mode Gaussian-shaped laser beams, the system comprising:
an optical module coupled to a single mode seed laser system that couples an output from the seed laser system into a single mode polarization maintaining (PM) fiber;
a plurality of fiber splitters that divide the light input into the single mode PM fiber into a plurality of fiber channels, each fiber channel corresponding to a laser beam delivery fiber; and
a controllable phase shifter that introduces controllable variations of optical path differences (OPDs) in each of the fiber channels.

14. The system of claim 13, wherein the controllable variations of OPDs correspond to oscillation characteristics of an oscillating laser focal spot from the laser beam delivery fiber.

15. The system of claim 13, wherein the oscillating beam module further comprises:
a lens configured to reimage the fiber tip onto a material to create a laser focal spot, whereby each oscillating beam module is configured to oscillate the laser focal spot with one or more oscillation characteristics of at least one of amplitude, frequency, or waveform.

16. The additive manufacturing system of claim 13, wherein the one or more oscillation characteristics are determined by controllable variations of OPDs in the fiber channel.

17. The system of claim 13, wherein the fiber channels further comprise a fiber splice point that couples the single mode PM fiber to a non-PM single mode fiber after the introduction of the controllable variations, the system further comprising:
a power fiber amplifier and a polarization controller after the fiber splice point.

18. The system of claim 1, the optical module further comprising:
a line broadening electronic module that supplies a random signal to a fiber-integrated phase modulator to broaden the linewidth of the light in the single mode PM fiber.

19. The system of claim 13, further comprising:
a laser beam delivery fiber comprising a fiber tip, wherein the fiber tip is mounted to an actuator that is operable to oscillate the fiber tip along one axis.

20. The system of claim 13, further comprising one or more fiber lasers, wherein each of the one or more fiber lasers correspond to a laser beam delivery fiber.

* * * * *